(12) United States Patent
Gaspard et al.

(10) Patent No.: US 12,349,710 B2
(45) Date of Patent: *Jul. 8, 2025

(54) SENSORY MODIFIERS

(71) Applicant: CARGILL, INCORPORATED, Wayzata, MN (US)

(72) Inventors: Dan S. Gaspard, Victoria, MN (US); Michael Alan Mortenson, Rogers, MN (US); Adam T. Zarth, St. Louis Park, MN (US)

(73) Assignee: CARGILL, INCORPORATED, Wayzata, MN (US)

(*) Notice: Subject to any disclaimer, the term of this patent is extended or adjusted under 35 U.S.C. 154(b) by 79 days.

This patent is subject to a terminal disclaimer.

(21) Appl. No.: 18/354,914

(22) Filed: Jul. 19, 2023

(65) Prior Publication Data

US 2023/0354858 A1 Nov. 9, 2023

Related U.S. Application Data

(63) Continuation of application No. 17/395,784, filed on Aug. 6, 2021, now Pat. No. 11,918,014, which is a continuation of application No. PCT/US2020/026524, filed on Apr. 3, 2020.

(60) Provisional application No. 62/832,269, filed on Apr. 10, 2019, provisional application No. 62/830,449, filed on Apr. 6, 2019.

(51) Int. Cl.
*A23L 27/30* (2016.01)
*A23L 2/60* (2006.01)
*A23L 27/00* (2016.01)

(52) U.S. Cl.
CPC .............. *A23L 27/36* (2016.08); *A23L 2/60* (2013.01); *A23L 27/84* (2016.08); *A23L 27/86* (2016.08); *A23V 2002/00* (2013.01)

(58) Field of Classification Search
CPC .................................. A23L 27/36; A23L 2/60
See application file for complete search history.

(56) References Cited

U.S. PATENT DOCUMENTS

| | | |
|---|---|---|
| 3,916,028 A | 10/1975 | Lee |
| 3,924,017 A | 12/1975 | Lee |
| 4,082,858 A | 4/1978 | Morita |
| 4,312,856 A | 1/1982 | Korduner |
| 4,495,170 A | 1/1985 | Beyts |
| 4,710,583 A | 12/1987 | Chmurny |
| 4,853,237 A | 8/1989 | Prinkkila |
| 4,906,480 A | 3/1990 | Kashket |
| 5,336,513 A | 8/1994 | Riemer |
| 5,681,569 A | 10/1997 | Kuznicki |
| 5,788,971 A | 8/1998 | Togasaki |
| 5,888,549 A | 3/1999 | Buchholz |
| 6,022,576 A | 2/2000 | Cirigliano |
| 6,337,095 B1 | 1/2002 | Jain |
| 6,426,112 B1 | 7/2002 | Boatright |
| 6,475,544 B1 | 11/2002 | Hiramoto |
| 6,589,588 B1 | 7/2003 | Wester |
| 6,635,774 B2 | 10/2003 | Roden |
| 6,900,240 B2 | 5/2005 | Empie |
| 6,989,171 B2 | 1/2006 | Portman |
| 7,279,184 B2 | 10/2007 | Gow |
| 7,291,352 B2 | 11/2007 | Gow |
| 7,294,353 B2 | 11/2007 | Gow |
| 7,651,717 B2 | 1/2010 | Shioya |
| 7,727,565 B2 | 6/2010 | Jani |
| 7,750,053 B2 | 7/2010 | Suzuki |
| 7,767,238 B2 | 8/2010 | Roy |
| 7,838,044 B2 | 11/2010 | Abelyan |
| 7,879,376 B2 | 2/2011 | Boghani |
| 7,939,563 B2 | 5/2011 | Suzuki |
| 8,017,168 B2 | 9/2011 | Prakash |
| 8,076,491 B2 | 12/2011 | Karanewsky |
| 8,088,428 B2 | 1/2012 | Yamane |
| 8,092,795 B2 | 1/2012 | Tsuchiya |
| 8,178,148 B2 | 5/2012 | Fujii |
| 8,197,875 B2 | 6/2012 | Chien |
| 8,241,680 B2 | 8/2012 | Williams |
| 8,337,929 B2 | 12/2012 | Ogura |
| 8,367,137 B2 | 2/2013 | Prakash |
| 8,512,789 B2 | 8/2013 | Prakash |
| 8,524,304 B2 | 9/2013 | Prakash |
| 8,530,527 B2 | 9/2013 | Markosyan |
| 8,703,228 B2 | 4/2014 | Boghani |
| 8,940,350 B2 | 1/2015 | Prakash |
| 8,940,351 B2 | 1/2015 | Prakash |
| 8,956,678 B2 | 2/2015 | Prakash |
| 9,011,956 B2 | 4/2015 | Prakash |
| 9,060,537 B2 | 6/2015 | Mutilangi |
| 9,101,160 B2 | 8/2015 | Prakash |
| 9,101,161 B2 | 8/2015 | Prakash |
| 9,131,719 B2 | 9/2015 | Backes |
| 9,133,229 B2 | 9/2015 | Lee |
| 9,144,251 B2 | 9/2015 | Prakash |
| 9,149,051 B2 | 10/2015 | Prakash |
| 9,358,264 B2 | 6/2016 | Ibarra |
| 9,457,009 B2 | 10/2016 | Guthrie |
| 9,492,379 B2 | 11/2016 | Park |

(Continued)

FOREIGN PATENT DOCUMENTS

| | | |
|---|---|---|
| CN | 1085073 A | 4/1994 |
| CN | 1100894 A | 4/1995 |

(Continued)

OTHER PUBLICATIONS

Naimi, et al., "Rosemary Extract as a Potential Anti-Hyperglycemic Agent: Current Evidence and Future Perspectives", Sep. 1, 2017, Nutrients; vol. 9, Issue 9, pp. 1-19.

(Continued)

*Primary Examiner* — Jeffrey P Mornhinweg

(57) ABSTRACT

A sensory modifier can provide a steviol glycoside composition with modified sensory attributes, e.g., reduced sweetness linger or reduced bitterness. One such sensory modifier includes a salt fraction and an acid fraction. The salt fraction may include a salt of a monocaffeoylquinic acid and/or a salt of a dicaffeoylquinic acid. The acid fraction may include a monocaffeoylquinic acid and/or a dicaffeoylquinic acid. The salt fraction is preferably at least 50 wt % of sensory modifier.

25 Claims, 2 Drawing Sheets

(56) References Cited

U.S. PATENT DOCUMENTS

| | | |
|---|---|---|
| 9,510,611 B2 | 12/2016 | Purkayastha |
| 9,629,795 B2 | 4/2017 | Krammer |
| 9,636,373 B1 | 5/2017 | Akao |
| 9,775,822 B2 | 10/2017 | Prasad |
| 9,844,576 B2 | 12/2017 | Brownell |
| 9,848,624 B2 | 12/2017 | Ley |
| 9,889,107 B2 | 2/2018 | Guthrie |
| 9,962,356 B2 | 5/2018 | Prasad |
| 10,188,125 B2 | 1/2019 | Ozato |
| 10,376,521 B2 | 8/2019 | Zaworotko |
| 10,420,744 B2 | 9/2019 | Prasad |
| 10,602,758 B2 | 3/2020 | Dubois |
| 10,624,372 B2 | 4/2020 | Reichelt |
| 10,772,340 B2 | 9/2020 | Hotta |
| 10,780,170 B2 | 9/2020 | Purkayastha |
| 10,798,961 B2 | 10/2020 | Marcq |
| 10,849,339 B2 | 12/2020 | Prakash |
| 10,874,130 B2 | 12/2020 | Kim |
| 10,952,458 B2 | 3/2021 | Purkayastha |
| 10,973,794 B2 | 4/2021 | Forbes |
| 11,000,497 B2 | 5/2021 | Prasad |
| 12,097,231 B2 | 9/2024 | Gaspard et al. |
| 2001/0051195 A1 | 12/2001 | Miljkovic |
| 2002/0068123 A1 | 6/2002 | Verhagen |
| 2002/0187239 A1 | 12/2002 | Miljkovic |
| 2002/0197386 A1 | 12/2002 | Hiramoto |
| 2003/0003212 A1 | 1/2003 | Chien |
| 2003/0008943 A1 | 1/2003 | Slone |
| 2003/0045473 A1 | 3/2003 | Sarama |
| 2003/0138537 A1 | 7/2003 | Bailey |
| 2003/0172392 A1 | 9/2003 | Mendu |
| 2004/0086619 A1 | 5/2004 | Zhong |
| 2004/0213881 A1 | 10/2004 | Chien |
| 2005/0079232 A1 | 4/2005 | Offord-Cavin |
| 2005/0106215 A1 | 5/2005 | Offord-Cavin |
| 2005/0118293 A1 | 6/2005 | Gow |
| 2005/0220868 A1 | 10/2005 | Lahl |
| 2006/0083838 A1 | 4/2006 | Jackson |
| 2006/0263475 A1 | 11/2006 | Jani |
| 2006/0280835 A1 | 12/2006 | Jani |
| 2006/0286202 A1 | 12/2006 | Boghani |
| 2007/0029258 A1 | 2/2007 | Takeda |
| 2007/0054023 A1 | 3/2007 | Bingley |
| 2007/0082106 A1 | 4/2007 | Lee |
| 2007/0116800 A1 | 5/2007 | Prakash |
| 2007/0116823 A1 | 5/2007 | Prakash |
| 2007/0116828 A1 | 5/2007 | Prakash |
| 2007/0116829 A1 | 5/2007 | Prakash |
| 2007/0116831 A1 | 5/2007 | Prakash et al. |
| 2007/0116838 A1 | 5/2007 | Prakash |
| 2007/0116839 A1 | 5/2007 | Prakash |
| 2007/0128311 A1 | 6/2007 | Prakash |
| 2007/0292582 A1 | 12/2007 | Prakash |
| 2008/0014331 A1 | 1/2008 | Badalov |
| 2008/0063748 A1 | 3/2008 | Massey |
| 2008/0107787 A1 | 5/2008 | Prakash |
| 2008/0226788 A1 | 9/2008 | Chang |
| 2008/0226790 A1 | 9/2008 | Johnson |
| 2008/0261916 A1 | 10/2008 | Jaszberenyi |
| 2008/0286421 A1 | 11/2008 | DeLease |
| 2008/0292764 A1 | 11/2008 | Prakash |
| 2008/0292765 A1 | 11/2008 | Prakash |
| 2008/0292775 A1 | 11/2008 | Prakash |
| 2009/0004360 A1 | 1/2009 | Bingley |
| 2009/0053378 A1 | 2/2009 | Prakash |
| 2010/0028325 A1 | 2/2010 | Rocabayera Bonvila |
| 2010/0099857 A1 | 4/2010 | Evans |
| 2010/0112136 A1 | 5/2010 | Ward |
| 2010/0160224 A1 | 6/2010 | Thomas |
| 2010/0297327 A1 | 11/2010 | Stangle |
| 2010/0330244 A1 | 12/2010 | Nonaka |
| 2011/0033525 A1 | 2/2011 | Liu |
| 2011/0054022 A1 | 3/2011 | Poessel |
| 2011/0091394 A1 | 4/2011 | Abelyan |
| 2011/0104353 A1 | 5/2011 | Lee |
| 2011/0160311 A1 | 6/2011 | Prakash |
| 2011/0189360 A1 | 8/2011 | Yoo |
| 2011/0195161 A1 | 8/2011 | Upreti |
| 2011/0195170 A1 | 8/2011 | Shigemura |
| 2011/0293538 A1 | 12/2011 | Ley |
| 2012/0041078 A1 | 2/2012 | Tachdjian |
| 2012/0058236 A1 | 3/2012 | Fosdick |
| 2012/0064221 A1 | 3/2012 | Given |
| 2012/0076899 A1 | 3/2012 | Evans |
| 2012/0156351 A1 | 6/2012 | Miyazawa |
| 2012/0177602 A1 | 7/2012 | New |
| 2012/0196019 A1 | 8/2012 | Shi |
| 2012/0201935 A1 | 8/2012 | Krohn |
| 2013/0039932 A1 | 2/2013 | Park |
| 2013/0040036 A1 | 2/2013 | Zeller |
| 2013/0071521 A1 | 3/2013 | Lee |
| 2013/0209658 A1 | 8/2013 | Spelman |
| 2013/0251881 A1 | 9/2013 | Mutilangi |
| 2013/0274351 A1 | 10/2013 | Markosyan |
| 2013/0316066 A1 | 11/2013 | Brown |
| 2014/0004215 A1 | 1/2014 | Brownell |
| 2014/0094453 A1 | 4/2014 | Tachdjian |
| 2014/0155359 A1 | 6/2014 | Broze |
| 2014/0171519 A1 | 6/2014 | Prakash |
| 2014/0206634 A1 | 7/2014 | Liu |
| 2014/0295049 A1 | 10/2014 | Ragot |
| 2014/0302180 A1 | 10/2014 | Chapal |
| 2014/0309294 A1 | 10/2014 | Erfurt |
| 2014/0342078 A1 | 11/2014 | Hayes |
| 2015/0017284 A1 | 1/2015 | Prakash |
| 2015/0050410 A1 | 2/2015 | Luo |
| 2015/0125587 A1 | 5/2015 | Asano |
| 2015/0189904 A1 | 7/2015 | Prakash |
| 2015/0223510 A1 | 8/2015 | Lee |
| 2015/0289548 A1 | 10/2015 | Given |
| 2015/0320101 A1 | 11/2015 | Walton |
| 2015/0328179 A1 | 11/2015 | Nakashima |
| 2015/0344456 A1 | 12/2015 | Dull |
| 2015/0366253 A1 | 12/2015 | Shi |
| 2016/0100689 A1 | 4/2016 | Wang |
| 2016/0113316 A1 | 4/2016 | Nachbagauer |
| 2016/0165941 A1 | 6/2016 | Hofmekler |
| 2016/0183574 A1 | 6/2016 | Chen |
| 2016/0213039 A1 | 7/2016 | Kumar |
| 2016/0242452 A1 | 8/2016 | Mutilangi |
| 2016/0309761 A1 | 10/2016 | Brower, III |
| 2016/0316797 A1 | 11/2016 | Piorkowski |
| 2017/0006901 A1 | 1/2017 | Carlson |
| 2017/0055548 A1 | 3/2017 | Chakraborty |
| 2017/0095443 A1 | 4/2017 | Luo |
| 2017/0105432 A1 | 4/2017 | Karanewsky |
| 2017/0119032 A1 | 5/2017 | Patron |
| 2017/0119033 A1 | 5/2017 | Liu |
| 2017/0143012 A1 | 5/2017 | San Miguel |
| 2017/0156374 A1 | 6/2017 | Ackilli |
| 2017/0172191 A1 | 6/2017 | Prakash |
| 2017/0183326 A1 | 6/2017 | Kimoto |
| 2017/0273338 A1 | 9/2017 | Lee |
| 2017/0295827 A1 | 10/2017 | Prakash |
| 2017/0303574 A1 | 10/2017 | Luo |
| 2017/0327776 A1 | 11/2017 | Chien et al. |
| 2017/0354175 A1 | 12/2017 | Karanewsky |
| 2017/0362268 A1 | 12/2017 | Carlson |
| 2018/0000133 A1 | 1/2018 | Izumi |
| 2018/0002306 A1 | 1/2018 | Jiang |
| 2018/0086751 A1 | 3/2018 | Karanewsky |
| 2018/0092381 A1 | 4/2018 | Brijwani |
| 2018/0103670 A1 | 4/2018 | Recenti |
| 2018/0168212 A1 | 6/2018 | Markosyan |
| 2018/0177216 A1 | 6/2018 | Markosyan |
| 2018/0263269 A1 | 9/2018 | Prakash |
| 2018/0289042 A1 | 10/2018 | Bell |
| 2018/0296678 A1 | 10/2018 | Prakash |
| 2019/0116835 A1 | 4/2019 | Prakash |
| 2019/0142043 A1 | 5/2019 | Prakash |
| 2019/0175499 A1 | 6/2019 | Zhang |
| 2019/0274985 A1 | 9/2019 | Hotta |
| 2019/0313669 A1 | 10/2019 | Dubois |
| 2020/0009208 A1 | 1/2020 | Hwang |

(56) References Cited

U.S. PATENT DOCUMENTS

| | | |
|---|---|---|
| 2020/0023021 A1 | 1/2020 | Lewis |
| 2020/0054058 A1 | 2/2020 | Prakash |
| 2020/0085778 A1 | 3/2020 | Yamamoto |
| 2020/0138056 A1 | 5/2020 | Graz |
| 2020/0138765 A1 | 5/2020 | Prasad |
| 2020/0154737 A1 | 5/2020 | Dubois |
| 2020/0196649 A1 | 6/2020 | Mitchell |
| 2020/0197342 A1 | 6/2020 | Russo |
| 2020/0237845 A1 | 7/2020 | Suzuki |
| 2020/0275682 A1 | 9/2020 | Chakraborty |
| 2020/0305483 A1 | 10/2020 | Gan |
| 2020/0345049 A1 | 11/2020 | Galano |
| 2021/0037851 A1 | 2/2021 | Fraser |
| 2021/0051976 A1 | 2/2021 | Fraser |
| 2021/0084949 A1 | 3/2021 | Banavara |
| 2021/0092986 A1 | 4/2021 | Dubois |
| 2021/0128600 A1 | 5/2021 | Rauch |
| 2021/0153536 A1 | 5/2021 | Ozato |
| 2021/0236450 A1 | 8/2021 | Guthrie |
| 2021/0260013 A1 | 8/2021 | Lee |
| 2021/0267243 A1 | 9/2021 | Peterson |
| 2024/0050506 A1 | 2/2024 | Gaspard et al. |

FOREIGN PATENT DOCUMENTS

| | | |
|---|---|---|
| CN | 1144459 A | 3/1997 |
| CN | 1336333 A | 2/2002 |
| CN | 1615838 A | 5/2005 |
| CN | 1651398 A | 8/2005 |
| CN | 1253099 | 4/2006 |
| CN | 100341500 C | 10/2007 |
| CN | 102381974 A | 3/2012 |
| CN | 102771751 A | 11/2012 |
| CN | 102860438 A | 1/2013 |
| CN | 104397785 A | 3/2015 |
| CN | 102924544 B | 4/2015 |
| CN | 103656627 B | 9/2015 |
| CN | 103874411 A | 6/2016 |
| CN | 106138298 A | 11/2016 |
| CN | 107184482 A | 9/2017 |
| CN | 107455718 A | 12/2017 |
| DE | 29603759 U1 | 5/1996 |
| DE | 29808384 U1 | 8/1998 |
| EP | 0730830 A | 9/1996 |
| EP | 1186297 A2 | 3/2002 |
| EP | 1716757 B1 | 7/2009 |
| EP | 1925208 B1 | 12/2011 |
| EP | 1903890 B1 | 11/2012 |
| EP | 2340719 B1 | 2/2014 |
| EP | 2896301 B1 | 6/2016 |
| EP | 2643007 B1 | 8/2016 |
| EP | 3052074 A1 | 8/2016 |
| EP | 2625962 B1 | 6/2017 |
| EP | 3188604 A1 | 7/2017 |
| EP | 3257507 A1 | 12/2017 |
| EP | 3264919 A1 | 1/2018 |
| EP | 3097790 B1 | 5/2018 |
| EP | 2409696 B1 | 6/2018 |
| EP | 2753188 B1 | 1/2019 |
| EP | 2856883 B1 | 3/2019 |
| EP | 2692243 B1 | 6/2019 |
| EP | 3397072 B1 | 7/2019 |
| EP | 3513663 A1 | 7/2019 |
| EP | 3169166 B1 | 8/2019 |
| EP | 3524062 A2 | 8/2019 |
| EP | 2934181 B1 | 9/2019 |
| EP | 2124647 B2 | 12/2019 |
| EP | 3228195 B1 | 1/2020 |
| EP | 3544445 B1 | 5/2020 |
| FR | 2138067 B1 | 6/1976 |
| GB | 2348104 A | 5/1999 |
| JP | 54147976 A | 11/1979 |
| JP | 63173531 A | 7/1988 |
| JP | 0195739 A | 4/1989 |
| JP | 0427374 A | 1/1992 |
| JP | 04145048 A | 5/1992 |
| JP | 0638723 A | 2/1994 |
| JP | 07123921 A | 5/1995 |
| JP | 07135938 A | 5/1995 |
| JP | 0823939 A | 1/1996 |
| JP | 0994080 A | 4/1997 |
| JP | 09221667 A | 8/1997 |
| JP | 09266767 A | 10/1997 |
| JP | 10179079 A | 7/1998 |
| JP | 10183164 A | 7/1998 |
| JP | 10248501 A | 9/1998 |
| JP | 119189 A | 1/1999 |
| JP | 11299473 A | 11/1999 |
| JP | 2000063827 A | 2/2000 |
| JP | 2000308477 A | 11/2000 |
| JP | 2001321115 A | 11/2001 |
| JP | 2003204756 A | 7/2003 |
| JP | 2004528050 A | 9/2004 |
| JP | 2006006318 A | 1/2006 |
| JP | 2006104229 A | 4/2006 |
| JP | 2007143528 A | 6/2007 |
| JP | 2009517022 A | 4/2009 |
| JP | 2009523407 A | 6/2009 |
| JP | 2010521166 A | 6/2010 |
| JP | 2011045305 A | 3/2011 |
| JP | 2011168543 A | 9/2011 |
| JP | 2012005483 A | 1/2012 |
| JP | 2012110322 A | 6/2012 |
| JP | 2012240949 A | 12/2012 |
| JP | 2015506718 A | 3/2015 |
| JP | 2015511498 A | 4/2015 |
| JP | 2017121221 A | 7/2017 |
| JP | 2017123788 A | 7/2017 |
| JP | 2018085964 A | 6/2018 |
| JP | 6710115 B2 | 6/2020 |
| JP | 2020-536537 A | 12/2020 |
| JP | 2021-099038 A | 7/2021 |
| KR | 101500485 B1 | 3/2015 |
| PH | 12011000255 A | 7/2011 |
| WO | 1998042209 A1 | 10/1998 |
| WO | 1999030576 A1 | 6/1999 |
| WO | 2000030464 A1 | 6/2000 |
| WO | 2000062628 A1 | 10/2000 |
| WO | 2000069282 A1 | 11/2000 |
| WO | 2001097624 A1 | 12/2001 |
| WO | 2002041700 A1 | 5/2002 |
| WO | 2002096852 A1 | 12/2002 |
| WO | 2002100192 W | 12/2002 |
| WO | 2002021938 A1 | 1/2004 |
| WO | 2007013616 A1 | 2/2007 |
| WO | 2007/061900 A1 | 5/2007 |
| WO | 2007061753 A2 | 5/2007 |
| WO | 2007061795 A1 | 5/2007 |
| WO | 2007149672 A2 | 12/2007 |
| WO | 2008057965 A2 | 5/2008 |
| WO | 2008093892 A1 | 8/2008 |
| WO | 2008147723 A1 | 12/2008 |
| WO | 2008147725 A1 | 12/2008 |
| WO | 2009012051 A1 | 1/2009 |
| WO | 2010038911 A1 | 4/2010 |
| WO | 2011094423 A1 | 8/2011 |
| WO | 2011105561 A1 | 9/2011 |
| WO | 2011106114 A1 | 9/2011 |
| WO | 2011112892 A1 | 9/2011 |
| WO | 2012083251 A1 | 6/2012 |
| WO | 2012107205 A1 | 8/2012 |
| WO | 2012109506 A1 | 8/2012 |
| WO | 2012166164 A1 | 12/2012 |
| WO | 2011071179 A1 | 4/2013 |
| WO | 2013096420 A1 | 6/2013 |
| WO | 2013148177 A1 | 10/2013 |
| WO | 2014104408 A1 | 7/2014 |
| WO | 2014146135 A2 | 9/2014 |
| WO | 2014153000 A1 | 9/2014 |
| WO | 2015023928 A1 | 2/2015 |
| WO | 2015024218 A1 | 2/2015 |
| WO | 2015117011 A1 | 8/2015 |
| WO | 2016036578 A1 | 3/2016 |
| WO | 2016049236 A1 | 3/2016 |

(56) References Cited

FOREIGN PATENT DOCUMENTS

| | | | |
|---|---|---|---|
| WO | 2016073251 A1 | 5/2016 |
| WO | 2016085919 A1 | 6/2016 |
| WO | 2016085924 A1 | 6/2016 |
| WO | 2016086233 A1 | 6/2016 |
| WO | 2016100689 A1 | 6/2016 |
| WO | 2017053980 A1 | 3/2017 |
| WO | 2017059414 A1 | 4/2017 |
| WO | 2017095932 A1 | 6/2017 |
| WO | 2017120480 A1 | 7/2017 |
| WO | 2016084887 A1 | 9/2017 |
| WO | 2017189994 A1 | 11/2017 |
| WO | 2017196933 A1 | 11/2017 |
| WO | 2018013739 A2 | 1/2018 |
| WO | 2018102447 A2 | 6/2018 |
| WO | 2019071182 A1 | 4/2019 |
| WO | 2019071187 A1 | 4/2019 |
| WO | 2019071188 A1 | 4/2019 |
| WO | 2019071220 A1 | 4/2019 |
| WO | 2019071250 A1 | 4/2019 |
| WO | 2019071254 A1 | 4/2019 |
| WO | 2019177634 A1 | 9/2019 |
| WO | 2019222601 A1 | 11/2019 |
| WO | 2019230013 A1 | 6/2020 |
| WO | 2020172276 W | 8/2020 |
| WO | 2020202193 W | 10/2020 |
| WO | 2020210118 A1 | 10/2020 |
| WO | 2020210122 A1 | 10/2020 |
| WO | 2020210160 A2 | 10/2020 |
| WO | 2020237060 A1 | 11/2020 |
| WO | 2021038830 W | 3/2021 |
| WO | 2021038832 W | 3/2021 |
| WO | 2021049864 W | 3/2021 |
| WO | 2021081417 A1 | 4/2021 |
| WO | 2021090989 A1 | 5/2021 |
| WO | 2021091322 A1 | 5/2021 |
| WO | 2021091327 A1 | 5/2021 |
| WO | 2021125070 A1 | 6/2021 |
| WO | 2021132439 W | 7/2021 |

OTHER PUBLICATIONS

Nalte, YK, et al., Solubility Enhancement of Nevirapine by Cocrystallisation Technique. Journal of Pharmacy Research. Aug. 21, 2015, vol. 9, No. 8; pp. 556-561. ISSN:0974-6943.
Nguyen et al., "Facile preparation of water soluble curcuminoids extracted from turmeric (Curcuma longa L.) power by using steviol glucosides," Food Chemistry, 2017, 214, 366-373.
Nicoud, et al., "Estimation of the solubility of metastable polymorphs: A critical review," Cryst. Growth Des., 2018.
Notice of Opposition in EP2934181, Jun. 2020.
Ohta et al., "Characterization of Novel Steviol Glycosides from Leaves of Stevia rebaudiana Morita," 2010, J. Appl. Glycosci., 57, 199-209.
Prakash, "Characterization and sensory evaluation of a hexa B-D-glucopyranosyl diterpene from Stevia rebaudiana," Natural Products Communications, 2013, 8:1523-1526.
Prakash, et al., "Development of novel functional confectionery using low reduced sugar," Indian Journal of Drugs, 2016, 4(4), 141-148.
Rogers et al., "Changes to the content of sugars, sugar alcohols, myo-inositol, carboxylic acids and inorganic anions in developing grains from different varieties of Robusta (Coffea canephora) and Arabica (C. arabica) coffees," Plant Science, 1999, 149, 115-123.
Roy, G., "Bitterness: reduction and inhibition," Trends Food Sci Tech, 1992, 3, 85-91.
Schwarz et al., "Investigation of plant extracts for the protection of processed foods against lipid oxidation." Eur Food Res Technol, 2001, 212:319-328.
Shibata et al., "Glucosylation of steviol and steviol-glucosides in extracts from Stevia rebaudiana Bertoni," Plant Physiol., 1991, 95, 152-156.

Shiraishi et al., "Taste-Masking Effect of Chlorogenic Acid (CGA) on Bitter Drugs Evaluated by Taste Sensor and Surface Plasmon Resonance on the Basis of CGA-Drug Interactions," 2017, 65(2):127-133, Chem Pharm Bull (Tokyo).
Standard Method Performance Requirements (SMPRs) for Determination of Phenolic Compounds in Dietary Supplements and Dietary Ingredients Containing Echinacea, Sep. 22, 2017, AOAC International.
Stukelj, et al., "Direct measurement of amorphous solubility," Analytical Chemistry, 2019.
Suarez-Quiroz et al., "Isolation of green coffee chlorogenic acids using activated carbon, Journal of Food Composition and Analysis," 2014, 33:55-58.
SUNUP® Commercially available stevia sweetened green coffee bean beverage, purchased Jun. 2018.
Sweet Drops™ Liquid Stevia Product, 2012.
Tanaka, O., "Improvement of taste of natural sweeteners," Pure & Appl. Chem., 69(4):975-683, 1997.
Trugo et al., Chlorogenic Acid Composition of Instant Coffees, Analyst, Mar. 1984, vol. 109, pp. 263-266.
Tyrer, D., "The theory of solubility," The Journal of Physical Chemistry, 1912.
Written Opinion of WO 2012/082587, Jun. 13, 2013.
Upreti, Mani et al., "Solubility Enhancement of Steviol Glycosides and Characterization of Their Inclusion Complexes with Gamma-Cyclodextrin", Int. J. Mol. Sci. 2011, 12, 7529-7553.
Weidel et al., "A Rapid Method for Quantifying Chlorogenic Acid Levels in Potato Samples," Journal of AOAC International, vol. 97, No. 3, Nov. 3, 2014.
Whole Foods 365 Stevia Extract Liquid, 2012.
Wildermuth et al., "Chlorogenic acid oxidation and its reaction with sunflower proteins to form green-colored complexes," Comprehensive Reviews in Food Science and Food Safety, 2016, vol. 15, 829-843.
Abeywardena M. Y., et al. (2010) Acute administration of chlorogenic acid reduces blood pressure in the rat. Hypertension 55, 1493 [abstract 002]. DOI:10.1161/HYP.0b013e3181df4279.
Albas C. S., et al (2014) Avaliação da genotoxicidade da Ilex paraguariensis (erva mate) pelo teste do micronúcleo / [Evaluation of the genotoxicity of Ilex paraguariensis (yerba mate) by micronucleus test]. Rev. Bras. Plantas Med. 16, 2, Suppl 1, 345-349 [Portuguese, English abstract]. DOI:10.1590/1983-084X/12_058.
Alkhatib A. and Atcheson, R. (2017) Yerba maté (ilex paraguariensis) metabolic, satiety, and mood state effects at rest and during prolonged exercise. Nutrients 9, 882 [15pp]. DOI:10.3390/nu9080882.
Baeza Gema et al: "Dihydrocaffeic acid, a major microbial metabolite of chlorogenic acids, shows similar protective effect than a yerba mate phenolic extract against oxidative stress in HepG2 cells", Food Research International, Elsevier, Amsterdam, NL, vol. 87, Jun. 17, 2016 (Jun. 17, 2016), pp. 25-33, XP029671195, ISSN: 0963-9969, DOI:10.1016/J.FOODRES.2016.06.011.
Balsan G., et al. (2019) Effect of yerba mate and green tea on paraoxonase and leptin levels in patients affected by overweight or obesity and dyslipidemia: a randomized clinical trial. Nutr. J. 18, 5 [10pp]. DOI: 10.1186/s12937-018-0426-y.
Bariana D. S., et al. (1965) Chlorogenic acid: further evidence for its antigenic and allergenic activity. Nature 207, 1155-1157. DOI:10.1038/2071155a0.
Bidau C. J., et al. (2004) Evaluation of the genotoxicity of aqueous extracts of Ilex paraguariensis St. Hil. (Aquifoliaceae) using the Allium test. Cytologia 69, 109-117. DOI:10.1508/cytologia.69.109.
Boaventura B. C., et al (2012) Association of mate tea (Ilex paraguariensis) intake and dietary intervention and effects on oxidative stress biomarkers of dyslipidemic subjects. Nutrition 28, 657-664. DOI:10.1016/j.nut.2011.10.017.
Boaventura B. C., et al (2013) Antioxidant potential of mate tea (Ilex paraguariensis) in type 2 diabetic mellitus and pre- diabetic individuals. J. Funct. Foods 5, 1057-1064. DOI:10.1016/j.jff.2013.03.001.
Boaventura B. C., et al (2015) Effect of yerba mate (Ilex paraguariensis A. St. Hil.) infusion obtained by freeze concentration technology on antioxidant status of healthy individuals. LWT Food Sci. Technol. 62, 948-954. DOI:10.1016/j.lwt.2015.02.028.

(56) References Cited

OTHER PUBLICATIONS

Boaventura, B. C. B., et al (2013). Enhancement of bioactive compounds content and antioxidant activity of aqueous extract of mate (Ilex paraguariensis A. St. Hil.) through freeze concentration technology. Food Research International, 53, 686e692.

Borges M. C., et al. (2013) The effect of mate tea (Ilex paraguariensis) on metabolic and inflammatory parameters in high-fat diet-fed Wistar rats. Int. J. Food Sci. Nutr. 64, 561-569. DOI:10.3109/09637486.2012.759188.

Bortoluzzi M.-C., et al (2014) Frequency of micronucleus in oral epithelial cells after exposure to mate-tea in healthy humans. Med. Oral Patol. Oral Cir. Bucal. 19, e345-e349. DOI:10.4317/medoral.19570.

Carvalho Ribeiro M., et al.(2017) The effects of roasted yerba mate (Ilex paraguariensis A. St. Hil.) consumption on glycemia and total serum creatine phosphokinase in patients with traumatic brain injury. J. Funct. Foods 28, 240-245. DOI:10.1016/j.jff.2016.11.

Chaube S. and Swinyard C. A. (1976) Teratological and toxicological studies of alkaloidal and phenolic compounds from Solanum tuberosum L. Toxicol. Appl. Pharmacol. 36, 227-237. DOI:10.1016/0041-008X(76)90002-8.

Chen J., et al. (2018) Dietary chlorogenic acid improves growth performance of weaned pigs through maintaining antioxidant capacity and intestinal digestion and absorption function. J. Anim. Sci. 96, 1108-1118. DOI:10.1093/jas/skx078.

Cuesta A., et al (2018) Efecto agudo del consumo de yerba mate (Ilex paraguariensis) sobre el ritmo cardíaco en pacientes derivados para estudio Holter [Acute effect of yerba mate (Ilex paraguariensis) consumption on heart rhythm in patients referred for Holter study] [epub ahead of print]. Arch. Cardiol. Mex. xxx, Jun. 2, 2018 [1-6] [Spanish, English abstract]. DOI:10.1016/j.acmx.2018.05.004.

De Andrade F., Coehlo de Albuquerque C. A., Maraschin M. and da Silva E. L. (2012) Safety assessment of yerba mate (Ilex paraguariensis) dried extract: results of acute and 90 days subchronic toxicity studies in rats and rabbits. Food Chem. Toxicol. 50, 328-334. DOI:10.1016/j.fct.2011.08.028.

De Meneses Fujii et al. (2014) Yerba Mate (Ilex paraguariensis) modulates NF-kappaB pathway and AKT expression in the liver of rats fed on a high-fat diet. Int. J. Food Sci. Nutr. 65, 967-976. DOI:10.3109/09637486.2014.945153.

de Morais E. C., et al (2009) Consumption of yerba mate (Ilex paraguariensis) improves serum lipid parameters in healthy dyslipidemic subjects and provides an additional LDL-cholesterol reduction in individuals on statin therapy. J. Agric. Food Chem. 57, 8316-8324. DOI:10.1021/jf901660g.

Eklund A. (1975) Effect of chlorogenic acid in a casein diet for rats. Nutritional and pathological observations. Nutr. Metab. 18, 258-264. DOI:10.1159/000175603.

Enokuchi Y., et al. (2020) Effects of chlorogenic acids on menopausal symptoms in healthy women: a randomized, placebo-controlled, double-blind, parallel-group trial. Nutrients 12, 3757 [12pp]. DOI:10.3390/nu12123757.

Erk T., et al. (2012) Dose-dependent absorption of chlorogenic acids in the small intestine assessed by coffee consumption in ileostomists. Mol. Nutr. Food Res. 56, 1488-1500. DOI:10.1002/mnfr.201200222.

Folwarczna J., et al. (2012) Effects of caffeic and chlorogenic acids on bone mechanical properties in female rats. Bone 50, Suppl. 1, S158 [abstract PP306]. DOI:10.1016/j.bone.2012.02.495.

Fonseca C. A., et al.(2000) Nontoxic, mutagenic, and clastogenic activities of mate-chimarrao (Ilex paraguariensis). J. Environ. Pathol. Toxicol. Oncol. 19, 333-346.

Frank J., et al. (2003) The dietary hydroxycinnamate caffeic acid and its conjugate chlorogenic acid increase vitamin E and cholesterol concentrations in Sprague-Dawley rats. J. Agric. Food Chem. 51, 2526-2531. DOI:10.1021/jf026127k.

Freedman S. O., et al. (1961) Chlorogenic acid: an allergen in green coffee bean. Nature 192, 241-243. DOI: 10.1038/192241a0.

Freedman S. O., et al. (1964) Antigenic and allergenic properties of chlorogenic acid man, rabbit, guinea pig. Can. Med. Assoc. J. 90, 473-474.

Gebara K. S., et al. (2020) A randomized crossover intervention study on the effect a standardized maté extract (Ilex paraguariensis A. St.-Hil.) in Men predisposed to cardiovascular risk. Nutrients, 13, 14 [14pp]. DOI:10.3390/nu13010014.

Giordani, Antonio, "The amorphous form in drug development," Crystal Forms, 2012.

Gómez-Juaristi M., Martínez-López S., Sarria B., Bravo L. and Mateos R. (2018) Absorption and metabolism of yerba mate phenolic compounds in humans. Food Chem. 240, 1028-1038. DOI:10.1016/j.foodchem.2017.08.003.

Gonthier M.-P., et al. (2006) Microbial metabolism of caffeic acid and its esters chlorogenic and caftaric acids by human faecal microbiota in vitro. Biomed. Pharmacother. 60, 536-540. DOI:10.1016/j.biopha.2006.07.084.

Grzesiuk J. D., et al (2012) Evaluation of mutagenicity and antimutagenicity of Ilex paraguariensi} A. St.-Hil.: Aquifoliaceae infusion on Allium cepa assay. Arq. Cienc. Saude UNIPAR 16, 73-78. DOI:10.25110/arqsaude. v1612.2012.4840.

Gu R., et al. (2007) Simultaneous determination of 1,5-dicaffeoylquinic acid and its active metabolites in human plasma by liquid chromatography-tandem mass spectrometry for pharmacokinetic studies. J. Chromatogr. B. 852, 85-91. DOI:10.1016/j.jchromb.2006.12.055.

Hernandes L. C., et al. (2016) Cytotoxicity and genotoxicity of chlorogenic acid alone or associated with the demethylating drug 5-azacytidine in Jurkat cells. Toxicol. Lett. 258, Suppl. S, S56 [abstract OSC01-007]. DOI:10.1016/j.toxlet.2016.06.1295.

IARC (1991) Mate. In Coffee, Tea, Mate, Methylxanthines and Methylglyoxal. IARC Working Group, Feb. 27-Mar. 6, 1990, Lyon. IARC Monographs on the Evaluation of Carcinogenic Risks to Humans, vol. 51, pp. 273-287. World Health Organization (WHO), International Agency for Research on Cancer (IARC).

IARC (2018) Drinking mate and very hot beverages. In Drinking Coffee, Mate, and Very Hot Beverages. Expert Opinions of IARC Working Group on the Evaluation of Carcinogenic Risks to Humans, May 24-31, 2016, Lyon, France. IARC Monographs on the Evaluation of Carcinogenic Risks to Humans, vol. 116, pp. 427-496. Lyon, France: International Agency for Research on Cancer (IARC), Lyon, France.

International Search Report and Written Opinion mailed Jul. 28, 2020 of PCT/US2020/026524 (14 pages).

Jin S., et al. (2015) Chlorogenic acid improves late diabetes through adiponectin receptor signaling pathways in db/db mice. PLoS ONE 10, e0120842 [15pp]. DOI:10.1371/journal.pone.0120842.

Journal of the Brewing Society of Japan, 1959, vol. 54, No. 4, pp. 239-242.

Kato M., et al. (2018) Effect of chlorogenic acid intake on cognitive function in the elderly: a pilot study. Evid. Based. Complement. Alternat. Med. 2018, Article ID 8608497 [8pp]. DOI:10.1155/2018/8608497.

Kim H. J., et al. (2012) Effect of green mate in overweight volunteers: a randomised placebo-controlled human study. J. Funct. Foods 4, 287-293. DOI: 10.1016/j.jff.2011.12.005.

Kim S.-Y., et al. (2015) Anti-obesity effects of Yerba Mate (Ilex paraguariensis): a randomized, double-blind, placebo-controlled clinical trial. BMC Complement. Altern. Med. 15, 338 [8pp]. DOI:10.1186/s12906-015-0859-1.

Klein G. A., et al (2011) Mate tea (Ilex paraguariensis) improves glycemic and lipid profiles of type 2 diabetes and pre-diabetes individuals: a pilot study. J. Am. Coll. Nutr. 30, 320-332.

Kujawska M (2018) Yerba mate (Ilex paraguariensis) beverage: nutraceutical ingredient or conveyor for the intake of medicinal plants? Evidence from Paraguayan folk medicine. Evid. Based. Complement. Alternat. Med. 2018, Article ID 6849317 [17pp]. DOI:10.1155/2018/6849317.

Laird Layton L., et al. (1964) Pure chlorogenic acid is not allergenic in atopy to green coffee: A specific protein probably is involved. Nature 203, 188-189. DOI:10.1038/203188a0.

(56) References Cited

OTHER PUBLICATIONS

Leitão A. C. and Braga R. S. (1994) Mutagenic and genotoxic effects of mate (llex paraguariensis) in prokaryotic organisms. Braz. J. Med. Biol. Res. 27, 1517-1525.

Lin M., et al. (2013) Evaluation of the potential sensitization of chlorogenic Acid: a meta-analysis. Evid. Based. Complement. Alternat. Med. 2013, Article ID 208467 DOI:10.1155/2013/208467.

Liu B., et al. (2017) Preparation, phytochemical investigation, and safety evaluation of chlorogenic acid products from Eupatorium adenophorum. Molecules 22, 67 [12pp]. DOI:10.3390/molecules22010067.

Liu Z., et al. (2010) Evaluation of the immunosensitizing potential of chlorogenic acid using a popliteal lymph node assay in BALB/c mice. Food Chem. Toxicol. 48, 1059-1065. DOI:10.1016/j.fct.2010.01.024.

Ana Covarrubias-Cárdenas et al., "Antioxidant Capacity and UPLC-PDA ESI-MS Phenolic Profile of Stevia rebaudiana Dry Powder Extracts Obtained by Ultrasound Assisted Extraction", Agronomy, vol. 8, No. 9, Aug. 31, 2018 (Aug. 31, 2018), p. 170.

Analysis of the chemical constituents of Stevia rebausiana and its sweetness Reb M structure, Mar. 20, 2012, Journal of Beijing University of Chemical Technology (Natural Science).

Anonymous, "Sparkling Organic Grapefruit Ginger Soda", GNPD 2012, retrieved from www.gnpd.com Database accession No. 1790955.

Anonymous, "Stevia production process | Cargill No. calories sweeteners | Cargill", Nov. 4, 2020 (Nov. 4, 2020), Retrieved from the Internet: URL:https://www.cargill.com/food-beverage/emea/stevia-based-sweeteners-production-process.

Anonymous, "Steviol Glycosides Based Table Sweetener", GNPD14 Dec. 2018 (Dec. 14, 2018), Database accession No. 6205393.

Aranda Gonzalez, et al., "Effect of different drying methods on the composition of steviol glycosides in Stevia rebaudiana Bertoni leaves," Int. Agrophys., 2017, 31, 139-144.

Arthur, R., "The stevia story has changed!' PureCircle on the evolution of the natural sweetener," Mar. 11, 2019, Beveragedaily.com.

Augustijns and Brewster, "Solvent systems and their selection in pharmaceutics and biopharmaceutics," Springer, 2009.

Bartoshuk et al., "Sweet Taste of Water Induced by Artichoke," Dec. 1, 1972, Science, 178 (4064), 988-990.

Berte et al. (2011) J. Agric. Food Chem. 59: 5523-5527. (Year: 2011).

Brent, Rhea, "Investigating differences in solubility between crystalline and amorphous forms of pharmaceuticals," AstraZeneca, Mat 2006.

Brittain, Harry, "Thermodynamic vs. kinetic solubility: knowing which is which," American Pharmaceutical Review, 2014.

Chang, et al., "Stability studies of stevioside and Rebaudioside A in carbonated beverages," J. Agric. Food Chem., 1983, 31, 409-412.

Chiou, et al., "A comparison of crystallisation approaches in spray drying," Jounral of Food Engineering, 2008.

Cilliers, et al., "Total polyphenols in apples and ciders; correlation with chlorogenic acid," Journal of Food Science, vol. 55, No. 5, 1990, pp. 1458-1459.

Clifford, "Chlorogenic acids and other cinnamates—nature, occurance, and dietary burden," Journal of the Science of Food and Agriculture, 79:362-372 (1999).

Coquerel, Gerard, "Crystallization of molecular systems from solution: phase diagrams, supersturation, and other basic concepts," Chem Soc Rev, 2014.

Craig et al., "Performance review of a fast HPLC-UV method for the quantification of chorogenic acids in green coffee bean extracts," Talanta, 154 (2016) 481-485.

Crammer and R I Kan B: "Properties and syntheses of sweetening agents", Chemical Society Reviews, Royal Society of Chemistry, UK, vol. 6, Jan. 1, 1977 (Jan. 1, 1977), pp. 431-465, XP009150156, ISSN: 0306-0012 p. 437, paragraph 2—p. 438, paragraph 1.

Cros et al., "Solvent Extraction of Oil and Chlorogenic Acid from Green Cofffee Part I: Equilibrium Data," Journal of Food Engineering 10 (1989) 1-11.

Deladino L., et al., "Major phenolics in Yerba mate extracts(llex paraguariensis) and their contribution to the total antioxidant capacity," Food and Nutritional Science, 4, 2013.

Douglass, et al., "Kinetics of dissolution of an amorphous solid," J. Phys. Chem. B, 2018.

Dubois, G. E., et al., "Concentration-Response relationship of sweeteners," ACS Syposium Series, 1991.

Edgar Naegele, "Determination of Chlorogenic Acid in Coffee Products According to DIN 10767," Sep. 1, 2016, Agilent Technology, INC.

Fu et al., "Production of chlorogenic acid and its derivatives in hairy root cultures of Stevia rebaudiana," Jan. 14, 2015, Journal of Agricalatural and Food Chemistry, 63(1):262-268.

Gawel-Beben et al., "Stevia rebuadiana Bert. Leaf extracts as a multifunctional source of natural antioxidants," Molecules, Mar. 27, 2015.

Murdande, et al., "Aqueous solubility of crytalline and amorphous drugs: challenges in measurement," Pharmaceutical Development and Technology, 2011.

Hancock, B. C., et al. "What is the true solubility advantage for amorphous pharmaceuticals?," Pharm Res, 17:397-404, 2000.

Hernandez T et al., "Variations in the phenolic composition of fruit juices with different treatments, " European Food Research and Technology, vol. 204, No. 2, 1997, p. 151-155.

Hildebrand, Joel, "Theory of solubility," Physical Review, 1923.

Islam, et al., "Particle crystallization during spray drying in humid air," Journal of Food Engineering, 2010.

Jeon et al., "Contents of chlorogenic acids and caffeine in various coffee-related products," Journal of Advanced Research, 17 (2019), 85-94.

Julia Y.Q. Low et al, "Psychophysical Evaluation of Sweetness Functions Across Multiple Sweeteners", Chemical Senses., vol. 42, No. 2, Oct. 20, 2016 (Oct. 20, 2016), p. 111-120.

Kellie P Burris et al, "Composition and Bioactive Properties of Yerba Mate (llex paraguariensis A. St.-Hil.): A Review", Chillán Jun. 2012 (Jun. 2012), p. 268-275.

Kremr et al., "Unremitting Problems with Chlorogenic Acid Nomenclature: A Review," Quim. Nova, vol. 39, No. 4, 530-533, 2016.

Kren, V., et al., "Glycosides in Medicine: The Role of Glycosidic Residue in Biological Activity", Current Medicinal Chemistry, 2001, 8, 1313-1338.

Kroyer, G., "Stevioside and Stevia-sweetener in food: application, stability and interaction with food ingredients," J. Verbr. Lebensm., 2010, 5:225-229.

Ky et al., "Camparison of Five Purification Methods for Chlorogenic Acids in Green Coffee Beans (Coffea sp.)," J. Agric. Food Chem. 1997, 45, 786-790, obtained from https://horizon.documentation.ird.fr/exl-doc/pleins_textes/pleins_textes_6/b_fdi_47-48/010010457.pdf.

Lee et al., "Chicoric acid: chemistry distribution, and production," Frontiers in Chemistry, 2013, 1(40).

Liquid Stevia and Liquid Stevia (flavored) from Stevita Co., 2012.

Maietta et al., "Artichoke (Cynara cardunculus L. var. scolymus) waste as a natural source of carbonyl trapping and antiglycative agents," Food Research International, 100 (2017) 780-790.

Murdande, et al., "Solubility Advantage of amorphous pharmaceuticals: I. A thremodynamic analysis," Wiley InterScience, 2009.

Murshedkav, Tooba, "Effect of crystalline to amorphous coversion on solubility of cefuroxime axetil," Univeristy of Rhode Island, 2002.

Meinhart et al., "Analysis of chlorogenic acids isomers and caffeic acid in 89 herbal infusions (tea)," Journal of Food Composition and Analysis, 73 (2018) 76-82.

Meinhart et al., "Chlorogenic acid isomer contents in 100 plants commercialized in Brazil," Food Research International, 99 (2017) 522-530.

Meireles et al., "Stevia (Stevia rebaudiana Bertoni):—Futuristic view of the sweeter side of life," Floriculture, Ornamental and Plant Biotechnology Volumn IV, 2006, Global Science Books.

Miura et al., "Molecularly imprinted polymer for chlorogenic acid by modified precipitation polymerization and its application to

(56) References Cited

OTHER PUBLICATIONS extraction of chlorogenic acid from Eucommia ulmodies leaves," Journal of Pharmaceutical and Biomedical Analysis, 114 (2015) 139-144.

Liu Na, et al., "Review on Stevia rebaudiana research abroad in 2015", Sugar Crops of China. 2017, 39(1): 57-64.

Wang Shaojia, et al., "Progress of functional components in Stevia rebaudiand Bertoni", Science and Technology of Food Industry. 2017, vol. 38, No. 20.

Molina-Calle et al., "Development and application of a quantitative method based on LC-QqQ MS/MS for determination of steviol glycosides in Stevia leaves", Talanta 154 (2016) 263-269.

Pimpley et al. "The chemistry of chlorogenic acid from green coffee and its role in attenuation of obesity and diabetes" at https://pubmed.ncbi.nim.nih.gov/32633686. (Year: 2020).

Amazon [online], Aug. 7, 2012 [Retrieval Date: Mar. 28, 2024], Internet: <URL: https://amzn.asia/d/jcWACRC>.

Hariprasad "Cocrystals of Ethenzamide: Study of Structural and Physicochemical Properties", Cryst. Growth Des. 2016; 16: 4473-4481 (Year: 2016).

Kuminek "Cocrystals to facilitate delivery of poorly soluble compounds beyond-rule-of-5", Adv. Drug Deliv. Rev. 2016; 101: 143-166 (Year: 2016).

Lorena Deladino et al: "Major Phenolics in Verba Mate Extracts (Ilex paraguariensis) and Their Contribution to the Total Antioxidant Capacity", Food and Nutrition Sciences, vol. 04, Aug. 1, 2013 (Aug. 1, 2013), pp. 154-162, XP055588480, ISSN: 2157-944X, DOI: 10.4236/fns.2013.48A019.

Lowell F. C. (1965) Allergenicity of chlorogenic acid. J. Allergy 36, 308. DOI:10.1016/0021-8707(65)90091-2.

Marques V. X. and Farah A. (2010) Urinary excretion of chlorogenic acids and metabolites in humans after green mate (I. paraguariensis) consumption. FASEB J. 24, 1, Suppl., [abstract 922.1]. DOI:10.1096/fasebj.24.1_supplement.922.1.

Masuda, et al., "Powder Technology Handbook," Taylor & Francis, 2006.

Matsumoto R. L. T., et al. (2009) Effects of maté tea (Ilex paraguariensis) ingestion on mRNA expression of antioxidant enzymes, lipid peroxidation, and total antioxidant status in healthy young women. J. Agric. Food Chem. 57, 1775-1780. DOI:10.1021/jf803096g.

Meilgaard MC, Civille GV, and Carr BT (2007). Sensory Evaluations Techniques, CRC Press, Boca Raton, FL.

Mello F. W., et al. (2018) Maté consumption association with upper aerodigestive tract cancers: a systematic review and meta-analysis. Oral Oncol. 82, 37-47 [plus supplementary data]. DOI:10.1016/j.oraloncology.2018.04.023.

Messina D., et al. (2017) Maté tea and lipid profile in overweight women under caloric restriction. Ann Nutr. Metab. 71, 384 [abstract 144-1131]. DOI:10.1159/000480486.

Mikulasova M., et al. (2005) Genotoxic effects of the hydroxycinnamic acid derivatives—caffeic, chlorogenic and cichoric acids. Biologia (Bratisl.) 60, 275-279.

Minuzzi Becker A., et al. (2019) Spray-dried yerba mate extract capsules: clinical evaluation and antioxidant potential in healthy individuals. Plant oods Hum. Nutr. 74, 495-500 [plus supplementary tables]. DOI:10.1007/s11130-019-00764-4.

Miranda D. D. C., et al. (2008) Protective effects of mate tea (Ilex paraguariensis) on H2O2-induced DNA damage and DNA repair in mice. Mutagenesis 23, 261-265. DOI:10.1093/mutage/gen011.

Moeenfard, et al., "Quantification of Caffeoylquinic Acids in Coffee Brews by HPLC-DAD," Journal of Analytical Methods in Chemistry, Dec. 21, 2014.

Monteiro M., et al. (2007) Chlorogenic acid compounds from coffee are differentially absorbed and metabolized in humans. J. Nutr. 137, 2196-2201. DOI:10.1093/jn/137.10.2196.

Moura de Oliveira D., et al. (2017) Bioavailability of chlorogenic acids in rats after acute ingestion of maté tea (Ilex paraguariensis) or 5-caffeoylquinic acid. Eur. J Nutr. 56, 2541-2556. DOI:10.1007/s00394-016-1290-1.

Nakamura S., et al. (2006) [Pharmacokinetics of chlorogenic acids absorbed in human plasma and their metabolites following oral ingestion of coffee drink]. Yakuri To Chiryo [Jpn. Pharmacol. Ther.] 34, 1239-1246.

Naylor L. H., et al. (2021) Acute dose-response effect of coffee-derived chlorogenic acids on the human vasculature in healthy volunteers: a randomized controlled trial. Am. J. Clin. Nutr. 113, 370-379. DOI:10.1093/ajcn/nqaa312.

Nowacki L. C., et al. (2021) llex paraguariensis extract as an alternative to pain medications. Acta Pharm. 71, 383-398. DOI:10.2478/acph-2021-0029.

Ochiai R., et al. (2019) Effect of chlorogenic acids on cognitive function in mild cognitive impairment: a randomized controlled crossover trial. J. Alzheimers Dis. 72, 1209-1216 [plus supplementary tables]. DOI:10.3233/jad-190757.

Olthof M. R., et al. (2001a) Consumption of high doses of chlorogenic acid, present in coffee, or of black tea increases plasma total homocysteine concentrations in humans. Am. J. Clin. Nutr. 73, 532-538. DOI:10.1093/ajcn/73.3.532.

Olthof M. R., et al. (2001b) Chlorogenic acid and caffeic acid are absorbed in humans. J. Nutr. 131, 66-71. DOI:10.1093/jn/131.1.66.

Olthof M. R., et al. (2003) Chlorogenic acid, quercetin-3-rutinoside and black tea phenols are extensively metabolized in humans. J. Nutr. 133, 1806-1814 [erratum, 133, 2692]. DOI:10.1093/jn/133.6.1806.

Onakpoya I. J., et al. (2015) The effect of chlorogenic acid on blood pressure: a systematic review and meta-analysis of randomized clinical trials. J. Hum. Hypertens. 29, 77-81 [plus supplementary data]. DOI: 10.1038/jhh.2014.46.

Park I., et al. (2017) Effects of subacute ingestion of chlorogenic acids on sleep architecture and energy metabolism through activity of the autonomic nervous system: a randomised, placebo-controlled, double-blinded cross-over trial. Br. J. Nutr. 117, 979-984. DOI:10.1017/S0007114517000587.

Pereira Panza V., et al. (2019) Effect of mate tea (Ilex paraguariensis) on the expression of the leukocyte NADPH oxidase subunit p47phox and on circulating inflammatory cytokines in healthy men: a pilot study. Int. J. Food Sci. Nutr. 70, 212-221DOI:10.1080/09637486.2018.1486393.

Phenolaeis.com Accessed Aug. 24, 2022 Palm Fruit Extract compositions and applications.

Phenolaeis.com Accessed Sep. 9, 2020 Palm Fruit Bioactives Complex.

Plumb G. W., et al. (1999) Metabolism of chlorogenic acid by human plasma, liver, intestine and gut microflora. J. Sci. Food Agric. 79, 390-392. DOI:10.1002/(SICI)1097-0010(19990301)79:3<390::AID-JSFA258>3.0.CO;2-0.

Prakash et al., "Catalytic Hydrogenation of the Sweet Principles of Stevia rebaudiana, Rebaudioside B, Rebaudioside C, and Rebaudioside D and Sensory Evaluation of Their Reduced Derivatives", Int. J. Mol. Sci. 2012, 13, 15126-15136; doi:10.3390/ijms 131115126.

Prakash Indra et al: "Synthesis and Sensory Evaluation of ent-Kaurane Diterpene Glycosides", MOLECULES, [Online] vol. 17, No. 8, Jan. 1, 2012 (Jan. 1, 2012), pp. 8908-8916, XP055839039, DOI: 10.3390/molecules 17088908 Retrieved from the Internet: URL:https://www.ncbi.nlm.nih.gov/pmc/artic les/PMC6268950/pdf/molecules-17-08908.pdf> [retrieved on Aug. 5, 2021].

Renouf M., et al. (2014) Dose-response plasma appearance of coffee chlorogenic and phenolic acids in adults. Mol. Nutr. Food Res. 58, 301-309. DOI:10.1002/mnfr.201300349.

Richling E., et al. (2012) Dose-response relationship of chlorogenic acids in humans. Naunyn Schmiedebergs ArchPharmacol. 385, S75 [abstract 327]. DOI:10.1007/s00210-012-0736-0.

Rocha D. S., et al. (2018) Effect of yerba mate (Ilex paraguariensis) extract on the metabolism of diabetic rats. Biomed. Pharmacother. 105, 370-376 [plus supplementary figure]. DOI:10.1016/j.biopha.2018.05.132.

Rogerio De Sousa W., et al. (2019) Evaluation of reproductive toxicology of aqueous extract of yerba mate (Ilex paraguariensis A. St.-Hil.), a traditional South American beverage. J. Med. Food 22, 97-101. DOI:10.1089/jmf.2018.0060.

(56) References Cited

OTHER PUBLICATIONS

Sanchez Boado L., et al.(2018) Effects of llex paraguariensis polyphenols on magnesium absortion and iron bioavailability: preliminary study. J. Food Res. 7, 114-126. DOI:10.5539/jfr.v7n2p114.
Sarria B., et al. (2020a) Yerba mate may prevent diabetes according to a crossover, randomized, controlled study in humans. Proc. Nutr. Soc. 79, OCE2, E245 DOI:10.1017/S0029665120001937.
Sarria B., et al. (2020b) Yerba mate improves cardiovascular health in normocholesterolemic and hypercholesterolemic subjects. Proc. Nutr. Soc. 79, OCE2, E635. DOI: 10.1017/S0029665120005844.
Shinomiya K., et al. (2004) Effects of chlorogenic acid and its metabolites on the sleep-wakefulness cycle in rats. Eur. J. Pharmacol. 504, 185-189. DOI:10.1016/j.ejphar.2004.09.054.
Simao Do Carmo L., et al. (2013) The effects of yerba maté (llex paraguariensis) consumption on IL-1, IL-6, TNF-α and IL-10 production by bone marrow cells in Wistar rats fed a high-fat diet. Int J Vitam Nutr Res 83, 26-35. DOI:10.1024/0300-9831/a000142.
Sirima Puangpraphant et al.: "Dicaffeoylquinic acids in Verba mate (llex paraguariensis St. Hilaire) inhibit NF-&kgr;B nucleus translocation in macrophages and induce apoptosis by activating caspases-8 and -3 in human colon cancer cells", Molecular Nutrition & Food Research, vol. 55, No. 10, Oct. 8, 2011 (Oct. 8, 2011), pp. 1509-1522, XP055175515, ISSN: 1613-4125, DOI: 10.1002/mnfr.201100128.
Song Z., et al. (2014) [Effect of chlorogenic acid at high dose on expression of hepatic inflammatory cytokines mRNA induced by lipopolysaccharides]. Ying Yang Xue Bao [Acta Nutr. Sin.] 36, 481-485.
Song, "Lenalidomide-Gallic Acid Cocrystals with Constant High Solubility", Crystal Growth & Design, 2015, 15, pp. 4869-4875.
Souza S. J., et al. (2017) Effect of chocolate and mate tea on the lipid profile of individuals with HIV/AIDS on antiretroviral therapy: A clinical trial. Nutrition 43-44, 61-68. DOI:10.1016/j.nut.2017.06.017.
Stalmach A., et al. (2009) Metabolite profiling of hydroxycinnamate derivatives in plasma and urine after the ingestion of coffee by humans: identification of biomarkers of coffee consumption. Drug Metab. Dispos. 37, 1749-1758. DOI:10.1124/dmd.109.028019.
Stalmach A., et al. (2010) Bioavailability of chlorogenic acids following acute ingestion of coffee by humans with an ileostomy. Arch. Biochem. Biophys. 501, 98-105. DOI:10.1016/j.abb.2010.03.005.
Stich H. F., et al. (1981) A comparative genotoxicity study of chlorogenic acid (3-O-caffeoylquinic acid). Mutat. Res. 90, 201-212. DOI:10.1016/0165-1218(81)90001-X.
Suzuki A., et al. (2006) Chlorogenic acid attenuates hypertension and improves endothelial function in spontaneously hypertensive rats. J. Hypertens. 24, 1065-1073. DOI:10.1097/01.hjh.0000226196.67052.c0.
U.S. FDA (1993) Appendix I. Table 14. Conversion table for test chemical treatment doses used in PAFA. In Priority Based Assessment of Food Additives (PAFA) Database. U.S. Food and Drug Administration (U.S. FDA), Center for Food Safety & Applied Nutrition (CFSAN), Washington, DC, p. 58.

U.S. FDA (2018) Part 182-Substances generally recognized as safe. Section §182.20-Essential oils, oleoresins (solvent-free), and natural extractives (including distillates). In: U.S. Code of Federal Regulations (CFR). Title 21: Food and Drugs. (U.S. Food and Drug Administration). U.S. Government Printing Office (GPO), Washington, DC.
Vargas Alves R. J., et al. (2008) The evaluation of maté (llex paraguariensis) genetic toxicity in human lymphocytes by the cytokinesis-block in the micronucleus assay. Toxicol. In Vitro 22, 695-698. DOI:10.1016/j.tiv.2007.11.005.
Wang Y., et al. (2018) [Effects of chlorogenic acid on growth performance, serum immunoglobulins, intestinal mucosa morphology, digestive and absorptive capacity of piglets]. Chin. J. Anim. Nutr. 30, 1136-1145 [DOI:10.7506/spkx1002-6630-201709026.
Wantanabe T., et al. (2019) Coffee abundant in chlorogenic acids reduces abdominal fat in overweight adults: a randomized, double-blind, controlled trial. Nutrients 11, 1617 [13pp]. DOI:10.3390/nu11071617.
Wei Z.-M., et al. (2010) [Clinical tolerability of 1,5-dicaffeoylquinic acid tablets]. Zhongguo Xin Yao Za Zhi [Chin. J. New Drugs] 19, 106-108.
Wnuk M., et al. (2009) Evaluation of the cyto- and genotoxic activity of yerba mate (llex paraguariensis) in human lymphocytes in vitro. Mutat. Res. 679, 18-23. DOI:10.1016/j.mrgentox.2009.07.017.
Yang B., et al. (2005) Metabolic profile of 1,5-dicaffeoylquinic acid in rats, an in vivo and in vitro study. Drug Metab. Dispos. 33, 930-936. DOI:10.1124/dmd.104.002154.
Yara Queiroz et al: The Chlorogenic Acid and Caffeine Content of Verba Mate (llex paraguariensis) Beverages11, Jan. 1, 2005 (Jan. 1, 2005), pp. 91-95, XP055715126, Retrieved from the Internet: URL:https://media.enfasis.com/adjuntos/146 /documentos/000/134/0000134821.pdf [retrieved on Jul. 15, 2020].
Yu S., et al. (2015) Yerba mate (llex paraguariensis) improves microcirculation of volunteers with high blood viscosity: a randomized, double-blind, placebo-controlled trial. Exp. Gerontol. 62, 14-22 [plus supplementary tables]. DOI:10.1016/j.exger.2014.12.016.
Zhu Y., et al. (2017) [Effect of caffeine and chlorogenic acid on body weight, lipid accumulation and the expression of lipid metabolism-related genes in high-fat diet-fed mice]. Shipin Kexue [Food Sci.] 38, 162-167 DOI:10.7506/spkx1002-6630-201709026.
Zuniga L. Y., et al. (2018) Effect of chlorogenic acid administration on glycemic control, insulin secretion, and insulin sensitivity in patients with impaired glucose tolerance. J. Med. Food 21, 469-473. DOI:10.1089/jmf.2017.0110.
Alibaba ] [Online], "Yerba mate herbal tea", Online available at < <URL:https://japanese.alibaba.com/g/yerba-mate-herbal-tea.html, Dec. 25, 2024, 5 pages.
Alma Japan] [Online], "Yerba Mate Organic Lemon Ginger Tea", Online available at << URL:https://www.almajapan.com/product.asp?CD=MJ0006>, Dec. 25, 2024, 2 pages.
Amazon [Online], May 16, 2018 [search date Dec. 25, 2024], Internet "BALIBETOV Stainless Steel Double Wall Mate Cup and Bombilla Set—Yerba Mate Set includes 1 Yerba Mate Cup, 2 Bombillas Mate and Brush—Easy Care (Black)", Online Available at << URL:https://amzn.asia/d/3fGkSL6>.

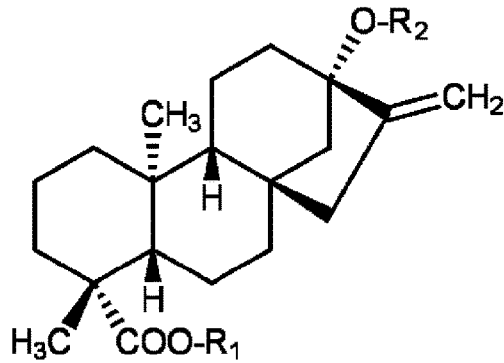

| Compound Name | R₁ (C-19) | R₂ (C-13) |
|---|---|---|
| 1. Steviol | H | H |
| 2. Steviolmonoside | H | β-Glc |
| 3. Rubusoside | β-Glc | β-Glc |
| 4. Steviolbioside | H | β-Glc-β-Glc(2→1) |
| 5. Stevioside | β-Glc | β-Glc-β-Glc(2→1) |
| 6. Rebaudioside A | β-Glc | β-Glc-β-Glc(2→1)<br>    \|<br>β-Glc(3→1) |
| 7. Rebaudioside B | H | β-Glc-β-Glc(2→1)<br>    \|<br>β-Glc(3→1) |
| 8. Rebaudioside C (Dulcoside B) | β-Glc | β-Glc-α-Rha(2→1)<br>    \|<br>β-Glc(3→1) |
| 9. Rebaudioside D | β-Glc-β-Glc(2→1) | β-Glc-β-Glc(2→1)<br>    \|<br>β-Glc(3→1) |
| 10. Rebaudioside M | β-Glc-β-Glc(2→1)<br>    \|<br>β-Glc(3→1) | β-Glc-β-Glc(2→1)<br>    \|<br>β-Glc(3→1) |
| 11. Rebaudioside N | β-Glc-α-Rha(2→1)<br>    \|<br>β-Glc(3→1) | β-Glc-β-Glc(2→1)<br>    \|<br>β-Glc(3→1) |
| 12. Rebaudioside E | β-Glc-β-Glc(2→1) | β-Glc-β-Glc(2→1) |
| 13. Rebaudioside F | β-Glc | β-Glc-β-Xyl(2→1)<br>    \|<br>β-Glc(3→1) |
| 14. Dulcoside A | β-Glc | β-Glc-α-Rha(2→1) |

FIG. 1

SENSORY MODIFIERS

CROSS-REFERENCE TO RELATED APPLICATIONS

This application is a Continuation of U.S. application Ser. No. 17/395,784, filed Aug. 6, 2021, which is a Continuation of International Application No. PCT/US2020/026524, filed Apr. 3, 2020, which claims the benefit of U.S. Application No. 62/830,449, filed Apr. 6, 2019; U.S. Application No. 62/832,269, filed Apr. 10, 2019; U.S. application Ser. No. 16/373,206, filed Apr. 4, 2019, which was published on Jul. 25, 2019 as U.S. Publication No. 2019/0223481; International Application No. PCT/US2018/054691, filed Oct. 5, 2018; U.S. Provisional Application No. 62/569,279, filed Oct. 6, 2017; U.S. application Ser. No. 16/374,894, filed Apr. 4, 2019, which was published on Aug. 1, 2019 as U.S. Publication No. 2019/0231834; International Application No. PCT/US2018/054688, filed Oct. 5, 2018; U.S. Provisional Application No. 62/676,722, filed May 25, 2018; U.S. application Ser. No. 16/374,422, filed Apr. 3, 2019, which was published on Jul. 25, 2019 as U.S. Publication No. 2019/0223483; and International Application No. PCT/US2018/054743, filed Oct. 5, 2018. The entirety of each of these applications is hereby incorporated by reference.

BACKGROUND

Steviol glycosides are a class of sweet-tasting glycosylated diterpene compounds commonly obtained from the leaves of *Stevia rebaudiana*. Various steviol glycosides are known, some of which provide a sugar-like taste profile and are 150 to 450 times sweeter than sugar. Such compounds are typically characterized by a single steviol backbone and the presence of differing arrangements of glycosidic carbohydrate residues at positions C13 and C19.

In recent decades, consumers have increasingly sought low-calorie alternatives to calorie-rich products. Steviol glycosides offer a non-caloric alternative to traditional caloric sweeteners such as sugar, glucose, sucrose, and/or fructose. However, in some cases, consumers may discern that the sensory and temporal taste profile of steviol glycosides differ somewhat from traditional caloric sweeteners. For example, existing steviol glycoside compositions may provide comparably reduced sweetness intensity, increased sweetness linger, increased bitterness, and unfamiliar sensory attributes, such as astringency and metallic tastes, when compared to traditional sweeteners. These sensory attributes can limit the use of steviol glycosides in various consumer products, particularly those which seek to use steviol glycosides in the highest concentrations. At the same time, consumers have favored steviol glycosides as a low-calorie sweetener due in part because such compounds have the potential to be naturally obtained from botanical sources.

SUMMARY

The present disclosure provides, among other things, compositions containing a steviol glycoside component and an amount of a sensory modifier effective to reduce sweetness linger, reduce bitterness, or otherwise improve the sensory attributes of the steviol glycoside component. The steviol glycoside component contains one or more steviol glycosides. The sensory modifier comprises one or more caffeoylquinic acids. One portion of the sensory modifier is in salt form (corresponding to a "salt fraction") while another portion is in acid form (corresponding to an "acid fraction"). In the various aspects, at least 50 wt % of the sensory modifier is in salt form. The sensory modifier can also be characterized as having a salt fraction which accounts for at least 50 wt % of the total sensory modifier. Surprisingly, a combination of the acid and salt forms have been found to reduce bitterness and reducing sweetness linger and mixtures having less than 50 mol % salt may not offer the same advantages and mixtures above 90 mol % may offer only slight reduction in sweetness linger. This disclosure further provides compositions and methods of using the same.

For example, the disclosure provides a steviol glycoside composition with reduced sweetness linger, the composition comprising a steviol glycoside component and a sensory modifier in an amount effective to reduce sweetness linger, wherein the sensory modifier comprises one or more caffeoyl-substituted quinic acids and one or more salts thereof, and at least 50 wt % of the sensory modifier is in salt form.

The disclosure also provides a steviol glycoside composition with reduced bitterness, the composition comprising a steviol glycoside component and a sensory modifier in an amount effective to reduced bitterness, wherein the sensory modifier may comprise one or more caffeoyl-substituted quinic acids and one or more salts thereof, and at least 50 wt % of the sensory modifier is in salt form.

The disclosure further provides a method for reducing sweetness linger from a steviol glycoside component in an edible composition, the method comprising combining the steviol glycoside component and a sensory modifier in an amount effective to decrease sweetness linger of the steviol glycoside component, wherein the sensory modifier comprises one or more caffeoyl-substituted quinic acids and one or more salts thereof, and at least 50 wt % of the sensory modifier is in salt form.

The disclosure also provides a method for reducing bitterness from a steviol glycoside component in an edible composition, the method comprising combining the steviol glycoside component and a sensory modifier in an amount effective to reduce bitterness of the steviol glycoside component, wherein the sensory modifier comprises one or more caffeoyl-substituted quinic acids and one or more salts thereof, and at least 50 wt % of the sensory modifier is in salt form.

The disclosure further provides an aqueous steviol glycoside solution with reduced sweetness linger, the solution comprising a steviol glycoside component comprising at least one of rebaudioside D, rebaudioside M, and rebaudioside A, wherein a total steviol glycoside concentration is 200 ppm to 1000 ppm; and a sensory modifier at a concentration of 200 ppm to 1000 ppm, wherein the sensory modifier comprises a salt fraction and an acid fraction, wherein the salt fraction comprises, in one embodiment, a salt of a monocaffeoylquinic acid and a salt of a dicaffeoylquinic acid, wherein the acid fraction comprises a monocaffeoylquinic acid and a dicaffeoylquinic acid, wherein the salt fraction accounts for 50 to 80 wt % of the total sensory modifier, wherein at least a portion of the sensory modifier is, in one embodiment, prepared from yerba mate or *stevia*, and wherein the aqueous steviol glycoside solution has reduced sweetness linger compared to an aqueous steviol glycoside solution having the same concentration of the same steviol glycoside component without the sensory modifier.

The disclosure further provides an aqueous steviol glycoside solution with reduced bitterness, the composition comprising a steviol glycoside component comprising at least one of rebaudioside D, rebaudioside M, and rebaudioside A, wherein a total steviol glycoside component concentration is 400 ppm to 800 ppm; and a sensory modifier at a concentration of 400 ppm to 800 ppm, wherein the sensory modifier comprises a salt fraction and an acid fraction, wherein the salt fraction comprises, in one embodiment, one or more of a salt of a monocaffeoylquinic acid and a salt of a dicaffeoylquinic acid, wherein the acid fraction comprises one or more of a monocaffeoylquinic acid and a dicaffeoylquinic acid, wherein the salt fraction corresponds to between 50 to 80 wt % of the total sensory modifier and the acid fraction corresponds to between 20 to 50 wt % of the total sensory modifier, wherein at least a portion of the total sensory modifier is, in one embodiment, prepared from yerba mate or *stevia*, and wherein the aqueous steviol glycoside solution has reduced bitterness compared to an aqueous steviol glycoside solution having the same concentration of the same steviol glycoside component without the sensory modifier.

Advantages, some of which are unexpected, are achieved by embodiments of the present disclosure. In various embodiments, use of the sensory modifier described herein improves various sensory attributes of a steviol glycoside component as compared to the same steviol glycoside component without the sensory modifier. For example, the sensory modifier can provide a more rounded taste profile, reduced sweetness linger, a sucrose-like mouthfeel, reduced bitterness, or a combination thereof, as compared to a steviol glycoside component alone. In some embodiments, the sensory modifier can suppress the undesired sensory attributes typical of Reb M and Reb N, such as astringency, metallic flavor, powdery feel, numb feel, or vapory feel.

In various embodiments, use of a sensory modifier with a salt fraction of 50 wt % or more of the total sensory modifier has the advantage of providing reduced bitterness and/or reduced sweetness linger of the steviol glycoside component compared to a salt fraction less than 50 wt %. In further embodiments, use of a sensory modifier with a salt fraction of 90 wt % or less of the total sensory modifier can provide reduced sweetness linger compared to use of a sensory modifier with a salt fraction greater than 90 wt %.

BRIEF DESCRIPTION OF THE FIGURES

The drawings illustrate generally, by way of example, but not by way of limitation, various embodiments discussed herein.

FIG. 1 shows structures of various steviol glycosides.

Figure 2:
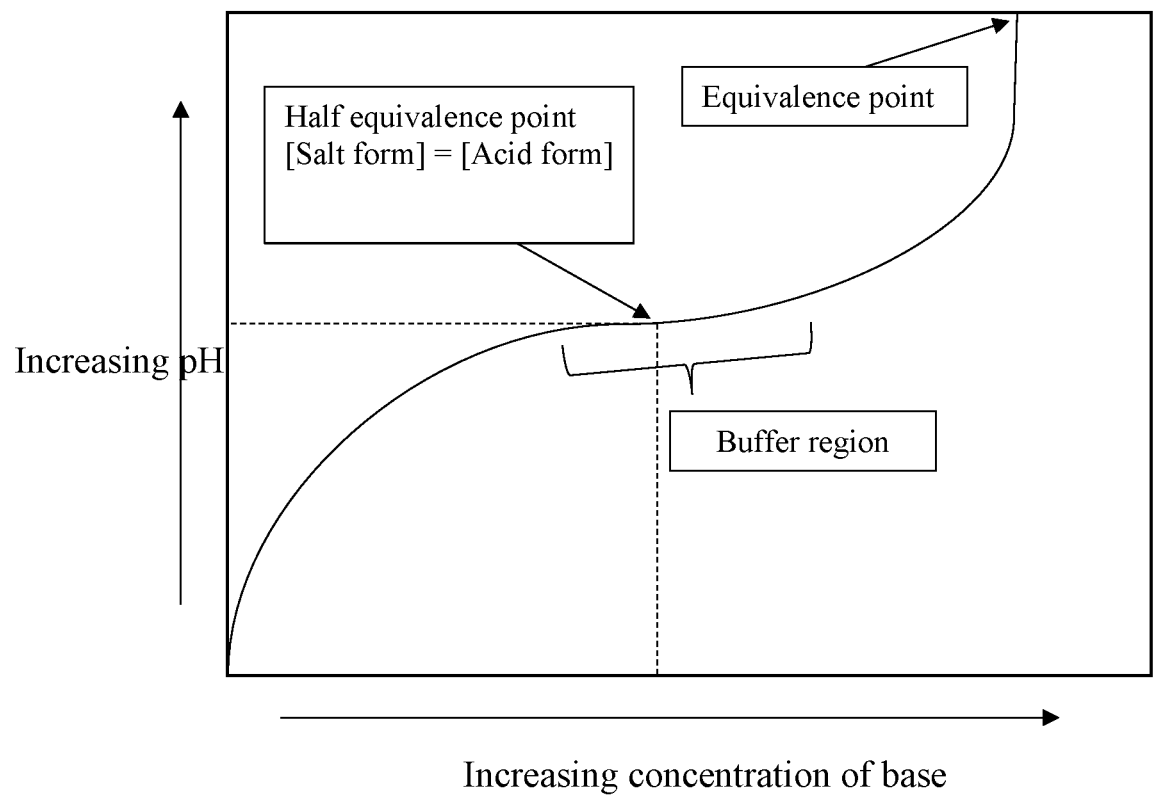
FIG. 2 shows a simplified titration curve illustrating how changes to acid and salt fraction do not necessarily relate to changes in pH, even in simple examples.

It should be understood that numerous other modifications and examples can be devised by those skilled in the art, which fall within the scope and spirit of the principles of this disclosure.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, the terms "a," "an," or "the" are used to include one or more than one unless the context clearly dictates otherwise. The term "or" is used to refer to a nonexclusive "or" unless otherwise indicated. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

Unless expressly stated, ppm (parts per million) is on a by weight basis.

This disclosure relates to various steviol glycoside compositions which have improved sensory attributes, such as reduced sweetness linger and/or reduced bitterness. The disclosure also relates, generally, to a sensory modifier and uses thereof. In various embodiments, the sensory modifier contains one or more caffeoyl-substituted quinic acid, and salts thereof, wherein at least 50 wt % of the total sensory modifier is in salt form. The disclosure further relates to methods of reducing undesirable attributes associated with various steviol glycoside components and providing an improved composition relative to steviol glycoside compositions which lack the sensory modifier described herein.

Steviol Glycosides

The present disclosure provides compositions containing a steviol glycoside component and various improvements which serve to modify the sensory perception thereof. The steviol glycoside component of the present disclosure can contain a variety of steviol glycosides.

The steviol glycoside component can include one or more steviol glycosides. In some aspects, the term steviol glycoside refers to rebaudioside A (Reb A) (CAS #58543-16-1), rebaudioside B (Reb B) (CAS #58543-17-2), rebaudioside C (Reb C) (CAS #63550-99-2), rebaudioside D (Reb D) (CAS #63279-13-0), rebaudioside E (Reb E) (CAS #63279-14-1), rebaudioside F (Reb F) (CAS #438045-89-7), rebaudioside M (Reb M) (CAS #1220616-44-3), rubusoside (CAS #63849-39-4), dulcoside A (CAS #64432-06-0), rebaudioside I (Reb I) (MassBank Record: FU000332), rebaudioside Q (Reb Q), rebaudioside N (Reb N), rebaudioside O (Reb O), 1,2-stevioside (CAS #57817-89-7), 1,3-stevioside (Reb G), steviol-1,2-bioside (MassBank Record: FU000299), steviol-1,3-bioside, steviol-13-O-glucoside (13-SMG), steviol-19-O-glucoside (19-SMG), OPS1-5 (corresponding to compound 4 from WO2016100689), steviol glycosides with 1, 2, 3, 4, 5, 6, 7, 8, 9, 10 or more glycosides, and isomers thereof. See FIG. 1. See also, Steviol Glycosides Chemical and Technical Assessment 82nd JECFA, 2016, prepared by Harriet Wallin, Food Agric. Org.

Steviol glycosides generally have the formula shown in FIG. 1 where steviol ($R_1$ and $R_2$=H) is the aglycone backbone and $R_1$ and $R_2$ can each be hydrogen or one or more sugar moieties. These sugar moieties are most commonly glucose, rhamnose, or xylitol, but steviol glycosides have been reported that include fructose and deoxyglucose sugar moieties.

Not only do steviol glycosides differ structurally, but the various steviol glycosides can also differ in their sensory properties. For example, stevioside (comprising three glucose units) and rebaudioside A (comprising four glucose units) are found in greater abundance in stevia extracts and have particular sweetness attributes. Both stevioside and rebaudioside A add sweetness, but can be perceived as comprising bitterness attributes, especially at higher concentrations. Rebaudioside A has bitterness attributes that increase with concentration and that can limit its use at higher concentrations (e.g., greater than 400 ppm).

Other steviol glycosides can comprise increased numbers of glycosides and are found in much lower abundance in stevia extracts. Such compounds can sometimes be termed "minor" steviol glycosides, even when they are used as a primary component in a composition. For example, so-called minor steviol glycosides can include rebaudioside D and rebaudioside M, which are found in lower abundance in stevia extracts and comprise different sweetness attributes than the more abundant steviol glycosides. Some of the sweetness attributes of these minor steviol glycosides can be preferred to the major steviol glycosides. For example, rebaudioside D and rebaudioside M have reduced bitterness attributes compared to rebaudioside A. These reduced bitterness attributes of rebaudioside D and rebaudioside M permit a more favorable sensory experience and enable their use at higher concentrations. However, although bitterness is reduced in rebaudioside D and rebaudioside M compared to rebaudioside A, the perception of bitterness can still be limiting, especially at higher concentrations. Other sensory attributes can also be limiting, for example sweetness linger can be limiting in these minor glycosides, especially at higher concentrations. Sweetness linger can be perceived as a sweetness that lingers in the mouth longer than what is expected with a comparable sugar solution. Sweetness linger of minor steviol glycosides can limit their use, especially at higher concentrations.

As described herein, adding sensory modifiers can change the sensory attributes of a steviol glycoside composition. Moreover, sensory modifiers can modify sensory attributes associated with specific steviol glycoside components. For example, sensory modifiers can surprisingly reduce sweetness linger in minor steviol glycosides such as rebaudioside D and rebaudioside M. By reducing sweetness linger, sensory modifiers can permit a more favorable sensory experience with minor steviol glycosides and allow for use of the minor steviol glycosides at higher concentrations. Therefore, the disclosed sensory modifiers can change sensory attributes associated with minor steviol glycosides.

In some aspects, minor steviol glycosides can also have specific sensory attributes related to sweetness intensity. Perceived sweetness intensity can be reported as SEV (sucrose equivalent value) with increasing sweetness intensity corresponding to higher SEV. A SEV of 1 corresponds to a 1% sucrose solution, a SEV of 2 corresponds to a 2% sucrose solution, and so on. While perception of sweetness intensity generally increases as the concentration of the minor steviol glycoside increases, the perceived sweetness intensity can reach a plateau despite increasing amounts of the minor steviol glycoside. This sweetness intensity plateau can limit the use of minor steviol glycosides, especially where higher SEV is desired. The addition of sensory modifiers has been found to surprisingly increase the perceived sweetness intensity of minor steviol glycosides beyond the plateau normally observed and enable minor steviol glycosides to be used at higher concentrations than previously used. For example, by combining rebaudioside M with one or more sensory modifiers, sweetness intensities above SEV 11 can be achieved. In various embodiments, increasing concentrations of rebaudioside M with one or more sensory modifiers can achieve increasing sweetness intensities of up to about SEV 13 at about 1400 ppm of rebaudioside M; therefore, the disclosed sensory modifiers can increase sweetness intensity associated with minor steviol glycosides above what can be perceived in the absence of sensory modifiers.

In various embodiments, the steviol glycoside component can comprise a mixture of two or more steviol glycosides, wherein one steviol glycoside predominates. For example, the steviol glycoside component can be predominantly rebaudioside M, rebaudioside N, rebaudioside D, or rebaudioside A. The predominant steviol glycoside can account for at least or about 50 wt %, 60 wt %, 70 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 99.5 wt % of the steviol glycoside component.

Exemplary steviol glycoside components can include rebaudioside M, rebaudioside N, rebaudioside D, and rebaudioside A. In some aspects, one or more of the steviol glycosides are isolated from *Stevia rebaudiana*. In some aspects, one or more of the steviol glycoside components are produced by fermentation by an engineered microorganism or produced enzymatically from plant-derived steviol glycosides and further isolated. For example, rebaudioside D and M can be produced by an engineered organism and then isolated to produce a steviol glycoside component of primarily rebaudioside D and rebaudioside M as the predominant steviol glycoside species. In some aspects, one or more of the steviol glycosides are produced by bioconversion by an enzyme and leaf extract.

In other aspects, the steviol glycoside composition and steviol glycoside component can comprise rebaudioside D and rebaudioside M in an amount greater than other steviol glycosides.

Rebaudioside M, rebaudioside D, or both, can be present in the steviol glycoside component in a total amount of about 80% (wt) or greater (e.g., RM80), 90% (wt) or greater (e.g., RM90), 95% (wt) or greater (e.g., RM95), or 99% (wt) or greater of a total amount steviol glycosides in the steviol glycoside component. Rebaudioside M can be the predominant steviol glycoside in the steviol glycoside component, and can be present, for example, in an amount in the range of about 50% to about 95%, about 70% to about 90%, or about 75% to about 85% of the total amount steviol glycosides in the steviol glycoside component. Rebaudioside D can be in an amount less than Rebaudioside M, such as in an amount in the range of about 5% to about 25%, about 10% to about 20%, or about 10% to about 15% of the total amount of steviol glycosides in the steviol glycoside component. For example, the composition can comprise mostly rebaudioside M and/or D and can include one or more of rebaudioside A, rebaudioside B, or stevioside in an amount of about 5% (wt) or less, about 2% (wt) or less, or about 1% (wt) or less, of a total amount steviol glycosides in the steviol glycoside component.

The steviol glycoside composition can comprise various amounts of steviol glycosides. Steviol glycosides can be present in the composition in any amount desired for the particular use. For example, steviol glycosides can be present in the composition at a total steviol glycoside concentration from about 1 ppm to about 1000 ppm, or from about 1 ppm to about 2000 ppm; such concentrations may be particularly useful where the composition is a beverage or food composition 1. In some aspects, steviol glycosides can be present in the composition at a total steviol glycoside concentration from about 100 ppm to about 2000 ppm, about 200 ppm to about 2000 ppm, 300 ppm to about 2000 ppm, 400 ppm to about 2000 ppm, 500 ppm to about 2000 ppm, 600 ppm to about 2000 ppm, 700 ppm to about 2000 ppm, 800 ppm to about 2000 ppm, 900 ppm to about 2000 ppm, or 1000 ppm to about 2000 ppm. In some aspects, steviol glycosides can be present in the composition at a total steviol glycoside concentration of or greater than about 10, 100, 200, 300, 400, 500, 600, 700, 800, 900, 1000, 110, 1200, 1300, 1400, 1500, 1600, 1700, 1800, 1900, or 2000 ppm. In some aspects, steviol glycosides can be present in the composition at a total steviol glycoside concentration from about 100 ppm to about 1000 ppm, about 200 ppm to about 1000 ppm, 300 ppm to about 1000 ppm, 400 ppm to about 1000 ppm, 500 ppm to about 1000 ppm, 600 ppm to about 1000 ppm, 700 ppm to about 1000 ppm, 800 ppm to about 1000 ppm, or 900 ppm to about 1000 ppm. In some aspects, steviol glycosides can be present in the composition at a total steviol glycoside concentration from about 100 ppm to about 800 ppm, about 200 ppm to about 800 ppm, 300 ppm to about 800 ppm, 400 ppm to about 800 ppm, 500 ppm to about 800 ppm, 600 ppm to about 800 ppm, or 700 ppm to about 800 ppm. In some aspects, steviol glycosides can be present in the composition at a total steviol glycoside concentration from about 400 ppm to about 800 ppm.

The steviol glycoside component can comprise various amounts of one or more individual steviol glycoside species, each of which can be present at a concentration independently defined for each species. For example, an individual steviol glycoside species can be present in the composition at a concentration from about 1 ppm to about 1000 ppm or from about 1 ppm to about 2000 ppm. In some aspects, an individual steviol glycoside species can be present in the composition at a concentration from about 100 ppm to about 2000 ppm, about 200 ppm to about 2000 ppm, 300 ppm to about 2000 ppm, 400 ppm to about 2000 ppm, 500 ppm to about 2000 ppm, 600 ppm to about 2000 ppm, 700 ppm to about 2000 ppm, 800 ppm to about 2000 ppm, 900 ppm to about 2000 ppm, or 1000 ppm to about 2000 ppm.

For example, Reb A, Reb M, Reb D, or any combination thereof, can each individually, if present, have a concentration from about 1 ppm to about 1400 ppm, or from about 1 ppm to about 1000 ppm. In some aspects, Reb A, Reb M, Reb D, or any combination thereof, can each individually be present in the composition at a concentration from about 100 ppm to about 1000 ppm, about 200 ppm to about 1000 ppm, 300 ppm to about 1000 ppm, 400 ppm to about 1000 ppm, 500 ppm to about 1000 ppm, 600 ppm to about 1000 ppm, 700 ppm to about 1000 ppm, 800 ppm to about 1000 ppm, 900 ppm to about 1000 ppm. In some aspects, Reb A, Reb M, Reb D, or any combination thereof, can each individually be present in the steviol glycoside composition at a concentration of or greater than about 10, 50, 100, 200, 300, 400, 500, 600, 700, 800, 900, or 1000 ppm. In some aspects, Reb A, Reb M, Reb D, or any combination thereof, can each individually be present in the composition at a concentration from about 100 ppm to about 800 ppm, about 200 ppm to about 800 ppm, 300 ppm to about 800 ppm, 400 ppm to about 800 ppm, 500 ppm to about 800 ppm, 600 ppm to about 800 ppm, or 700 ppm to about 800 ppm. In some aspects, Reb A, Reb M, Reb D, or any combination thereof, can be present in the composition at a concentration from about 400 ppm to about 800 ppm.

Sensory Modifier

A sensory modifier is a compound or composition that in certain amounts changes the sensory characteristics or sensory attributes of a sweetened consumable, e.g., a beverage, a food product, etc. Non-limiting examples of sensory characteristics that a sensory modifier can change include bitterness, sourness, numbness, astringency, metallicness, cloyingness, dryness, sweetness, temporal aspects of sweetness, as well as flavor notes, such as licorice, vanilla, prune, cotton candy, and molasses flavor notes. The sensory modifier may enhance a sensory characteristic, such as enhancing sweetness; may suppress a sensory characteristic, such as reducing bitterness; or may change the temporal aspects of a sensory characteristic, e.g., by reducing sweetness lingering, or a combination thereof. In some embodiments, the amount employed in a composition having a plurality of steviol glycosides and one or more sensory modifiers alters at least one sensory characteristic, e.g., the combination may have reduced bitterness or sweetness compared to one or more of the steviol glycosides in the composition, which resulting sensory characteristic in the composition is better than expected.

The present disclosure provides, in one embodiment, a sensory modifier comprising one or more caffeoyl-substituted quinic acids, and salts thereof. In various embodiments, the caffeoyl-substituted quinic acids comprise an ester derived from the carboxylic acid of caffeic acid and an alcohol of quinic acid. A "caffeoyl-substituted quinic acid" or "caffeoylquinic acid" as the terms are used herein, include monocaffeoylquinic acids and dicaffeoylquinic acids and salts thereof. Monocaffeoylquinic acids comprise an ester derived from a single caffeic acid and a quinic acid (e.g., chlorogenic acid (5-O-caffeoylquinic acid), neochlorogenic acid (3-O-caffeoylquinic acid), and cryptochlorogenic acid (4-O-caffeoylquinic acid)). Dicaffeoylquinic acids comprise an ester derived from two caffeic acids and a quinic acid (e.g., 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, and 4,5-dicaffeoylquinic acid)). Thus, the sensory modifier includes both acid forms and salt forms of caffeoyl-substituted quinic acids. Free acid forms of various caffeoyl-substituted quinic acids are shown in Table 1.

TABLE 1

Structures of various caffeoyl-substituted quinic acids.

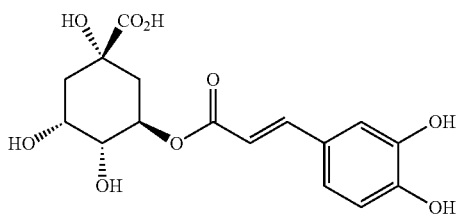

Chlorogenic acid (5-O-caffeoylquinic acid)

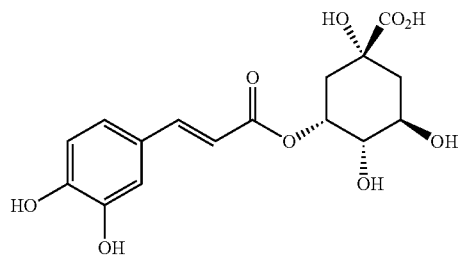

Neochlorogenic acid (3-O-caffeoylquinic acid)

TABLE 1-continued
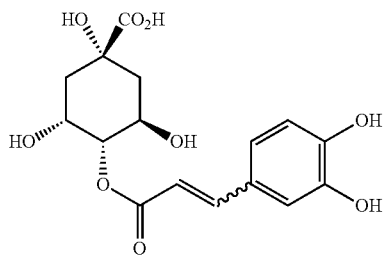
Cryptochlorogenic acid (4-O-caffeoylquinic acid)
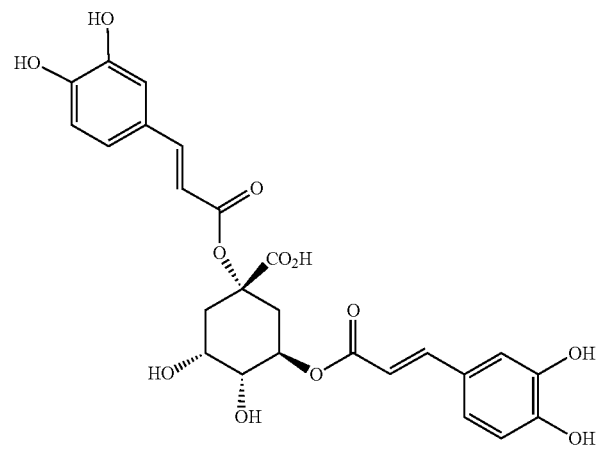
1,5-Dicaffeoylquinic acid
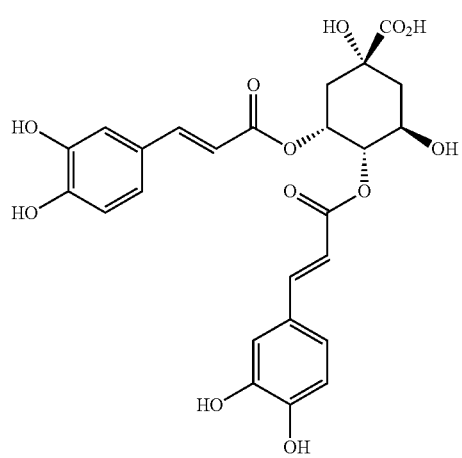
3,4-Dicaffeoylquinic acid
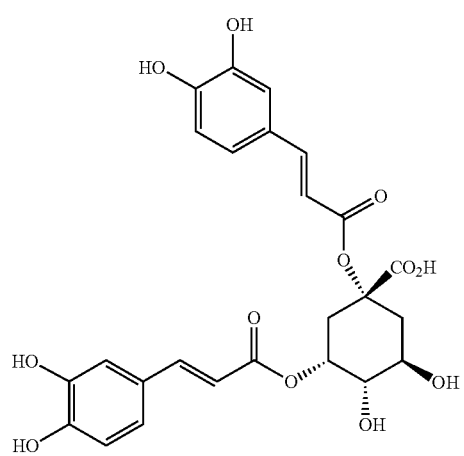
1,3-Dicaffeoylquinic acid
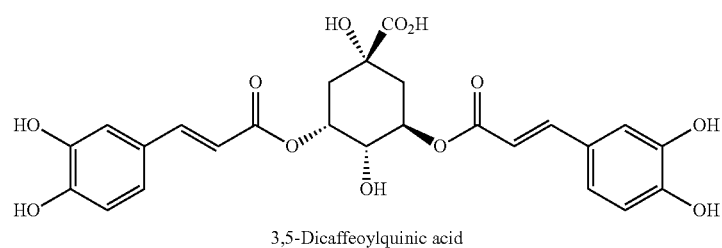 [SMILES: O=C(/C=C/c1ccc(O)c(O)c1)O[C@@H]1C[C@](O)(C(=O)O)C[C@@H](OC(=O)/C=C/c2ccc(O)c(O)c2)[C@H]1O]
3,5-Dicaffeoylquinic acid TABLE 1-continued

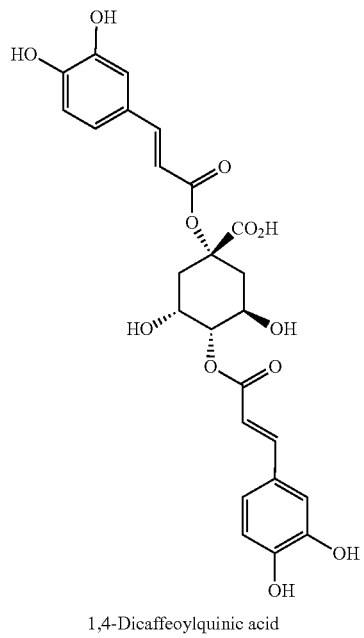 [SMILES: O=C(/C=C/c1ccc(O)c(O)c1)O[C@H]1[C@H](O)C[C@](OC(=O)/C=C/c2ccc(O)c(O)c2)(C(=O)O)C[C@H]1O]

1,4-Dicaffeoylquinic acid

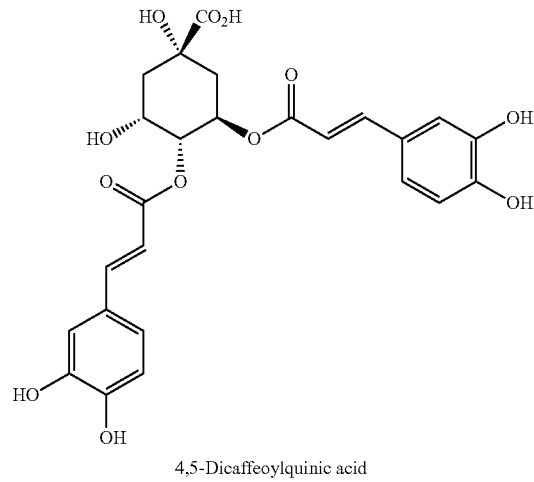 [SMILES: O=C(/C=C/c1ccc(O)c(O)c1)O[C@@H]1[C@H](O)C[C@@](O)(C(=O)O)C[C@H]1OC(=O)/C=C/c1ccc(O)c(O)c1]

4,5-Dicaffeoylquinic acid

In various embodiments, the sensory modifier further comprises one or more of quinic acid, caffeic acid, ferulic acid, sinapic acid, p-coumaric acid, an ester of quinic acid, an ester of caffeic acid, an ester of ferulic acid, an ester of sinapic acid, an ester of p-coumaric acid, an ester of caffeic acid and quinic acid, an ester of caffeic acid and quinic acid comprising a single caffeic acid moiety, an ester of caffeic acid and quinic acid comprising more than one caffeic acid moiety, an ester of ferulic acid and quinic acid, an ester of ferulic acid and quinic acid comprising a single ferulic acid moiety, an ester of ferulic acid and quinic acid comprising more than one ferulic acid moiety, an ester of sinapic acid and quinic acid, an ester of sinapic acid and quinic acid comprising a single sinapic acid moiety, an ester of sinapic acid and quinic acid comprising more than one sinapic acid moiety, an ester of p-coumaric acid and quinic acid, an ester of p-coumaric acid and quinic acid comprising a single p-coumaric acid moiety, an ester of p-coumaric acid and quinic acid comprising more than one p-coumaric acid moiety, a di-ester of quinic acid containing one caffeic acid moiety and one ferulic acid moiety, a caffeic ester of 3-(3,4-dihydroxyphenyl)lactic acid, a caffeic acid ester of tartaric acid, a caffeic acid ester of tartaric acid containing more than one caffeic acid moieties, and/or isomers thereof, and the corresponding salts.

In some aspects, the sensory modifier comprises one or more of chlorogenic acid (5-O-caffeoylquinic acid), neochlorogenic acid (3-O-caffeoylquinic acid), cryptochlorogenic acid (4-O-caffeoylquinic acid), 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, 4,5-dicaffeoylquinic acid, 3-O-feruloylquinic acid, 4-O-feruloylquinic acid, 5-O-feruloylquinic acid, 1,3-diferuloylquinic acid, 1,4-diferuloylquinic acid, 1,5-diferuloylquinic acid, 3,4-diferuloylquinic acid, 3,5-diferuloylquinic acid, 4,5-diferuloylquinic acid, rosmarinic acid, caftaric acid (monocaffeoyltartaric acid), cichoric acid (dicaffeoyltartaric acid) and salts, and/or isomers thereof, and the corresponding salts.

In some embodiments, the sensory modifier consists essentially of one or more compounds selected from the list consisting of chlorogenic acid (5-O-caffeoylquinic acid), neochlorogenic acid (3-O-caffeoylquinic acid), cryptochlorogenic acid (4-O-caffeoylquinic acid), 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, and 4,5-dicaffeoylquinic acid, and any combination thereof, isomers thereof, and the corresponding salts. In various embodiments, one or more alcohol of the caffeoyl moiety is replaced with a hydrogen or substituted with an $C_1$-$C_{10}$ alkyl (e.g., methyl, ethyl, propyl, etc), $C_1$-$C_{10}$ alkenyl, $C_6$-$C_{10}$ aryl, $C_2$-$C_{10}$ acyl, acrylate, caffeoyl, o-coumaroyl, p-coumaroyl, m-coumaroyl, cinnamoyl, 4-hydroxycinnamoyl, feruloyl, iso-feruloyl, sinapoyl, galloyl, sulfate, phosphate, or phosphonate. Thus, modified and substituted caffeic acid moieties result in a cinnamic acid, o-coumaroyl, p-coumaric acid, m-coumaric acid, ferulic acid, and the acyl and ester forms thereof. In various embodiments, one or more alcohol of the quinic acid moiety is substituted with an $C_1$-$C_{10}$ alkyl (e.g., methyl, ethyl, propyl, etc), $C_1$-$C_{10}$ alkenyl, $C_6$-$C_{10}$ aryl, $C_2$-$C_{10}$ acyl, acrylate, caffeoyl, o-coumaroyl, p-coumaroyl, m-coumaroyl, cinnamoyl, 4-hydroxycinnamoyl, feruloyl, iso-feruloyl, sinapoyl, galloyl, sulfate, phosphate, or phosphonate.

The sensory modifier can include one or more of a caffeic ester of 3-(3,4-dihydroxyphenyl)lactic acid, a caffeic acid ester of tartaric acid, a ferulic ester of quinic acid or any other optionally-substituted cinnamoyl ester of quinic acid other than a caffeoylquinic acid. Examples of a ferulic ester of quinic acid includes 3-O-feruloylquinic acid, 4-O-feruloylquinic acid, 5-O-feruloylquinic acid, 1,3-diferuloylquinic acid, 1,4-diferuloylquinic acid, 1,5-diferuloylquinic acid, 3,4-diferuloylquinic acid, 3,5-diferuloylquinic acid, 4,5-diferuloylquinic acid, and combinations thereof. An example of a caffeic ester of 3-(3,4-dihydroxyphenyl)lactic acid is rosmarinic acid. Examples of a caffeic acid ester of tartaric acid includes cichoric acid (dicaffeoyltartaric acid) and caftaric acid (monocaffeoyltartaric acid) and combinations thereof.

In an alternative embodiment, the sensory modifier is a mixture consisting of one or more of a caffeic ester of 3-(3,4-dihydroxyphenyl)lactic acid, a caffeic acid ester of tartaric acid, a ferulic ester of quinic acid or any other optionally-substituted cinnamoyl ester of quinic acid other than a caffeoylquinic acid. Such sensory modifier also includes salts thereof so as to have a salt fraction and an acid fraction. It is thus further envisaged that each of the various embodiments described herein related to caffeoylquinic acid and other sensory modifiers can be equally applicable to this alternative.

Caffeic acid has the structure:

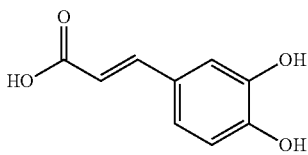 [SMILES: O=C(O)/C=C/c1ccc(O)c(O)c1]

Quinic acid has the structure:

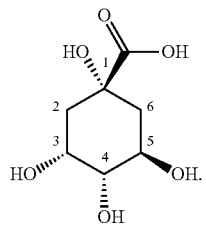 [SMILES: O=C(O)[C@]1(O)C[C@@H](O)[C@@H](O)[C@H](O)C1]

The structure provided above is D-(−)-quinic acid and the numbers shown correspond to current IUPAC numbering.

In various embodiments, the sensory modifier can be enriched for one or more of caffeic acid, monocaffeoylquinic acids, and dicaffeoylquinic acids. The term "enriched" refers to an increase in an amount of one of caffeic acid, monocaffeoylquinic acids, and dicaffeoylquinic acids relative to one or more other compounds that are present in the sensory modifier. A sensory modifier that is enriched for one or more of caffeic acid, monocaffeoylquinic acids, and dicaffeoylquinic acids can modify the sensory attributes of the steviol glycoside component of the composition.

The sensory modifier enriched for one or more dicaffeoylquinic acids can modify the sensory attributes of a steviol glycoside composition. A sensory modifier that is enriched for dicaffeoylquinic acids can comprise 10% or more, 15% or more, 20% or more, 25% or more, 30% or more, 35% or more, 40% or more, 45% or more, or 50% or more, 60% or more, 70% or more, or 80% or more, or 90% or more dicaffeoylquinic acids.

In various embodiments, at least or about 10 wt %, 15 wt %, 20 wt %, 25 wt %, 30 wt %, 35 wt %, 40 wt %, 45 wt %, or at least or about 50 wt % of the total sensory modifier can be monocaffeoylquinic acids and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be chlorogenic acid (5-O-caffeoylquinic acid) and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be neochlorogenic acid (3-O-caffeoylquinic acid) and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be cryptochlorogenic acid (4-O-caffeoylquinic acid) and salts thereof.

In various further embodiments, at least or about 10 wt %, 15 wt %, 20 wt %, 25 wt %, 30 wt %, 35 wt %, 40 wt %, 45 wt %, or at least or about 50 wt % of the total sensory modifier can be 1,3-dicaffeoylquinic acid and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be 1,4-dicaffeoylquinic acid and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be 1,5-dicaffeoylquinic acid and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be 3,4-dicaffeoylquinic acid and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be 3,5-dicaffeoylquinic acid and salts thereof. In various embodiments, at least or about 10 wt %, 15 wt %, 20 wt %, 25 wt %, 30 wt %, 35 wt %, 40 wt %, 45 wt %, or at least or about 50 wt % of the total sensory modifier can be 4,5-dicaffeoylquinic acid and salts thereof.

The sensory modifier can, for example, have a weight ratio of total monocaffeoylquinic acids and salts to total dicaffeoylquinic acids and salts of 20:1 to 1:20, e.g., from 3:1 to 1:20. In various embodiments, the sensory modifier has a weight ratio from 15:1 to 1:15, from 10:1 to 1:10, from 5:1 to 1:5, from 3:1 to 1:3, from 2:1 to 1:2, from 1.5:1 to 1:1.5, from 5:1 to 1:1, from 3:1 to 1:1, from 2:1 to 1:1, from 1.5:1 to 1:1.1, from 1:1 to 1:20, from 1:1 to 1:15, from 1:1 to 1:10, from 1:5 to 1:20, from 1:5 to 1:15, from 1:5 to 1:10, from 1:2 to 1:20, from 1:2 to 1:15, from 1:2 to 1:10, from 1:2 to 1:5, from 1:1 to 1:3, from 1:1 to 1:2, or from 1:1 to 1:1.5 monocaffeoylquinic acid and salts thereof:dicaffeoylquinic acids and salts thereof. In some embodiments, the sensory modifier has a greater amount, by weight, of dicaffeoylquinic acids and salts of dicaffeoylquinic acids compared to the amount of monocaffeoylquinic acids and salts of monocaffeoylquinic acids. In various embodiments, the sensory modifier has a ratio of about 1:1 of monocaffeoylquinic acid:dicaffeoylquinic acids, including salts thereof.

Salt Form of Sensory Modifier

The sensory modifier provided herein contains a portion that is in salt form (corresponding to a "salt fraction") and a portion that is in acid form (corresponding to an "acid fraction"). In various embodiments, the salt fraction accounts for at least 50 wt % of the total sensory modifier. Thus, the primary component by weight of the total sensory modifier is compounds in salt form.

The sensory modifier can contain various types of salts, but typically will contain salts which are suitable for ingestion, typically salts derived from alkali metals such as sodium and potassium, alkali earth metals such as magnesium and calcium, and nitrogen-derived salts such as amino acids.

As described herein, the sensory modifier contains one or more caffeoyl-substituted quinic acids, as well as salts forms thereof. The salt of each caffeoyl-substituted quinic acid can be a lithium, sodium, potassium, magnesium, calcium, an ammonium salt, or a mixture of any combination thereof. In various embodiments, the salt of each caffeoyl-substituted quinic acid is a sodium salt, a potassium salt, or a mixture thereof. The sensory modifier can thus comprise a sodium salt of a monocaffeoylquinic acid, a sodium salt of a dicaffeoylquinic acid, a potassium salt of a monocaffeoylquinic acid, a potassium salt of a dicaffeoylquinic acid, or a mixture of any combination thereof. For example, a sensory modifier may include a sodium and/or potassium salt of chlorogenic acid, neochlorogenic acid, cryptochlorogenic acid, 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, 4,5-dicaffeoylquinic acid, or any combination thereof.

In various embodiments, the sensory modifier is a mixture comprising one or more caffeoyl-substituted quinic acids and one or more salts thereof and at least 50 wt % of the total sensory modifier is in salt form.

For example, at least or about 50 wt %, 55 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 80 wt %, 85 wt %, or at least or about 90 wt % of the total sensory modifier is in salt form. In further embodiments, less than or about 60 wt %, 65 wt %, 66 wt %, 67 wt %, 68 wt %, 69 wt %, 70 wt %, 71 wt %, 72 wt %, 73 wt %, 74 wt %, 75 wt %, 77 wt %, 78 wt %, 79 wt %, 80 wt %, 81 wt %, 82 wt %, 83 wt %, 84 wt %, 85 wt %, or less than or about 90 wt % of the total sensory modifier is in salt form. In yet further embodiments, about 50 wt % to 90 wt %, 50 wt % to 80 wt %, 50 wt % to 75 wt %, 60 wt % to 90 wt %, 60 wt % to 80 wt %, 60 wt % to 79 wt %, 60 wt % to 77 wt %, 60 wt % to 75 wt %, 60 wt % to 73 wt %, 60 wt % to 70 wt %, 65 wt % to 80 wt %, 65 wt % to 75 wt %, 66 wt % to 74 wt %, 67 wt % to 73 wt %, 68 wt % to 72 wt %, 69 wt % to 71 wt %, 65 wt % to 70 wt %, 67 wt % to 72 wt %, 69 wt % to 74 wt %, or 70 wt % to 75 wt % of the total sensory modifier is in salt form.

For example, at least or about 50 wt %, 55 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 80 wt %, 85 wt %, or at least or about 90 wt % of the combined total of the salt of caffeoylquinic acid and caffeoylquinic acid is in salt form. In further embodiments, less than or about 60 wt %, 65 wt %, 66 wt %, 67 wt %, 68 wt %, 69 wt %, 70 wt %, 71 wt %, 72 wt %, 73 wt %, 74 wt %, 75 wt %, 77 wt %, 78 wt %, 79 wt %, 80 wt %, 81 wt %, 82 wt %, 83 wt %, 84 wt %, 85 wt %, or less than or about 90 wt % of the combined total of the salt of caffeoylquinic acid and caffeoylquinic acid is in salt form. In yet further embodiments, about 50 wt % to 90 wt %, 50 wt % to 80 wt %, 50 wt % to 75 wt %, 60 wt % to 90 wt %, 60 wt % to 80 wt %, 60 wt % to 79 wt %, 60 wt % to 77 wt %, 60 wt % to 75 wt %, 60 wt % to 73 wt %, 60 wt % to 70 wt %, 65 wt % to 80 wt %, 65 wt % to 75 wt %, 66 wt % to 74 wt %, 67 wt % to 73 wt %, 68 wt % to 72 wt %, 69 wt % to 71 wt %, 65 wt % to 70 wt %, 67 wt % to 72 wt %, 69 wt % to 74 wt %, or 70 wt % to 75 wt % of the combined total of the salt of caffeoylquinic acid and caffeoylquinic acid is in salt form. In some embodiments thereof, the salt is a sodium salt, a potassium salt, or both.

As used herein, "salt form" refers to an ionizable compound in anionic form so as to form an ion pair together with a cation other than a hydrogen ion, such as a metal cation or a cationic ammonium compound. The compound can be a carboxylate —COO⁻ in ionic coordination with a metal cation, $M^+$, or with an ammonium compound $NR_4^+$, wherein each R is H or alkyl. For example, in solid state the carboxylate may be bound to the cation via an ionic bond. Without limiting to theory, in solution the ionic species may be closely paired as an intimate ion pair, or it may become separated and solvated. However, when the dissolved salt form anion is isolated from the solution it is removed with its paired cationic species. For example, upon removing a carboxylic acid in salt form from solution, the resulting compound will be a metal carboxylate or other ionic compound. In various embodiments, the salt form is an alkali salt, for example a sodium or potassium salt of one or more quinic acid. One of the differences between a salt form and an acid form, is that isolation of a salt form results in an ionic compound, typically containing a metal cation, whereas isolation of an acid form results in a neutral species, typically free of metal cation. The salts and salt forms described herein can include mixed salts. A mixed salt includes a mixture of two or more cationic species which share a common anionic partner such as a mixed potassium and sodium salt of a caffeoylquinic acid.

As used herein, "acid form" refers to a carboxylic acid compound having a carboxylic acid group, —COOH. In solution, the —COOH may deprotonate to provide an ionized, but not metallated, carboxylate group paired with a proton or protonated species. The acid form can thus correspond to compounds having a —COOH, or a —COO⁻ paired with $H^+$. For example, the dissolved acid form can provide a carboxylate electronically counterbalanced by a hydronium or other protonated solvent species, but the counter ion is other than a metal cation or an ammonium salt. In solid state, the acid form can be neutral and characterized as a fully covalent species.

In further examples, at least or about 5 wt %, 10 wt %, 15 wt %, 20 wt %, 25 wt %, 30 wt %, 35 wt %, 40 wt %, or at least or about 45 wt % of the total sensory modifier is in acid form. In further embodiments, less than or about 10 wt %, 15 wt %, 20 wt %, 25 wt %, 30 wt %, 35 wt %, 40 wt %, or less than about 50 wt % of the total sensory modifier is in acid form. In yet further embodiments, 5 wt % to 50 wt %, 10 wt % to 50 wt %, 15 wt % to 50 wt %, 20 wt % to 50 wt %, 5 wt % to 40 wt %, 10 wt % to 40 wt %, 15 wt % to 40 wt %, 20 wt % to 40 wt %, 5 wt % to 35 wt %, 10 wt % to 35 wt %, 15 wt % to 35 wt %, 20 wt % to 35 wt %, 5 wt % to 30 wt %, 10 wt % to 30 wt %, 15 wt % to 30 wt %, 20 wt % to 30 wt %, 5 wt % to 20 wt %, 10 wt % to 20 wt %, 15 wt % to 20 wt %, 5 wt % to 15 wt %, 10 wt % to 15 wt %, or 5 wt % to 10 wt % of the total sensory modifier is in acid form.

In further examples, at least or about 5 wt %, 10 wt %, 15 wt %, 20 wt %, 25 wt %, 30 wt %, 35 wt %, 40 wt %, or at least or about 45 wt % of the combined total of the salt of caffeoylquinic acid and caffeoylquinic acid is in acid form. In further embodiments, less than or about 10 wt %, 15 wt %, 20 wt %, 25 wt %, 30 wt %, 35 wt %, 40 wt %, or less than about 50 wt % of the combined total of the salt of caffeoylquinic acid and caffeoylquinic acid is in acid form. In yet further embodiments, 5 wt % to 50 wt %, 10 wt % to 50 wt %, 15 wt % to 50 wt %, 20 wt % to 50 wt %, 5 wt % to 40 wt %, 10 wt % to 40 wt %, 15 wt % to 40 wt %, 20 wt % to 40 wt %, 5 wt % to 35 wt %, 10 wt % to 35 wt %, 15 wt % to 35 wt %, 20 wt % to 35 wt %, 5 wt % to 30 wt %, 10 wt % to 30 wt %, 15 wt % to 30 wt %, 20 wt % to 30 wt %, 5 wt % to 20 wt %, 10 wt % to 20 wt %, 15 wt % to 20 wt %, 5 wt % to 15 wt %, 10 wt % to 15 wt %, or 5 wt % to 10 wt % of the combined total of the salt of caffeoylquinic acid and caffeoylquinic acid is in acid form. In some embodiments thereof, the salt is a sodium salt, a potassium salt, or both.

In various embodiments, the sensory modifier comprises a salt fraction and an acid fraction, wherein the salt fraction comprises one or more of a salt of a monocaffeoylquinic acid and a salt of a dicaffeoylquinic acid, wherein the acid fraction comprises one or more of a monocaffeoylquinic acid and a dicaffeoylquinic acid, and wherein the salt fraction comprises at least 50 wt % of the total sensory modifier.

For example, the salt fraction comprises at least or about 50 wt %, 55 wt %, 60 wt %, 65 wt %, 70 wt %, 75 wt %, 80 wt %, 85 wt %, or at least or about 90 wt % of the total sensory modifier. In further embodiments, the salt fraction comprises less than or about 60 wt %, 65 wt %, 70 wt %, 75 wt %, 80 wt %, 85 wt %, or less than or about 90 wt % of the total sensory modifier. In yet further embodiments, the salt fraction comprises 50 wt % to 90 wt %, 50 wt % to 80 wt %, 50 wt % to 75 wt %, 60 wt % to 90 wt %, 60 wt % to 80 wt %, 65 wt % to 80 wt %, or 65 wt % to 75 wt % of the total sensory modifier. Unless otherwise specified the wt % of the salt fraction should be calculated inclusive of the balancing cation species.

In further examples, the acid fraction comprises at least or about 5 wt %, 10 wt %, 15 wt %, 20 wt %, 25 wt %, 30 wt %, 35 wt %, 40 wt %, or at least or about 45 wt % of the total sensory modifier. In further embodiments, the acid fraction comprises less than or about 10 wt %, 15 wt %, 20 wt %, 25 wt %, 30 wt %, 35 wt %, 40 wt %, or less than about 50 wt % of the total sensory modifier. In yet further embodiments, the acid fraction comprises 5 wt % to 50 wt %, 10 wt % to 50 wt %, 15 wt % to 50 wt %, 20 wt % to 50 wt %, 5 wt % to 40 wt %, 10 wt % to 40 wt %, 15 wt % to 40 wt %, 20 wt % to 40 wt %, 5 wt % to 35 wt %, 10 wt % to 35 wt %, 15 wt % to 35 wt %, 20 wt % to 35 wt %, 5 wt % to 30 wt %, 10 wt % to 30 wt %, 15 wt % to 30 wt %, 20 wt % to 30 wt %, 5 wt % to 20 wt %, 10 wt % to 20 wt %, 15 wt % to 20 wt %, 5 wt % to 15 wt %, 10 wt % to 15 wt %, or 5 wt % to 10 wt % of the total sensory modifier.

As another example, the salt fraction comprises at least or about 50 wt %, 55 wt %, 60 wt %, 65 wt %, 70 wt %, 75 wt %, 80 wt %, 85 wt %, or at least or about 90 wt % of the combined total of the salt of caffeoylquinic acid and caffeoylquinic acid. In further embodiments, the salt fraction comprises less than or about 60 wt %, 65 wt %, 70 wt %, 75 wt %, 80 wt %, 85 wt %, or less than or about 90 wt % of the combined total of the salt of caffeoylquinic acid and caffeoylquinic acid. In yet further embodiments, the salt fraction comprises 50 wt % to 90 wt %, 50 wt % to 80 wt %, 50 wt % to 75 wt %, 60 wt % to 90 wt %, 60 wt % to 80 wt %, 65 wt % to 80 wt %, or 65 wt % to 75 wt % of the combined total of the salt of caffeoylquinic acid and caffeoylquinic acid. In some embodiments thereof, the salt is a sodium salt, a potassium salt, or both.

The sensory modifier can also be characterized in that at least 50 mol % of the total sensory modifier is in salt form. For example, at least or about 50 mol %, 55 mol %, 60 mol %, 65 mol %, 70 mol %, 75 mol %, 80 mol %, 85 mol %, or at least or about 90 mol % of the total sensory modifier is in salt form. In further embodiments, less than or about 60 mol %, 65 mol %, 70 mol %, 75 mol %, 80 mol %, 85 mol %, or less than or about 90 mol % of the total sensory modifier is in salt form. In yet further embodiments, 50 mol % to 90 mol %, 50 mol % to 80 mol %, 50 mol % to 75 mol %, 60 mol % to 90 mol %, 60 mol % to 80 mol %, 60 mol % to 75 mol %, 60 mol % to 70 mol %, 65 mol % to 80 mol %, or 65 mol % to 75 mol % of the total sensory modifier is in salt form.

In further examples, at least or about 5 mol %, 10 mol %, 15 mol %, 20 mol %, 25 mol %, 30 mol %, 35 mol %, 40 mol %, or at least or about 45 mol % of the total sensory modifier is in acid form. In further embodiments, less than or about 10 mol %, 15 mol %, 20 mol %, 25 mol %, 30 mol %, 35 mol %, 40 mol %, or less than about 50 mol % of the total sensory modifier is in acid form. In yet further embodiments, 5 mol % to 50 mol %, 10 mol % to 50 mol %, 15 mol % to 50 mol %, 20 mol % to 50 mol %, 5 mol % to 40 mol %, 10 mol % to 40 mol %, 15 mol % to 40 mol %, 20 mol % to 40 mol %, 5 mol % to 35 mol %, 10 mol % to 35 mol %, 15 mol % to 35 mol %, 20 mol % to 35 mol %, 5 mol % to 30 mol %, 10 mol % to 30 mol %, 15 mol % to 30 mol %, 20 mol % to 30 mol %, 5 mol % to 20 mol %, 10 mol % to 20 mol %, 15 mol % to 20 mol %, 5 mol % to 15 mol %, 10 mol % to 15 mol %, or 5 mol % to 10 mol % of the total sensory modifier is in acid form.

In yet further examples, the sensory modifier be at least 50 mol % of the combined total of the salt of caffeoylquinic acid and caffeoylquinic acid is in salt form. For example, at least or about 50 mol %, 55 mol %, 60 mol %, 65 mol %, 70 mol %, 75 mol %, 80 mol %, 85 mol %, or at least or about 90 mol % of the combined total of the salt of caffeoylquinic acid and caffeoylquinic acid is in salt form. In further embodiments, less than or about 60 mol %, 65 mol %, 70 mol %, 75 mol %, 80 mol %, 85 mol %, or less than or about 90 mol % of the combined total of the salt of caffeoylquinic acid and caffeoylquinic acid is in salt form. In yet further embodiments, 50 mol % to 90 mol %, 50 mol % to 80 mol %, 50 mol % to 75 mol %, 60 mol % to 90 mol %, 60 mol % to 80 mol %, 60 mol % to 75 mol %, 60 mol % to 70 mol %, 65 mol % to 80 mol %, or 65 mol % to 75 mol % of the combined total of the salt of caffeoylquinic acid and caffeoylquinic acid is in salt form. In some embodiments thereof, the salt is a sodium salt, a potassium salt, or both.

Similarly, the salt fraction can be characterized in mol % rather than wt %. In various embodiments, For example, the salt fraction comprises at least or about 50 mol %, 55 mol %, 60 mol %, 65 mol %, 70 mol %, 75 mol %, 80 mol %, 85 mol %, or at least or about 90 mol % of the total sensory modifier. In further embodiments, the salt fraction comprises less than or about 60 mol %, 65 mol %, 70 mol %, 75 mol %, 80 mol %, 85 mol %, or less than or about 90 mol % of the total sensory modifier. In yet further embodiments, the salt fraction comprises 50 mol % to 90 mol %, 50 mol % to 80 mol %, 50 mol % to 75 mol %, 60 mol % to 90 mol %, 60 mol % to 80 mol %, 65 mol % to 80 mol %, or 65 mol % to 75 mol % of the total sensory modifier.

In further examples, the acid fraction comprises at least or about 5 mol %, 10 mol %, 15 mol %, 20 mol %, 25 mol %, 30 mol %, 35 mol %, 40 mol %, or at least or about 45 mol % of the total sensory modifier. In further embodiments, the acid fraction comprises less than or about 10 mol %, 15 mol %, 20 mol %, 25 mol %, 30 mol %, 35 mol %, 40 mol %, or less than about 50 mol % of the total sensory modifier. In yet further embodiments, the acid fraction comprises 5 mol % to 50 mol %, 10 mol % to 50 mol %, 15 mol % to 50 mol %, 20 mol % to 50 mol %, 5 mol % to 40 mol %, 10 mol % to 40 mol %, 15 mol % to 40 mol %, 20 mol % to 40 mol %, 5 mol % to 35 mol %, 10 mol % to 35 mol %, 15 mol % to 35 mol %, 20 mol % to 35 mol %, 5 mol % to 30 mol %, 10 mol % to 30 mol %, 15 mol % to 30 mol %, 20 mol % to 30 mol %, 5 mol % to 20 mol %, 10 mol % to 20 mol %, 15 mol % to 20 mol %, 5 mol % to 15 mol %, 10 mol % to 15 mol %, or 5 mol % to 10 mol % of the total sensory modifier.

The sensory modifier can, for example, have a weight ratio or molar ratio of acid:salt of from 1:1 to 1:9, from 1:1 to 1:8, from 1:1 to 1:7, from 1:1 to 1:6, from 1:1 to 1:5, from 1:1 to 1:4, from 1:1 to 1:3, from 1:1 to 1:2, or from 1:1 to 1:1.5.

The various mol %, wt %, weight ratio, molar ratio of salt fraction and salt form described herein can relate to the total sensory modifier or, in various embodiments, to a portion of the sensory modifier, such as a caffeoylquinic acid portion, a monocaffeoylquinic acid portion, a dicaffeoylquinic acid portion, together with the corresponding salts.

The salt fraction, mol % and wt % of the salt form of the total sensory modifier can be determined via a variety of techniques available to those of ordinary skill. For example, the salt fraction, mol % and wt % of the total sensory modifier can be determined spectroscopically, (e.g., NMR or ICP-MS), experimentally (e.g., via titration), or by calculation after determining the amounts of each component added to the sensory modifier.

Each of the quinic acids described herein, including each monocaffeoylquinic acid and dicaffeoylquinic acid, can be considered weak acids and can each exist in at least one of their conjugate acid form, conjugate base form (e.g., in their salt form), and mixed conjugate acid-conjugate base form, wherein a fraction (e.g., mole fraction) of the compounds exist in the conjugate acid form and another fraction exist in the conjugate base form. The fraction of conjugate acid form to conjugate base form for the monocaffeoylquinic acids and dicaffeoylquinic acids will depend on various factors, including the pKa of each compound and the pH of the composition.

In various embodiments, e.g., in an aqueous solution, the salt form of the total sensory modifier exists in equilibrium with the acid form. For example, a particular salt form molecule can become protonated and thus convert into the acid form and an acid form molecule can be come deprotonated to result in a salt form. After approaching or achieving equilibrium, such interplay will not substantially alter the overall wt % of a given form or fraction of the total sensory modifier. For example, a composition having a salt fraction of 50 wt % or more of the total sensory modifier can maintain the same proportions of salt and acid fractions even though the various compounds might exchange from one fraction to another.

There are also cases where the equilibrium between salt and acids forms can shift in response to the addition of components to the composition. For example, addition of buffer solution, salts, acid, or base can shift the equilibrium to favor the salt or acid fraction, and thus alter the wt % of the composition.

Further, there can be a relationship between the pH of a composition and the proportion of salt fraction to acid fraction. For example, salt fraction typically increases as pH raises and typically reduces as pH lowers. However, as shown in the titration curve at FIG. 2, pH is a distinct concept from salt fraction and acid fraction. This is clearly apparent in the buffer region of the titration curve, in which proportionally large changes in the concentration of base (or acid) result in very minimal or negligible changes in pH. For example, increased concentration of alkali does not meaningfully lead to an increase in pH unless you begin to move outside the buffer region. The titration curve of FIG. 2 is simplified, compositions with more than one ionizable component will have more complex titration curves. The buffer region is centered around the pH corresponding to the various pKa values of the titrated compounds or mixture. For reference, the pKa of quinic acid is around 3.46, while the pKa of some quinic acid derivatives can be lower. Citric acid, a common buffer solution, has pKa values of around 3.10, 4.80 and 5.40 for pKa1, pKa2 and pKa3, respectively. In various embodiments, the composition has a pH centered around the buffer region of the various caffeoylquinic acid compounds, for example a pH of about 1 to about 4, about 1 to about 3, about 2 to about 4, about 3 to about 4, about 2 to about 3, about 2.5 to about 3.5, about 2.4 to about 3.6, about 2.2 to about 3, about 2.4 to about 3, about 2.6 to about 3, about 2.2 to about 3.2, about 2.4 to about 3.2, about 2.6 to about 3.2, about 2.4 to about 3.4, about 2.4 to about 3.2, about 2.6 to about 3.0, about 2.6 to about 3.4, about 2.2 to about 2.9, about 2.3 to about 3.1, about 2.4 to about 3.2, about 2.5 to about 2.9, about 2.5 to about 3, about 2.6 to about 2.8, about 2.5 to about 2.7, or about 2.7 to about 2.9. For example, the pH can be about 2.2, about 2.3, about 2.4, about 2.5, about 2.6, about 2.7, about 2.8, about 2.9, about 3.0, about 3.1 or about 3.2. In various other embodiments, the pH can be about 3.2 to about 3.8, about 3.3 to about 3.7, about 3.3 to about 3.6, about 3.4 to about 3.7, about 3.4 to about 3.6, about 3.4 to about 4, about 3.4 to about 3.9, about 3.4 to about 3.8, about 3.4 to about 3.7, or about 3.4 to about 3.6.

In further embodiments, the composition has a pH of less than or about 4, 3.9, 3.8, 3.7, 3.6, 3.5, 3.4, 3.3, 3.2, 3.1, 3.0, 2.9, 2.8, 2.7, 2.6, or 2.5. In yet further embodiments, the composition has a pH of greater than or about 0.5, 0.75, 1, 1.5, 1.7, 2, 2.1, 2.2, 2.3, 2.4, 2.5, 2.6, 2.7, 2.8, 2.9, 3, 3.1, 3.2, 3.3, 3.4, 3.5, 3.6 or 3.7. pH values can be measured by, for example, an ISFET (ion specific field effect transistor) meter.

In various other embodiments, the composition has a pH greater than the pH at the half equivalence point or Ka of the total sensory modifier.

In various other embodiments, the composition has a pH less than the pH at the equivalence point of the total sensory modifier.

In various other embodiments, e.g., in a solid composition, the salt form and acid forms can be in a solid state, in which the proportion between salt and acid forms is frozen. It should be understood that, in various embodiments, the ratio of the salt fraction to acid fraction in a solid composition, such as a granulated tabletop sweetener, can differ from that of a resulting solution to which the solid composition is added. For example, in some embodiments, a solid state steviol glycoside composition will, upon dissolving, result in a solution having a sensory modifier of which at least 50 wt % is in salt form.

Effective Amount of Sensory Modifier

The sweetness temporal profile of sucrose is deemed highly desirable. The sweetness of some non-nutritive sweeteners, including rebaudioside A, is deemed "sharper" than sucrose in that it has a slower or longer sweetness onset. For example, it has a longer onset time before any sweetness is perceived followed by a rapid increase to maximum sweetness. Such slow-onset sweeteners may also be referred to as "spiky". In contrast, sucrose has a shorter onset, but a less rapid increase to maximum sweetness, which can be referred to as "rounded". Some non-nutritive sweeteners may have a sweetness that lingers longer than sucrose, i.e., the flavor takes longer to dissipate from peak sweetness to a level where sweetness is no longer perceived. A sweetener composition that has a sweetness temporal profile closer to that of sucrose is deemed more desirable.

The compositions of the present disclosure comprise a sensory modifier in an amount effective to modify the sensory attributes of one or more steviol glycosides in the steviol glycoside component. For example, sensory attributes can be modified to more closely approximate the sensory profile of sucrose. In various embodiments, the sensory modifier is present in an amount effective to reduce sweetness linger, reduce bitterness, or both, of the steviol glycoside.

A sensory panel can be used to quantify the amount of sensory modifier effective to reduce bitterness, reduce sweetness linger, or both. Sensory panels are a scientific and reproducible method that is essential to the food science industry. A sensory panel involves a group of three or more individual panelists. The panelists can be a trained, experienced, or even expert assessors, but typically the panelists are not consumers or a naïve assessor for which criteria have not yet been established. Panelists are instructed according to industry-recognized practices to avoid the influence of personal subjectivity and strengthen reproducibility. For example, panelists will evaluate objective sensory attributes of a tested product, but will not typically provide subjective attributes such as personal preference. In various embodiments, the sensory panel can be conducted with three, four, five, or more panelists in a round table format, in which the panelists discuss and evaluate each sensory attribute and come to an agreement with regard to terminology and the attributes of each sample. The panel can provide a numerical scale to describe each attribute. For example, zero can correspond to the absence of the attribute, while another number, such as six, represents the upper bound extreme occurrence of the attribute. The round table format can further involve a panel leader who directs the discussion regarding terminology and directs the panel to evaluate particular products and attributes.

For example, the sensory panel, or assay, can be carried out to characterize the sensory attributes of steviol glycoside compositions having various salt fractions of sensory modifier. Sensory attributes of the solutions can be tested by a panel of at least three, but preferably four or more individuals that are experienced in tasting steviol glycoside compositions. Experienced panelists have experience in tasting steviol glycosides and are familiar with the sensory attributes of individual steviol glycosides and steviol glycoside blends including sweetness linger and bitterness. These experienced panelists are also familiar with tasting steviol glycosides in comparison to control sucrose solutions. The experienced panelists can use a roundtable methodology to assess each sweetness attribute. For example, to test each solution, the experienced panelists can dispense approximately 2 mL of each solution into their own mouths by transfer pipet, disperse the solution by moving their tongues, and record a value for the particular sweetness attribute being tested. For each sweetness attribute, the panelists should agree on a descriptive scale for each sweetness attribute and then record the values for each sweetness attribute against this. If multiple solutions are to be tested in a session, the panelists may cleanse their palates with water. For example, a roundtable assessment of sweetness linger can assign a scale of 0 to 6 with a score of 0 indicating no sweetness linger and a score of 6 indicating extreme sweetness linger. Roundtable assessment of bitterness can assign a scale of 0 to 6 with a score of 0 indicating no sweetness linger and a score of 6 indicating extreme sweetness linger (0=none, 1=trace, 2=slight, 3=moderate, 4=definite, 5=strong, 6=extreme).

As a further example, sweetness intensity of the solutions can be tested by a panel of at least four individuals that are experienced in tasting steviol glycoside compositions. The panelists can use a standard range of 1%, 2%, 3%, 4%, 5%, 6%, 7%, 8%, 9%, 10%, 11%, 12%, 13%, and 14% sucrose solutions corresponding to 1, 2, 3, 4, 5, 6, 7, 8, 9, 10, 11, 12, 13, and 14 SEV. To test each solution, the experienced panelists dispenses approximately 2 mL of each solution into their own mouths by transfer pipet, disperse the solution by moving their tongues, and records an SEV value for each solution based on comparison to the 1%, 2%, 3%, 4%, 5%, 6%, 7%, 8%, 9%, 10%, 11%, 12%, 13%, and 14% sucrose solutions. Between tasting solutions, the panelists are able to cleanse their palates with water. The panelists also can taste the standard range of 1%, 2%, 3%, 4%, 5%, 6%, 7%, 8%, 9%, 10%, 11%, 12%, 13%, and 14% sucrose solutions ad libitum between tasting test solutions to ensure an accurate match to their recorded SEV values with the standard sucrose solutions.

The panelists can be trained panelists. A trained panelist has undergone training to understand the terms and sensory phenomenon associated with those sensory attributes relevant to the tested product. For example, panelists trained for testing steviol glycoside compositions will understand the terms and sensory phenomenon of bitterness, sweetness linger, astringency, typical rebaudioside M-type and rebaudioside N-type phenomenon, mouthfeel, tea/floral/green, and spiky-round sensations which can be produced from steviol glycoside compositions. In various embodiments, the trained panelist will have been trained against reference samples corresponding to bitterness, sweetness linger, astringency, typical rebaudioside M-type and rebaudioside N-type phenomenon, mouthfeel, tea/floral/green, and spiky-round sensations, and thus have calibrated to recognize and assess such criteria. A trained panelist has sufficient acuity to discriminate between the magnitudes and nuances of various the sensations.

A control sample is typically used as a reference point or for comparison purposes. For example, a control sample can be used to qualify the effectiveness of a sensory modifier. The control sample can be a composition such as a solution comprising a steviol glycoside component, but without the presence of the sensory modifier. Other than the sensory modifier, the control sample is otherwise identical, and it should contain the same steviol glycoside component at the same concentration. Other standard samples are commonly used in sensory panels, for example standard samples used to evaluate intensity of sensory attributes. In other embodiments, the control sample may be a modified control sample which contains a different sensory modifier such as a competitor sensory modifier, all acid form sensory modifier or all salt form sensory modifier for the purposes of comparison.

This disclosure is not limited to sensory testing by experienced or trained panelists. For example, it is possible to utilize untrained panelists. However, in the case of untrained panelists, a greater number of panelists is necessary to provide reproducible results, which will typically focus on subjective attributes such as preference.

An exemplified sensory assay and test criteria for further sensory attributes are described in the Examples provided in this disclosure.

Additional description regarding roundtable sensory panels and sensory testing is set forth in PCT/US2018/054743, published Apr. 11, 2019 as WO 2019/071220; PCT/US2018/054691, published Apr. 11, 2019 as WO 2019/071182; U.S. application Ser. No. 16/373,206, published Jul. 25, 2019 as US Patent Application Publication No. 2019/0223481; and U.S. application Ser. No. 16/374,422, published on Jul. 25, 2019 as US Patent Application Publication No. 2019/0223483, each of which is incorporated by reference herein in its entirety.

In some aspects, the amount of sensory modifier effective to decrease sweetness linger can be the amount effective to reduce a sweet linger score by at least 1 unit, wherein a sweetness linger score is determined by at least four panelists trained in tasting steviol glycoside solutions using a roundtable methodology using a scale of 0 to 6 with a score of 0 indicating no sweetness linger and a score of 6 indicating extreme sweetness linger. In other aspects, the amount effective to decrease sweetness linger comprises an amount effective to reduce a sweet linger score by at least 1 unit, 2 units, 3 units, 4 units, 5 units, or 6 units. In other aspects, the amount effective to decrease sweetness linger comprises an amount effective to reduce a sweet linger score to below 5, 4, 3, 2, or 1 unit(s). In some aspects, the amount effective to decrease sweetness linger comprises an amount effective to reduce a sweet linger score to zero.

The composition can have various amounts of sensory modifier. Sensory modifier can be present in the composition in any amount desired for the particular use. For example, sensory modifier can be present in the composition at a total concentration from about 1 ppm to about 1000 ppm, or from about 1 ppm to about 2000 ppm. In some aspects, sensory modifier can be present in the composition at a total concentration from about 100 ppm to about 2000 ppm, about 200 ppm to about 2000 ppm, 300 ppm to about 2000 ppm, 400 ppm to about 2000 ppm, 500 ppm to about 2000 ppm, 600 ppm to about 2000 ppm, 700 ppm to about 2000 ppm, 800 ppm to about 2000 ppm, 900 ppm to about 2000 ppm, or 1000 ppm to about 2000 ppm. In some aspects, sensory modifier can be present in the composition at a total concentration of or greater than about 10, 100, 200, 300, 400, 500, 600, 700, 800, 900, 1000, 110, 1200, 1300, 1400, 1500, 1600, 1700, 1800, 1900, or 2000 ppm. In various aspects, the sensory modifier can be present in the composition at a total concentration from about 100 ppm to about 1000 ppm, about 200 ppm to about 1000 ppm, 300 ppm to about 1000 ppm, 400 ppm to about 1000 ppm, 500 ppm to about 1000 ppm, 600 ppm to about 1000 ppm, 700 ppm to about 1000 ppm, 800 ppm to about 1000 ppm, or 900 ppm to about 1000 ppm. In some aspects, sensory modifier can be present in the composition at a total concentration from about 100 ppm to about 800 ppm, about 200 ppm to about 800 ppm, 300 ppm to about 800 ppm, 400 ppm to about 800 ppm, 500 ppm to about 800 ppm, 600 ppm to about 800 ppm, or 700 ppm to about 800 ppm. In some aspects, sensory modifier can be present in the composition at a total concentration from about 400 ppm to about 800 ppm.

The amount of an individual sensory modifier species in the various composition described herewith can each independently vary. For example, monocaffeoylquinic acid, dicaffeoylquinic acid, or both, can each individually be present in the composition at a concentration from about 1 ppm to about 1000 ppm. In some aspects, monocaffeoylquinic acid, dicaffeoylquinic acid, or both, can each individually be present at a concentration from about 100 ppm to about 1000 ppm, about 200 ppm to about 1000 ppm, 300 ppm to about 1000 ppm, 400 ppm to about 1000 ppm, 500 ppm to about 1000 ppm, 600 ppm to about 1000 ppm, 700 ppm to about 1000 ppm, 800 ppm to about 1000 ppm, 900 ppm to about 1000 ppm. In some aspects, monocaffeoylquinic acid, dicaffeoylquinic acid, or both, can each individually be present at a concentration of or greater than about 10, 50, 100, 200, 300, 400, 500, 600, 700, 800, 900, or 1000 ppm. In some aspects, monocaffeoylquinic acid, dicaffeoylquinic acid, or both, can each individually be present in the composition at a concentration from about 100 ppm to about 800 ppm, about 200 ppm to about 800 ppm, 300 ppm to about 800 ppm, 400 ppm to about 800 ppm, 500 ppm to about 800 ppm, 600 ppm to about 800 ppm, or 700 ppm to about 800 ppm. In some aspects, monocaffeoylquinic acid, dicaffeoylquinic acid, or both, can each individually be present in the composition at a concentration from about 400 ppm to about 800 ppm.

Botanical Source of Sensory Modifier

In various embodiments, the sensory modifier can be isolated from botanical sources. Various botanical sources comprise sensory modifiers and sensory modifiers can be isolated from these botanical sources. Some examples of botanical sources from which sensory modifiers can be isolated include *Eucommia ulmoides*, honeysuckle, *Nicotiana benthamiana*, artichoke, globe artichoke, cardoon, *Stevia rebaudiana*, monkfruit, coffee, coffee beans, green coffee beans, tea, white tea, yellow tea, green tea, oolong tea, black tea, red tea, post-fermented tea, bamboo, heather, sunflower, blueberries, cranberries, bilberries, grouseberries, whortleberry, lingonberry, cowberry, huckleberry, grapes, chicory, eastern purple coneflower, echinacea, Eastern pellitory-of-the-wall, Upright pellitory, Lichwort, Greater celandine, Tetterwort, Nipplewort, Swallowwort, Bloodroot, Common nettle, Stinging nettle, Potato, Potato leaves, Eggplant, Aubergine, Tomato, Cherry tomato, Bitter apple, Thorn apple, Sweet potato, apple, Peach, Nectarine, Cherry, Sour cherry, Wild cherry, Apricot, Almond, Plum, Prune, Holly, Yerba mate, Mate, Guayusa, Yaupon Holly, Kuding, Guarana, Cocoa, Cocoa bean, Cacao, Cacao bean, Kola nut, Kola tree, Cola nut, Cola tree, Ostrich fern, Oriental ostrich fern, Fiddlehead fern, Shuttlecock fern, Oriental ostrich fern, Asian royal fern, Royal fern, Bracken, Brake, Common bracken, Eagle fern, Eastern brakenfern, Clove, Cinnamon, Indian bay leaf, Nutmeg, Bay laurel, Bay leaf, Basil, Great basil, Saint-Joseph's-wort, Thyme, Sage, Garden sage, Common sage, Culinary sage, Rosemary, Oregano, Wild marjoram, Marjoram, Sweet marjoram, Knotted marjoram, Pot marjoram, Dill, Anise, Star anise, Fennel, Florence fennel, Tarragon, Estragon, Mugwort, Licorice, Liquorice, Soy, Soybean, Soyabean, Soya vean, Wheat, Common wheat, Rice, Canola, Broccoli, Cauliflower, Cabbage, Bok choy, Kale, Collard greens, Brussels sprouts, Kohlrabi, Winter's bark, Elderflower, Assa-Peixe, Greater burdock, Valerian, and Chamomile.

Some botanical sources may produce sensory modifiers that are enriched for one or more of caffeic acid, monocaffeoylquinic acids, and dicaffeoylquinic acids. For example, sensory modifiers isolated from yerba mate plant (*Ilex paraguariensis*) are enriched for monocaffeoylquinic and dicaffeoylquinic acids. In other aspects, sensory modifiers isolated from yerba mate plant that are enriched for dicaffeoylquinic acids can comprise 10% or more, 15% or more, 20% or more, 25% or more, 30% or more, 35% or more, 40% or more, 45% or more, or 50% or more, 60% or more, 70% or more, or 80% or more, or 90% or more of a combination of one or more of 1,3-dicaffeoylquinic acid, 1,4-dicaffeoylquinic acid, 1,5-dicaffeoylquinic acid, 3,4-dicaffeoylquinic, 3,5-dicaffeoylquinic acid, and 4,5-dicaffeoylquinic acid, and salts thereof. For example, sensory modifiers isolated from other botanical sources can be enriched for dicaffeoylquinic acids. In other aspects, sensory modifiers isolated from other botanical sources that are enriched for dicaffeoylquinic acids can comprise 10% or more, 15% or more, 20% or more, 25% or more, 30% or more, 35% or more, 40% or more, 45% or more, or 50% or more, 60% or more, 70% or more, or 80% or more, or 90% or more of a combination of one or more of 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, and 4,5-dicaffeoylquinic acid, and salts thereof.

Sensory modifier may be isolated in a variety of ways. Some suitable processes are disclosed in more detail in U.S. application Ser. No. 16/373,206, filed Apr. 4, 2019 and entitled "Steviol Glycoside Solubility Enhancers," which was published on Jul. 25, 2019 as US Patent Application Publication No. 2019/0223481; International Application No. PCT/US2018/054691, filed Oct. 5, 2018 and entitled "Steviol Glycoside Solubility Enhancers;" U.S. Provisional Application No. 62/569,279, filed Oct. 6, 2017, and entitled "Steviol Glycoside Solubility Enhancers;" U.S. application Ser. No. 16/374,894, filed Apr. 4, 2019 and entitled "Methods for Making Yerba Mate Composition," which was published on Aug. 1, 2019 as US Patent Application Publication No. 2019/0231834; International Application No. PCT/US2018/054688, filed Oct. 5, 2018 and entitled "Methods for Making Yerba Mate Composition;" and U.S. Provisional Application Ser. No. 62/676,722, filed May 25, 2018, and entitled "Methods for Making Yerba Mate Extract Composition." For example, sensory modifier may be isolated from a botanical source that comprises one or more of monocaffeoylquinic acid, dicaffeoylquinic acid, and salts thereof. For example, yerba mate biomass and stevia biomass can be used to prepare sensory modifier. In one exemplary process, sensory modifier is prepared from commercially obtained comminuted yerba mate biomass. Briefly, yerba mate biomass is suspended in 50% (v/v) ethanol/water, shaken for at least 1 hour, and the resulting mixture filtered to obtain an initial extract. The initial extract is diluted to 35% (v/v) ethanol with water and refiltered. Refiltered permeate is then applied to a column of AMBERLITE® FPA 53 resin that has been equilibrated in 35% (v/v) ethanol/water and the column permeate is discarded. The column is washed with 35% (v/v) ethanol/water and the column permeate is discarded. The column is then eluted with 10% (w/v) FCC grade sodium chloride in 50% (v/v) ethanol/water and the eluent retained. Nitrogen gas is blown at room temperature over a surface of the eluent to remove ethanol and reduce the eluent to ⅓ of its original volume. The reduced volume eluent is then filtered through a 0.2 µm polyethersulfone filter and then decolored by passing through a 3 kDa molecular weight cutoff membrane. The decolored permeate is retained and desalted by passing through a nanofiltration membrane. The desalted permeate is then freeze-dried to obtain the sensory modifier. This process is also suitable to obtain sensory modifier from stevia biomass and can be adapted to obtain sensory modifier from other botanical sources for example those described above.

In some aspects, the sensory modifier can be a blend of sensory modifier isolated from more than one botanical source.

In some aspects, the composition having steviol glycoside and sensory modifier does not include certain compound above a certain cutoff wt %. For example, the composition can comprise less than 0.3% (wt) of malonate, malonic acid, oxalate, oxalic acid, lactate, lactic acid, succinate, succinic acid, malate, or malic acid; or less than 0.05% (wt) of pyruvate, pyruvic acid, fumarate, fumaric acid, tartrate, tartaric acid, sorbate, sorbic acid, acetate, or acetic acid; or less than about 0.05% (wt) of chlorophyll.

Compositions

Steviol glycosides together with one or more sensory modifiers can be incorporated in any known edible material (referred to herein as a "sweetenable composition") or other composition intended to be ingested and/or contacted with the mouth of a human or animal, such as, for example, pharmaceutical compositions, edible gel mixes and compositions, dental and oral hygiene compositions, foodstuffs (e.g., confections, condiments, chewing gum, cereal compositions, baked goods, baking goods, cooking adjuvants, dairy products, and tabletop sweetener compositions), beverages, and other beverage products (e.g., beverage mixes, beverage concentrates, etc.). Examples of such compositions and aspects thereof are set forth in PCT International Publication Nos. WO 2019/071220 and WO 2019/071182 and in US Patent Application Publication Nos. 2019/0223481 and 2019/0223483, each of which is incorporated by reference herein in its entirety.

A pharmaceutical composition comprises a pharmaceutically active substance and a pharmaceutically-acceptable carrier or excipient material. A dental composition comprises an active dental substance, which improves the aesthetics or health of at least a portion of the oral cavity, and a base material, which is an inactive substance used as a vehicle.

The steviol glycoside composition can be a tabletop sweetener composition. The tabletop sweetener composition can further comprise a variety of other ingredients, such as one or more bulking agent, additive, anti-caking agent, functional ingredient, or any combination thereof. Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maltitol, lactitol, isomalt, maltose, tagatose, lactose, inulin, glycerol, propylene glycol, polyols, polydextrose, fructooligosaccharides, cellulose and cellulose derivatives, and the like, and mixtures thereof. Additionally, in accordance with still other aspects, granulated sugar (sucrose) or other caloric sweeteners such as crystalline fructose, other carbohydrates, or sugar alcohol can be used as a bulking agent due to their provision of good content uniformity without the addition of significant calories. A tabletop sweetener composition also may be embodied in the form of a liquid, wherein a sweetener composition comprising a steviol glycoside component and including one or more sensory modifier, is combined with a liquid carrier. Suitable non-limiting examples of carrier agents for liquid tabletop functional sweeteners include water, alcohol, polyol, glycerin base or citric acid base dissolved in water, and mixtures thereof. Additional aspects of tabletop sweetener are set forth in PCT International Publication Nos. WO 2019/071220 and WO 2019/071182 and in US Patent Application Publication Nos. 2019/0223481 and 2019/0223483, each of which is incorporated by reference herein in its entirety.

The steviol glycoside composition can be a beverage. As used herein a "beverage product" includes, but is not limited to, a ready-to-drink beverage, a beverage concentrate, a beverage syrup, frozen beverage, or a powdered beverage. Suitable ready-to-drink beverages include carbonated and non-carbonated beverages. Carbonated beverages include, but are not limited to, enhanced sparkling beverages, cola, lemon-lime flavored sparkling beverage, orange flavored sparkling beverage, grape flavored sparkling beverage, strawberry flavored sparkling beverage, pineapple flavored sparkling beverage, ginger-ale, soft drinks and root beer. Non-carbonated beverages include, but are not limited to fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, cafe au lait, milk tea, fruit milk beverages), beverages containing cereal extracts, smoothies and combinations thereof. Examples of frozen beverages, include, but are not limited to, icees, frozen cocktails, daiquiris, pina coladas, margaritas, milk shakes, frozen coffees, frozen lemonades, granitas, and slushees. Beverage concentrates and beverage syrups can be prepared with an initial volume of liquid matrix (e.g., water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

In one embodiment, a beverage contains a sweetener composition comprising a steviol glycoside component and sensory modifier. Any sweetener composition comprising steviol glycosides and sensory modifier detailed herein can be used in the beverages. In another embodiment, a method of preparing a beverage comprises combining a liquid matrix, a steviol glycoside component, and sensory modifier. The method can further comprise addition of one or more sweeteners, additives and/or functional ingredients. In still another embodiment, a method of preparing a beverage comprises combining a liquid matrix and a sweetener composition comprising a steviol glycoside component and sensory modifier.

In another embodiment, a beverage contains a sweetener composition containing steviol glycosides, wherein the steviol glycosides are present in the beverage in an amount ranging from about 1 ppm to about 10,000 ppm, such as, for example, from about 25 ppm to about 800 ppm. In another embodiment, steviol glycosides are present in the beverage in an amount ranging from about 100 ppm to about 600 ppm. In yet other aspects, steviol glycosides are present in the beverage in an amount ranging from about 100 to about 200 ppm, from about 100 ppm to about 300 ppm, from about 100 ppm to about 400 ppm, or from about 100 ppm to about 500 ppm. In still another embodiment, steviol glycosides are present in the beverage in an amount ranging from about 300 to about 700 ppm, such as, for example, from about 400 ppm to about 600 ppm. In a particular embodiment, steviol glycosides are present in the beverage in an amount of about 500 ppm.

In one embodiment, the composition is a beverage and the total glycoside content in the beverage is about 50 to 1500 ppm, or 100 to 1200 ppm, 200 to 1000 ppm, 300 to 900 ppm, 350 to 800 ppm, 400 to 600 ppm, or 450 to 550 ppm. In one embodiment, steviol glycosides other than Reb D, Reb M, Reb B and/or Reb A, or other than Reb D and/or Reb B, and optionally other than Reb G, Reb O, Reb N, and/or Reb E, e.g., sensory modifier, are present in a beverage at about at least 1 ppm to about 600 ppm, e.g., about 50 ppm to about 500 ppm, including at least 1, 5, 10, 20, 30, 40, 50, 125, 150, 150, 175, or 200 ppm. In one embodiment, steviol glycosides other than Reb D, Reb M, Reb B and/or Reb A, or other than Reb D and/or Reb B, and optionally other than Reb G, Reb O, Reb N, and/or Reb E, are present in a beverage at about 1 to 600 ppm 10 to 400, 50 to 200, 75 to 150, 5 to 200, 10 to 100, 20 to 90, 30 to 80 ppm, and the like. In one embodiment, steviol glycosides other than Reb D, Reb M, Reb B and/or Reb A, are present in a beverage at about 1 to 600 ppm 10 to 400, 50 to 200, 75 to 150, 5 to 200, 10 to 100, 20 to 90, 30 to 80 ppm, and the like.

Additional Components

In some aspects, the composition having the steviol glycoside component and sensory modifier, also contains one or more additional non-steviol glycoside sweetener compounds. The non-steviol glycoside sweetener compounds can be any type of sweetener, for example, a sweetener obtained from a plant or plant product, or a physically or chemically modified sweetener obtained from a plant, or a synthetic sweetener. Exemplary non-steviol glycoside sweeteners include sucrose, fructose, glucose, erythritol, maltitol, lactitol, sorbitol, mannitol, xylitol, tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligosaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, sucralose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof. D- or L-configurations can be used when applicable. Non-steviol glycoside sweeteners and aspects thereof are also described in PCT International Publication Nos. WO 2019/071220 and WO 2019/071182 and in US Patent Application Publication Nos. 2019/0223481 and 2019/0223483, each of which is incorporated by reference herein in its entirety.

In various embodiments, the steviol glycoside compositions can further optionally include a liquid carrier, binder matrix, additional additives, and/or the like. In some aspects, the sweetener composition contains additives including, but not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof. In some aspects, the additives act to improve the temporal and flavor profile of the sweetener to provide a sweetener composition with a favorable taste, such as a taste similar to sucrose. Examples of such ingredients and aspects thereof are PCT International Publication Nos. WO 2019/071220 and WO 2019/071182 and in US Patent Application Publication Nos. 2019/0223481 and 2019/0223483, each of which is incorporated by reference herein in its entirety.

The sweetener composition comprising a steviol glycoside component and sensory modifier can also contain one or more functional ingredients, which provide a real or perceived heath benefit to the composition. Functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof. Examples of functional ingredients and aspects thereof are set forth in PCT International Publication Nos. WO 2019/071220 and WO 2019/071182 and in US Patent Application Publication Nos. 2019/0223481 and 2019/0223483, each of which is incorporated by reference herein in its entirety.

The present invention can be better understood by reference to the following examples which are offered by way of illustration. The present invention is not limited to the examples given herein.

EXAMPLES

Materials and Methods

Various steviol glycoside components were tested.

The tested sensory modifier was a mixture of monocaffeoylquinic acids and dicaffeoylquinic acids prepared from yerba mate and subsequently adjusted to have various salt fractions. Table 2 lists the contents and source of various components.

Solutions were prepared which contained either a steviol glycoside component alone, for use as a control sample, or a steviol glycoside component and sensory modifier in a 2:1 molar ratio, which also corresponds to a 2:1 weight ratio. Solutions were prepared by dissolving the steviol glycoside components and sensory modifiers into reverse osmosis water at the indicated concentrations and/or ratios.

TABLE 2

| Component | Ingredients | Source |
|---|---|---|
| Steviol Glycoside Component Example A | ≥99 wt % rebaudioside M Laboratory purified | Cargill, Inc. (Wayzata, MN) |
| Steviol Glycoside Component Example B | ≥90 wt % Rebaudioside N ≈ about 10 wt % or less rebaudioside D | ChromaDex, Inc. (Irvine, CA) |
| Steviol Glycoside Component Example C | ≥85 wt % rebaudioside M ≈5-15 wt % rebaudioside D | Cargill, Inc. (Wayzata, MN) |
| Sensory Modifier | Mixture containing mono- and dicaffeoylquinic acids, prepared from Yerba Mate | Cargill, Inc. (Wayzata, MN) |

Assays were carried out to characterize the sensory attributes of steviol glycoside compositions having various salt fractions of sensory modifier. Sensory attributes of the solutions were tested by a panel of at least four individuals that are experienced in tasting steviol glycoside compositions. The experienced panelists used a roundtable methodology to assess each sweetness attribute. To test each solution, the experienced panelists dispensed approximately 2 mL of each solution into their own mouths by transfer pipet, dispersed the solution by moving their tongues, and recorded a value for the particular sweetness attribute being tested. Between tasting solutions, the panelists were able to cleanse their palates with water. For each sweetness attribute, the panelists agreed on a descriptive scale with relative intensities assigned for each sweetness attribute and then recorded the values for each sweetness attribute against this. Table 3 lists the scoring criteria for various sensory attributes.

TABLE 3

| Sensory Attribute | Scoring Criteria |
|---|---|
| Spiky-Rounded | 0—like Reb M/N (spiky)<br>1—mostly spiky, some rounded<br>2—mostly rounded, some spiky<br>3—rounded |
| Sweet Linger | 0—none,<br>1—trace/faint<br>2—slight<br>3—moderate<br>4—definite<br>5—strong<br>6—extreme, typical Reb M/N |
| Tea/floral/green | 0—none,<br>1—trace<br>2—slight/some<br>3—moderate<br>4—definite<br>5—strong |
| Mouthfeel | 0—water<br>1—sucrosey<br>2—syrupy |
| Astringency | 0—none,<br>1—trace<br>2—slight/some<br>3—moderate<br>4—definite<br>5—strong |
| Bitter | 0—none,<br>1—trace/faint<br>2—slight<br>3—moderate<br>4—definite<br>5—strong<br>6—Extreme |
| Typical Reb M/N Attributes (astringency, metallic, powdery, numbing, vapor) | 0—none,<br>1—trace/faint<br>2—slight<br>3—moderate<br>4—definite<br>5—strong<br>6—Extreme |
| Other off-flavor | 0—none,<br>1—trace/faint<br>2—slight<br>3—moderate<br>4—definite<br>5—strong<br>6—Extreme |

Example 1—Aqueous Test Samples

A mixture of monocaffeoylquinic acid and dicaffeoylquinic acid was obtained from yerba mate to provide the sensory modifier in acid form. Separately from the steviol glycoside component, the mixture of monocaffeoylquinic acid and dicaffeoylquinic acid was adjusted with sodium hydroxide or potassium hydroxide to obtain sodium salts or potassium salts (each corresponding to 100% salt form). The resulting samples were freeze-dried to provide sensory modifier (SM) in ready-to-use, powder-form. A series of samples were prepared from the sensory modifier. For each sample, the final concentration of sensory modifiers was 470-500 ppm (wt/wt), including the contribution of salt mass. The preparation of each sample including amount of each ingredient is shown in Tables 4-6. Steviol Glycoside Component Examples A and B were used alone as a control sample and also used as the starting point for the sensory modified samples.

TABLE 4

| Steviol Glycoside Component Example A Solution | | | |
|---|---|---|---|
| SG (g) | Water (g) | Total (g) | SG ppm |
| Target | | | |
| 0.0455 | 64.95 | 65 | 700 |
| Actual | | | |
| 0.0454 | 64.61 | 64.66 | 702 |
| Steviol Glycoside Component Example B Solution | | | |
| SG (g) | Water (g) | Total (g) | SG ppm |
| Target | | | |
| 0.0455 | 64.95 | 65 | 700 |
| Actual | | | |
| 0.0464 | 66.02 | 66.07 | 702 |

TABLE 5

| Sodium salt mixture of monocaffeoylquinic acid and dicaffeoylquinic acid and Steviol Glycoside Component A (Na SM 472 ppm:Reb M 700 ppm) | | | |
|---|---|---|---|
| Na SM (g) | Reb M Soln (g) | Total (g) | SM ppm |
| Target | | | |
| 0.0094 | 19.9906 | 20 | 470 |
| Actual | | | |
| 0.0094 | 19.9965 | 20.01 | 470 |
| Potassium salt mixture of monocaffeoylquinic acid and dicaffeoylquinic acid and Steviol Glycoside Component Example A (K SM 489 ppm:Reb M 700 ppm) | | | |
| K SM (g) | Reb M Soln (g) | Total (g) | SM ppm |
| Target | | | |
| 0.0098 | 19.9902 | 20 | 490 |
| Actual | | | |
| 0.0098 | 20.0342 | 20.04 | 489 |

TABLE 6

| Sodium salt mixture of monocaffeoylquinic acid and dicaffeoylquinic acid and Steviol Glycoside Component Example B (Na SM 478 ppm:Reb N 700 ppm) | | | |
|---|---|---|---|
| Na SM (g) | Reb N Soln (g) | Total (g) | SM ppm |
| Target | | | |
| 0.0095 | 19.9905 | 20 | 475 |
| Actual | | | |
| 0.0096 | 20.0397 | 20.05 | 479 |

TABLE 6-continued

Potassium salt mixture of monocaffeoylquinic acid and dicaffeoylquinic acid and Steviol Glycoside Component Example B
(K SM 496 ppm:Reb N 700 ppm)

| K SM (g) | Reb N Soln (g) | Total (g) | SM ppm |
|---|---|---|---|
| | Target | | |
| 0.0099 | 19.9901 | 20 | 495 |
| | Actual | | |
| 0.0099 | 20.0589 | 20.07 | 493 |

For each sample, the flavor profile was compared to the steviol glycoside solution alone as well as to the sample with differing salt composition.

Both potassium and sodium salt versions of sensory modifier with Reb M showed improvements over Reb M alone. Table 7 shows reported Sensory Attributes for each tested composition. Table 8 shows the SEV values reported for each tested composition and provides the taster comments. As shown in Table 7, the potassium and sodium salt forms resulted in an a substantially more rounded sweetness profile for Reb M. The potassium and sodium salt forms resulted in substantially reduced sweet linger and greatly reduced bitterness for both Reb M and Reb N. As shown in Table 8, the potassium and sodium salt forms resulted in a slightly decreased SEV. The potassium salt imparts slightly more astringency than the sodium salt version of the total sensory modifier. There is a faint cherry fruit flavor that was introduced with the potassium salt. Thus, it is shown that the sodium and potassium salt form of the sensory modifier results in significant modulation of the sensory profile of a steviol glycoside component. Given the number of various sensory attributes, which can each vary independently, it is surprising that the salt form sensory modifier provides desirable results in each tested, as well as overall, without significant downsides in any one area. Moreover, the bitterness reduction and sweet linger reduction represent very significant improvements over the sample lacking the sensory modifier.

TABLE 8

| Conc. Sensory Modifier | Conc. Steviol Glycoside Component | SEV | Comments |
|---|---|---|---|
| 0 | 702 ppm Reb Component Example A | 9.5 | Typical taste characteristic of a primarily Reb M composition |
| 0 | 702 ppm Reb Component Example B | 8.5 | a slightly longer lag in initial sweetness perception and a bit longer than M to reach max sweetness (less spiky); slightly less sweet linger than M |
| 470 ppm (sodium salt) | 702 ppm Reb Component Example A | 9 | slightly mouthdrying, faint metallic aftertaste/astringency, more cohesive throughout the entire tasting experience |
| 489 ppm (potassium salt) | 702 ppm Reb Component Example A | 8.5 | slightly more spiky than Na-salt, but then a faint acidic note followed by faint fruit (cherry?) note, sour astringency, sensory attributes seem a bit more sequenced and separated |
| 479 ppm (sodium salt) | 702 ppm Reb N | 8 | linger is reduced |
| 493 ppm (potassium salt) | 702 ppm Reb Component Example B | 8 | faint cherry cough syrup, cherry jolly rancher, faint melon |

Example 2—Mock Beverage Test

Mock beverages were prepared using a steviol glycoside component, a sensory modifier, and a mock beverage system.

To prepare the mock beverage system, citric acid (anhydrous, final concentration 0.1 wt %) and potassium citrate (monohydrate, final concentration 0.026 wt %) were dissolved in deionized water. To this buffer system, a Steviol Glycoside Component Example C was added so as to result in a final concentration of 350 ppm (wt/wt) and allowed to dissolve. Steviol Glycoside Component Example C contains rebaudioside M and D.

A mixture monocaffeoylquinic acids and dicaffeoylquinic acids in acid form (i.e., at an acid fraction of 100 mol %) were treated with sodium hydroxide to introduce a salt

TABLE 7

| | | Sensory Attribute Scoring | | | | | | | |
|---|---|---|---|---|---|---|---|---|---|
| Conc. Sensory Modifier | Conc. Steviol Glycoside Component | Spiky-Rounded | Sweet Linger | Tea/floral/green | Mouthfeel | Astringency | Bitter | Typical Reb M/N Attributes* | Other off-flavor |
| 0 | 702 ppm Component Example A | 0 | 4 | 0 | 0 | ND | 5 | 4 | ND |
| 0 | 702 ppm Example B | 1 | 3 | 0 | 0 | ND | 5 | 4 | ND |
| 470 ppm (sodium salt) | 702 ppm Component Example A | 2 | 2 | 0 | 1 | 1 | 0 | 0 | ND |
| 489 ppm (potassium salt) | 702 ppm Component Example A | 2 | 1 | 0 | 1 | 2 | 0 | 0 | 3 - cherry fruit |
| 479 ppm (sodium salt) | 702 ppm Component Example B | 1 | 2 | 0 | 1 | 1 | 0 | 0 | ND |
| 493 ppm (potassium salt) | 702 ppm Component Example B | 1 | 2 | 0 | 1 | 1 | 1 | 0 | 3 - cherry fruit |

*= Typical Reb M and Reb N attributes are astringency, metallic, powdery, numbing, vapory
ND = not detected fraction and adjust the salt mol % fraction to various mole-fractions as shown in Table 9. The resulting caffeoylquinic acid mixtures thus contained monocaffeoylquinic acids in acid form, dicaffeoylquinic acids in acid form, monocaffeoylquinic acids in salt form, and dicaffeoylquinic acids in salt form. The resulting mixtures were freeze-dried to provide several ready-to-use sensory modifiers in powder form. These sensory modifiers are described in Table 9 according to the mol % of sodium, which in the present example is equivalent to the salt fraction. Due to the similar molecular weights between acid and salt forms, the mol % Na can be interpreted as approximately equivalent to a wt %.

Next, a series of test beverages were prepared by combining the above-described beverage system and sensory modifiers. For each resulting mock beverage sample, the final concentration of sensory modifier was 250 ppm (wt/wt), adjusted based on the total mass of the sensory modifiers, excluding the contribution of salt mass. For each sample, the flavor profile was compared to the steviol glycoside solution alone as well as to the samples with differing salt fraction. After each sample was tasted, the panel voted based on personal preference as to which salt fraction provided a better sweet-taste profile.

As noted in the table, preference was given, in part, to all samples in the 50 mol % to 80 mol % salt fraction range, with the most optimal composition being 70 mol %. At high salt levels, 80 mol % salt to 100 mol % salt, the products were not effective in reducing the sweetness linger of Reb M and had an unpleasant musty, earthy flavor. Between 60 mol % and 80 mol % salt, the products were very effective in reducing the sweetness linger and bitterness of Reb M and the unpleasant mustiness became faint. At 70 mol % salt, the mustiness was very mild and sweetness was present up front, with a clean and rounded taste profile, and very reduced sweetness linger. At less than 60 mol % salt, astringency became increasingly more pronounced, together with tongue coating and tingling.

The data show that a particular range of salt fraction (mol % salt) of the sensory modifier provides significant reduction in bitterness and sweetness linger. This result is particularly surprising because it cannot be predicted by looking at the acid form alone or salt form alone. For example, the acid form alone (0 mol % salt) resulted in undesirable sour flavor and astringency. The salt form alone (100 mol % salt) provided a result which was similar to having a lack of any sensory modifier at all. Neither acid nor salt form alone provided any noticeable reduction in bitterness or sweetness linger. It is thus surprising that a combination of the acid and salt introduce the advantageous effect of reducing bitterness and reducing sweetness linger. It is also surprising that this advantage is not achieved in all cases where both salt and acid are present, e.g., mixtures less than 50 mol % salt do not offer the same advantages and mixtures above 90 mol % begin to offer only slight reduction in sweetness linger.

TABLE 9

Effect of Salt Fraction on Sensory Attributes and Preference

| Mol % Na | Conc. Sensory Modifier (ppm) | Conc. Steviol Glycoside Component Example C (ppm) | Notes: | Preference mapping |
|---|---|---|---|---|
| N/A | 0 | 350 | Reb M alone shows sweetness linger and slight bitterness. | |
| 0 | 250 | 350 | Minimal but present musty, earthy notes. Strong astringency. Sour flavor. | 7/7 agree 25% is better than 0% salt |
| 25 | 250 | 350 | Minimal but present musty, earthy notes. Strong astringency. Sour flavor. | 7/7 agree 50% is better than 25% salt |
| 50 | 250 | 350 | Minimal but present musty, earthy notes. Sweetness linger reduced. Some astringency. Some sour flavor. | 6/7 agree 60% is better than 50% salt |
| 60 | 250 | 350 | Minimal but present musty, earthy notes. Sweetness linger noticeably reduced. Bitterness reduced. | 4/7 agree 70% is better than 60% salt |
| 70 | 250 | 350 | Some musty, earthy notes. Sweetness linger noticeably reduced. Bitterness reduced. | Selected as best option |
| 80 | 250 | 350 | Slight musty, earthy notes. Sweetness linger noticeably reduced. Bitterness reduced. | 5/7 agree 70% is better than 80% salt |
| 90 | 250 | 350 | Strong musty, earthy notes. Sweetness linger slightly reduced. | 7/7 agree 80% is better than 90% salt |
| 100 | 250 | 350 | Strong musty, earthy notes. Sweetness linger similar to Reb M alone | 7/7 agree 90% is better than 100% salt |

**Note: this batch of SE material was likely contaminated with an off-flavor from processing. The musty/earthy notes have not been noticed before or since and should be ignored in this study.

Exemplified Embodiments

The present disclosure provides for the following embodiments, the numbering of which is not to be construed as designating levels of importance:

Embodiment 1 relates to a steviol glycoside composition, the composition comprising:
 a steviol glycoside component; and
 a sensory modifier in an amount effective to reduce sweetness linger, reduce bitterness, or both,
 wherein the sensory modifier is a mixture comprising one or more caffeoyl-substituted quinic acids and one or more salts thereof, and at least 50 wt % of the sensory modifier is in salt form.

Embodiment 2 relates to a steviol glycoside composition with reduced sweetness linger, the composition comprising:
 a steviol glycoside component; and
 a sensory modifier in an amount effective to reduce sweetness linger, reduce bitterness, or both,
 wherein the sensory modifier comprises a salt fraction and an acid fraction,
 wherein the salt fraction comprises one or more compounds selected from the group consisting of a salt of a monocaffeoylquinic acid and a salt of a dicaffeoylquinic acid, wherein the acid fraction comprises one or more compounds selected from the group consisting of a monocaffeoylquinic acid and a dicaffeoylquinic acid, and wherein the salt fraction comprises at least 50 wt % of the total sensory modifier.

Embodiment 3 relates to the steviol glycoside composition of Embodiment 1 or 2, wherein the sensory modifier comprises one or more of chlorogenic acid (5-O-caffeoylquinic acid), neochlorogenic acid (3-O-caffeoylquinic acid), cryptochlorogenic acid (4-O-caffeoylquinic acid), 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, or 4,5-dicaffeoylquinic acid, and salts thereof.

Embodiment 4 relates to the steviol glycoside composition of any one of Embodiments 1-3, wherein the sensory modifier is a mixture of one or more monocaffeoylquinic acid and one or more dicaffeoylquinic acid, and salts thereof.

Embodiment 5 relates to the steviol glycoside composition of any one of Embodiments 2-4, wherein the monocaffeoylquinic acid is one or more of chlorogenic acid (5-O-caffeoylquinic acid), neochlorogenic acid (3-O-caffeoylquinic acid), or cryptochlorogenic acid (4-O-caffeoylquinic acid).

Embodiment 6 relates to the steviol glycoside composition of any one of Embodiments 2-5, wherein the monocaffeoylquinic acid salts are one or more of a salt of 3-O-caffeoylquinic acid, a salt of 4-O-caffeoylquinic acid, or a salt of 5-O-caffeoylquinic acid.

Embodiment 7 relates to the steviol glycoside composition of any one of Embodiments 2-5, wherein the dicaffeoylquinic acid salts are one or more of a salt of 1,3-dicaffeoylquinic acid, a salt of 1,4-dicaffeoylquinic acid, a salt of 1,5-dicaffeoylquinic acid, a salt of 3,4-dicaffeoylquinic acid, a salt of 3,5-dicaffeoylquinic acid, or a salt of 4,5-dicaffeoylquinic acid.

Embodiment 8 relates to the steviol glycoside composition of any one of Embodiments 2-5, wherein the dicaffeoylquinic acid is one or more of 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, or 4,5-dicaffeoylquinic acid.

Embodiment 9 relates to the steviol glycoside composition of any one of Embodiments 1-8, wherein 10 wt % or more of the sensory modifier is dicaffeoylquinic acid, and salts thereof.

Embodiment 10 relates to the steviol glycoside composition of any one of Embodiments 1-9, wherein 25 wt % or more of the sensory modifier is dicaffeoylquinic acid, and salts thereof.

Embodiment 11 relates to the steviol glycoside composition of any one of Embodiments 1-10, wherein 50 wt % or more of the sensory modifier is dicaffeoylquinic acid, and salts thereof.

Embodiment 12 relates to the steviol glycoside composition of any one of Embodiments 1-11, wherein the sensory modifier is a mixture having a ratio of 3:1 to 1:3 of monocaffeoylquinic acids and salts of monocaffeoylquinic acids:dicaffeoylquinic acids and salts of dicaffeoylquinic acids.

Embodiment 13 relates to the steviol glycoside composition of any one of Embodiments 1-12, wherein the sensory modifier has a ratio of about 1:1 of monocaffeoylquinic acids and salts of monocaffeoylquinic acids:dicaffeoylquinic acids and salts of dicaffeoylquinic acids.

Embodiment 14 relates to the steviol glycoside composition of any one of Embodiments 1-13, wherein the sensory modifier is a mixture from 40 wt % to 60 wt % dicaffeoylquinic acid, and salts thereof.

Embodiment 15 relates to the steviol glycoside composition of any one of Embodiments 1-14, wherein from 90 wt % or less of the sensory modifier is in salt form.

Embodiment 16 relates to the steviol glycoside composition of any one of Embodiments 1-15, wherein from 80 wt % or less of the sensory modifier is in salt form.

Embodiment 17 relates to the steviol glycoside composition of any one of Embodiments 1-16, wherein from 50 wt % to 90 wt % of the sensory modifier is in salt form.

Embodiment 18 relates to the steviol glycoside composition of any one of Embodiments 1-17, wherein from 60 wt % to 80 wt % of the sensory modifier is in salt form.

Embodiment 19 relates to the steviol glycoside composition of any one of Embodiments 1-18, wherein from 65 wt % to 75 wt % of the sensory modifier is in salt form.

Embodiment 20 relates to the steviol glycoside composition of any one of Embodiments 1-19, wherein at least 10 wt % of the sensory modifier is in acid form.

Embodiment 21 relates to the steviol glycoside composition of any one of Embodiments 1-20, wherein at least 20 wt % of the sensory modifier is in acid form.

Embodiment 22 relates to the steviol glycoside composition of any one of Embodiments 1-21, wherein from 20 wt % to 40 wt % of the sensory modifier is in acid form.

Embodiment 23 relates to the steviol glycoside composition of any one of Embodiments 1-22, wherein from 25 wt % to 35 wt % of the sensory modifier is in acid form.

Embodiment 24 relates to the steviol glycoside composition of any one of Embodiments 2-23, wherein the salt fraction comprises at least 60 wt % of the total sensory modifier.

Embodiment 25 relates to the steviol glycoside composition of any one of Embodiments 2-23, wherein the salt fraction comprises less than 90 wt % of the total sensory modifier.

Embodiment 26 relates to the steviol glycoside composition of any one of Embodiments 2-23, wherein the salt fraction comprises less than 80 wt % of the total sensory modifier.

Embodiment 27 relates to the steviol glycoside composition of any one of Embodiments 2-23, wherein the salt fraction comprises 60 to 80 wt % of the total sensory modifier.

Embodiment 28 relates to the steviol glycoside composition of any one of Embodiments 2-23, wherein the salt fraction comprises 65 to 75 wt % of the total sensory modifier.

Embodiment 29 relates to the steviol glycoside composition of any one of Embodiments 2-28, wherein the acid fraction comprises at least 10 wt % of the total sensory modifier.

Embodiment 30 relates to the steviol glycoside composition of any one of Embodiments 2-29, wherein the acid fraction comprises at least 20 wt % of the total sensory modifier.

Embodiment 31 relates to the steviol glycoside composition of any one of Embodiments 2-30, wherein the acid fraction comprises 20 to 40 wt % of the total sensory modifier.

Embodiment 32 relates to the steviol glycoside composition of any one of Embodiments 2-31, wherein the acid fraction comprises 25 to 35 wt % of the total sensory modifier.

Embodiment 33 relates to the steviol glycoside composition of any one of Embodiments 1-32, wherein the sensory modifier comprises one or more salts selected from sodium, potassium, magnesium, and calcium.

Embodiment 34 relates to the steviol glycoside composition of any one of Embodiments 1-33, wherein the sensory modifier comprises one or more sodium salt.

Embodiment 35 relates to the steviol glycoside composition of any one of Embodiments 1-34, wherein the sensory modifier comprises one or more potassium salt.

Embodiment 36 relates to the steviol glycoside composition of any one of Embodiments 1-35, wherein the sensory modifier comprises a mixture of one or more potassium salt and one or more sodium salt.

Embodiment 37 relates to the steviol glycoside composition of any one of Embodiments 1-36, wherein the composition has a pH greater than the pH at the half equivalence point of the sensory modifier.

Embodiment 38 relates to the steviol glycoside composition of any one of Embodiments 1-37, wherein the composition has a pH less than the pH at the equivalence point of the sensory modifier.

Embodiment 39 relates to the steviol glycoside composition of any one of Embodiments 1-38, wherein the composition has a pH less than 4.0.

Embodiment 40 relates to the steviol glycoside composition of any one of Embodiments 1-39, wherein the composition has a pH from 1.7 to 4.0.

Embodiment 41 relates to the steviol glycoside composition of any one of Embodiments 1-40, wherein the composition has a pH greater than 2.0.

Embodiment 42 relates to the steviol glycoside composition of any one of Embodiments 1-41, wherein the composition has a pH greater than 2.5.

Embodiment 43 relates to the steviol glycoside composition of any one of Embodiments 1-42, wherein at least a portion of the sensory modifier is prepared from a botanical source.

Embodiment 44 relates to the steviol glycoside composition of any one of Embodiments 1-43, wherein the botanical source is yerba mate, rosemary, chicory, stevia, artichoke, coffee, or a mixture thereof.

Embodiment 45 relates to the steviol glycoside composition of any one of Embodiments 1-44, wherein at least a portion of the sensory modifier is prepared from yerba mate.

Embodiment 46 relates to the steviol glycoside composition of any one of Embodiments 1-45 wherein at least a portion of the sensory modifier is prepared from stevia.

Embodiment 47 relates to the steviol glycoside composition of any one of Embodiments 1-46, wherein the steviol glycoside component comprises one or more rebaudioside D, rebaudioside M, rebaudioside O, rebaudioside N, rebaudioside A, or a combination thereof.

Embodiment 48 relates to the steviol glycoside composition of any one of Embodiments 1-47, wherein the steviol glycoside component comprises rebaudioside D, rebaudioside M, or a combination thereof.

Embodiment 49 relates to the steviol glycoside composition of any one of Embodiments 1-48, wherein at least 80 wt % of the steviol glycoside component is rebaudioside M based on the total weight of steviol glycosides in the steviol glycoside composition.

Embodiment 50 relates to the steviol glycoside composition of any one of Embodiments 1-49, wherein at least 90 wt % of the steviol glycoside component is rebaudioside M based on a total weight of steviol glycosides in the steviol glycoside composition.

Embodiment 51 relates to the steviol glycoside composition of any one of Embodiments 1-50, wherein the composition comprises from 100 ppm to 1600 ppm of the steviol glycoside.

Embodiment 52 relates to the steviol glycoside composition of any one of Embodiments 1-51, wherein the composition comprises at least 200 ppm of the steviol glycoside component.

Embodiment 53 relates to the steviol glycoside composition of any one of Embodiments 1-52, wherein the composition comprises from 200 ppm to 1000 ppm of the steviol glycoside component.

Embodiment 54 relates to the steviol glycoside composition of any one of Embodiments 1-53, wherein the composition comprises at least 300 ppm of the steviol glycoside component.

Embodiment 55 relates to the steviol glycoside composition of any one of Embodiments 1-54, wherein the composition comprises from 400 ppm to 800 ppm of the steviol glycoside component.

Embodiment 56 relates to the steviol glycoside composition of any one of Embodiments 1-55, wherein the composition comprises at least 300 ppm of the steviol glycoside component.

Embodiment 57 relates to the steviol glycoside composition of any one of Embodiments 1-56, wherein the composition comprises from 100 ppm to 1600 ppm of rebaudioside M.

Embodiment 58 relates to the steviol glycoside composition of any one of Embodiments 1-57, wherein the composition comprises at least 200 ppm of rebaudioside M.

Embodiment 59 relates to the steviol glycoside composition of any one of Embodiments 1-58, wherein the composition comprises from 200 ppm to 1000 ppm of rebaudioside M.

Embodiment 60 relates to the steviol glycoside composition of any one of Embodiments 1-59, wherein the composition comprises at least 300 ppm of rebaudioside M.

Embodiment 61 relates to the steviol glycoside composition of any one of Embodiments 1-60, wherein the composition comprises from 400 ppm to 800 ppm of rebaudioside M.

Embodiment 62 relates to the steviol glycoside composition of any one of Embodiments 1-61, wherein the composition comprises at least 500 ppm of rebaudioside M.

Embodiment 63 relates to the steviol glycoside composition of any one of Embodiments 1-62, wherein the composition comprises from 100 ppm to 1600 ppm of the sensory modifier.

Embodiment 64 relates to the steviol glycoside composition of any one of Embodiments 1-63, wherein the composition comprises at least 200 ppm of the sensory modifier.

Embodiment 65 relates to the steviol glycoside composition of any one of Embodiments 1-64, wherein the composition comprises from 200 ppm to 1000 ppm of the sensory modifier.

Embodiment 66 relates to the steviol glycoside composition of any one of Embodiments 1-65, wherein the composition comprises at least 300 ppm of the sensory modifier.

Embodiment 67 relates to the steviol glycoside composition of any one of Embodiments 1-66, wherein the composition comprises from 400 ppm to 800 ppm of the sensory modifier.

Embodiment 68 relates to the steviol glycoside composition of any one of Embodiments 1-67, wherein the composition comprises at least 500 ppm of the sensory modifier.

Embodiment 69 relates to the steviol glycoside composition of any one of Embodiments 1-68, wherein the composition comprises from 50 ppm to 1400 ppm of a salt of caffeoylquinic acid.

Embodiment 70 relates to the steviol glycoside composition of any one of Embodiments 1-69, wherein the composition comprises at least 100 ppm of a salt of caffeoylquinic acid.

Embodiment 71 relates to the steviol glycoside composition of any one of Embodiments 1-70, wherein the composition comprises from 100 ppm to 900 ppm of a salt of caffeoylquinic acid.

Embodiment 72 relates to the steviol glycoside composition of any one of Embodiments 1-71, wherein the composition comprises at least 150 ppm of a salt of caffeoylquinic acid.

Embodiment 73 relates to the steviol glycoside composition of any one of Embodiments 1-72, wherein the composition comprises from 200 ppm to 720 ppm of a salt of caffeoylquinic acid.

Embodiment 74 relates to the steviol glycoside composition of any one of Embodiments 1-73, wherein the composition comprises at least 250 ppm of a salt of caffeoylquinic acid.

Embodiment 75 relates to the steviol glycoside composition of any one of Embodiments 1-74, wherein the composition comprises a 1:0.3 to 1:3 ratio by weight of steviol glycoside component to sensory modifier.

Embodiment 76 relates to the steviol glycoside composition of any one of Embodiments 1-75, wherein the composition comprises a 1:0.3 to 1:1 ratio by weight of steviol glycoside component to sensory modifier.

Embodiment 77 relates to the steviol glycoside composition of any one of Embodiments 1-76, wherein the composition comprises approximately a 2:1 ratio by weight of steviol glycoside component to sensory modifier.

Embodiment 78 relates to the steviol glycoside composition of any one of Embodiments 1-77, wherein the amount effective to decrease sweetness linger is determined by at least four panelists trained in tasting steviol glycoside compositions using a roundtable methodology using a scale of 0 to 6 with a score of 0 indicating no sweetness linger and a score of 6 indicating extreme sweetness linger, and wherein the sweetness linger score is reduced by at least 1 unit as compared to a control sample lacking the sensory modifier.

Embodiment 79 relates to the steviol glycoside composition of any one of Embodiments 1-78, wherein the amount effective reduces sweetness linger score by at least 2 units compared to a control sample lacking the sensory modifier.

Embodiment 80 relates to the steviol glycoside composition of any one of Embodiments 1-79, wherein the amount effective reduces sweetness linger score by at least 3 units compared to a control sample lacking the sensory modifier.

Embodiment 81 relates to the steviol glycoside composition of any one of Embodiments 1-80, wherein the amount effective reduces sweetness linger score to below 3 units compared to a control sample lacking the sensory modifier.

Embodiment 82 relates to the steviol glycoside composition of any one of Embodiments 1-81, wherein the steviol glycoside composition has reduced sweetness linger compared to the steviol glycoside without the sensory modifier.

Embodiment 83 relates to the steviol glycoside composition of any one of Embodiments 1-82, wherein the amount effective to decrease bitterness is determined by at least four panelists trained in tasting steviol glycoside compositions using a roundtable methodology using a scale of 0 to 6 with a score of 0 indicating no bitterness and a score of 6 indicating extreme bitterness, and wherein bitterness score is reduced by at least 1 unit as compared to a control sample lacking the sensory modifier.

Embodiment 84 relates to the steviol glycoside composition of any one of Embodiments 1-83, wherein the amount effective reduces bitterness score by at least 2 units compared to a control sample lacking the sensory modifier.

Embodiment 85 relates to the steviol glycoside composition of any one of Embodiments 1-83, wherein the amount effective reduces bitterness score by at least 3 units compared to a control sample lacking the sensory modifier.

Embodiment 86 relates to the steviol glycoside composition of any one of Embodiments 1-83, wherein the amount effective reduces bitterness score to below 2 units compared to a control sample lacking the sensory modifier.

Embodiment 87 relates to the steviol glycoside composition of any one of Embodiments 1-83, wherein the amount effective reduces bitterness score to below 1 units compared to a control sample lacking the sensory modifier.

Embodiment 88 relates to the steviol glycoside composition of any one of Embodiments 1-87, wherein the steviol glycoside composition has reduced bitterness compared to a control sample lacking the sensory modifier.

Embodiment 89 relates to the steviol glycoside composition of any one of Embodiments 1-88, wherein the composition is an aqueous solution.

Embodiment 90 relates to the steviol glycoside composition of any one of Embodiments 1-89, wherein the composition is in solid form.

Embodiment 91 relates to the steviol glycoside composition of any one of Embodiments 1-90, wherein the composition is a freeze-dried powder.

Embodiment 92 relates to the steviol glycoside composition of any one of Embodiments 1-91, wherein the steviol glycoside component is at a concentration of 200 to 1000 ppm and the sensory modifier is at a concentration of 200 to 1000 ppm Embodiment 93 relates to the steviol glycoside composition of any one of Embodiments 1-92, wherein the steviol glycoside component is at a concentration of 400 to 800 ppm and the sensory modifier is at a concentration of 400 to 800 ppm.

Embodiment 94 relates to the steviol glycoside composition of any one of Embodiments 1-93, wherein the composition has reduced sweetness linger compared to the same composition lacking the sensory modifier.

Embodiment 95 relates to the steviol glycoside composition of any one of Embodiments 1-94, wherein the composition has reduced bitterness compared to the same composition lacking the sensory modifier.

Embodiment 96 relates to the steviol glycoside composition of any one of Embodiments 1-95, wherein the sensory modifier is in an effective amount to reduce sweetness linger.

Embodiment 97 relates to the steviol glycoside composition of any one of Embodiments 1-96, wherein the sensory modifier is in an effective amount to reduce bitterness.

Embodiment 98 relates to the steviol glycoside composition of any one of Embodiments 1-97, wherein the sweetness linger, bitterness, or both, is associated with rebaudioside M, rebaudioside N, rebaudioside O, rebaudioside D, or a combination thereof.

Embodiment 99 relates to a beverage comprising the steviol glycoside composition of any one of Embodiments 1-98.

Embodiment 100 relates to a pharmaceutical composition, dental composition, chewing gum, or solid foodstuff comprising the steviol glycoside composition of any one of Embodiments 1-98.

Embodiment 101 relates to a method for reducing an undesirable sensory attribute of an aqueous steviol glycoside solution, the method comprising dissolving the composition any one of Embodiments 1-98 in the aqueous steviol glycoside solution.

Embodiment 102 relates to the method of Embodiment 99, wherein the undesirable sensory attribute is bitterness, sweetness linger, spiky taste, bad mouthfeel, astringency, or a rebaudioside M-type attribute.

Embodiment 103 relates to the method of Embodiment 101, wherein the undesirable sensory attribute is bitterness.

Embodiment 104 relates to the method of Embodiment 101, wherein the undesirable sensory attribute is sweetness linger.

Embodiment 105 relates to the method of Embodiment 101, wherein the undesirable sensory attribute is a rebaudioside M-type attribute, selected from one or more of metallic, powdery, numbing, and vapory attributes.

Embodiment 106 relates to a method for reducing sweetness linger from a steviol glycoside component in an edible composition the method comprising combining the steviol glycoside component and a sensory modifier in an amount effective to decrease sweetness linger of the steviol glycoside component,
 wherein the sensory modifier is a mixture comprising one or more caffeoyl-substituted quinic acids and one or more salts thereof, and at least 50 wt % of the sensory modifier is in salt form.

Embodiment 107 relates to a method for reducing sweetness linger from a steviol glycoside component in an edible composition the method comprising combining the steviol glycoside component and a sensory modifier in an amount effective to decrease sweetness linger of the steviol glycoside component,
 wherein the sensory modifier comprises a salt fraction and an acid fraction,
 wherein the salt fraction comprises one or more compounds selected from the group consisting of a salt of a monocaffeoylquinic acid and a salt of a dicaffeoylquinic acid,
 wherein the acid fraction comprises one or more compounds selected from the group consisting of a monocaffeoylquinic acid and a dicaffeoylquinic acid, and
 wherein the salt fraction comprises at least 50 wt % of the total sensory modifier.

Embodiment 108 relates to a method for reducing bitterness from a steviol glycoside component in an edible composition the method comprising combining the steviol glycoside component and a sensory modifier in an amount effective to decrease bitterness of the steviol glycoside component,
 wherein the sensory modifier is a mixture comprising one or more caffeoyl-substituted quinic acids and one or more salts thereof, and at least 50 wt % of the sensory modifier is in salt form.

Embodiment 109 relates to a method for reducing bitterness from a steviol glycoside component in an edible composition the method comprising combining the steviol glycoside component and a sensory modifier in an amount effective to decrease bitterness of the steviol glycoside component,
 wherein the sensory modifier comprises a salt fraction and an acid fraction,
 wherein the salt fraction comprises one or more compounds selected from the group consisting of a salt of a monocaffeoylquinic acid and a salt of a dicaffeoylquinic acid,
 wherein the acid fraction comprises one or more compounds selected from the group consisting of a monocaffeoylquinic acid and a dicaffeoylquinic acid, and
 wherein the salt fraction comprises at least 50 wt % of the total sensory modifier.

Embodiment 110 relates to the method of any one of Embodiments 99-107, wherein the steviol glycoside component and sensory modifier are added at the same time.

Embodiment 111 relates to an aqueous steviol glycoside solution with reduced sweetness linger, comprising:
 a steviol glycoside component comprising at least one of rebaudioside D, rebaudioside M, and rebaudioside A, wherein a total steviol glycoside component concentration is 200 ppm to 1000 ppm; and
 a sensory modifier at a concentration of 200 ppm to 1000 ppm,
 wherein the sensory modifier comprises a salt fraction and an acid fraction,
 wherein the salt fraction comprises one or more compounds selected from the group consisting of a salt of a monocaffeoylquinic acid and a salt of a dicaffeoylquinic acid,
 wherein the acid fraction comprises one or more compounds selected from the group consisting of a monocaffeoylquinic acid and a dicaffeoylquinic acid,
 wherein the salt fraction comprises 50 to 80 wt % of the total sensory modifier, wherein at least a portion of the sensory modifier is prepared from yerba mate or stevia, and
 wherein the aqueous steviol glycoside solution has reduced sweetness linger compared to an aqueous steviol glycoside solution having the same concentration of the same steviol glycoside component without the sensory modifier.

Embodiment 112 relates to an aqueous steviol glycoside solution with reduced bitterness, comprising:
 a steviol glycoside component comprising at least one of rebaudioside D, rebaudioside M, and rebaudioside A, wherein a total steviol glycoside concentration is 400 ppm to 800 ppm; and
 a sensory modifier at a concentration of 400 ppm to 800 ppm,
 wherein the sensory modifier comprises a salt fraction and an acid fraction,
 wherein the salt fraction comprises one or more compounds selected from the group consisting of a salt of a monocaffeoylquinic acid and a salt of a dicaffeoylquinic acid,
 wherein the acid fraction comprises one or more compounds selected from the group consisting of a monocaffeoylquinic acid and a dicaffeoylquinic acid,
 wherein the salt fraction comprises between 50 to 80 wt % of the total sensory modifier and the acid fraction comprises between 20 to 50 wt % of the total sensory modifier,
 wherein at least a portion of the sensory modifier is prepared from yerba mate or stevia, and
 wherein the aqueous steviol glycoside solution has reduced bitterness compared to an aqueous steviol glycoside solution having the same concentration of the same steviol glycoside component without the sensory modifier.

Embodiment 113 relates to a steviol glycoside composition, comprising:
 about 200 to about 800 ppm of steviol glycoside component comprising rebaudioside D and rebaudioside M, wherein rebaudioside M is at least 80 wt % of the steviol glycoside component; and
 about 200 to about 400 ppm of a sensory modifier, wherein the sensory modifier is a mixture comprising one or more caffeoyl-substituted quinic acids and one or more salts thereof, and at least 50 wt % of the sensory modifier is in salt form.

Embodiment 114 relates to the steviol glycoside composition of claim 113, wherein the composition has a rounded taste profile, no more than trace sweetness linger, a sucrosey mouthfeel, no more than slight astringency, and no more than trace bitterness.

Embodiment 115 relates to the steviol glycoside composition of claim 113, wherein the composition has a rounded taste profile, no more than trace sweetness linger, a sucrosey mouthfeel, no more than slight astringency, and no more than trace bitterness.

What is claimed is:

1. A steviol glycoside composition, the composition comprising:
 one or more steviol glycosides; and
 a sensory modifier in an amount effective to reduce sweetness linger, reduce bitterness, or both,
 wherein the sensory modifier comprises 50 mol % to 90 mol % of a salt fraction and at least 10 mol % of an acid fraction, wherein the salt fraction comprises a salt of a monocaffeoylquinic acid and a salt of a dicaffeoylquinic acid,
wherein the acid fraction comprises a monocaffeoylquinic acid and a dicaffeoylquinic acid, and
wherein a ratio by weight of steviol glycosides to sensory modifier is 1:0.3 to 1:3.

2. The steviol glycoside composition of claim 1, wherein the sensory modifier comprises one or more of 3-O-caffeoylquinic acid, 4-O-caffeoylquinic acid, 5-O-caffeoylquinic acid, 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, or 4,5-dicaffeoylquinic acid, and salts thereof.

3. The steviol glycoside composition of claim 1, wherein the monocaffeoylquinic acid is one or more of 3-O-caffeoylquinic acid, 4-O-caffeoylquinic acid, or 5-O-caffeoylquinic acid.

4. The steviol glycoside composition of claim 1, wherein the monocaffeoylquinic acid salts are one or more of a salt of 3-O-caffeoylquinic acid, a salt of 4-O-caffeoylquinic acid, or a salt of 5-O-caffeoylquinic acid.

5. The steviol glycoside composition of claim 1, wherein the dicaffeoylquinic acid is one or more of 1,3-dicaffeoylquinic acid, 1,4-dicaffeoylquinic acid, 1,5-dicaffeoylquinic acid, 3,4-dicaffeoylquinic acid, 3,5-dicaffeoylquinic acid, or 4,5-dicaffeoylquinic acid.

6. The steviol glycoside composition of claim 1, wherein the dicaffeoylquinic acid salts are one or more of a salt of 1,3-dicaffeoylquinic acid, a salt of 1,4-dicaffeoylquinic acid, a salt of 1,5-dicaffeoylquinic acid, a salt of 3,4-dicaffeoylquinic acid, a salt of 3,5-dicaffeoylquinic acid, or a salt of 4,5-dicaffeoylquinic acid.

7. The steviol glycoside composition of claim 1, wherein the sensory modifier comprises 25 wt % or more dicaffeoylquinic acids and salts thereof.

8. The steviol glycoside composition of claim 1, wherein the sensory modifier comprises from 40 wt % to 60 wt % dicaffeoylquinic acids and salts thereof.

9. The steviol glycoside composition of claim 1, wherein the sensory modifier comprises from 60 mol % to 90 mol % of the salt fraction.

10. The steviol glycoside composition of claim 1, wherein the composition has a pH less than 4.0.

11. The steviol glycoside composition of claim 1, wherein the composition has a pH greater than 2.0.

12. The steviol glycoside composition of claim 1, wherein the one or more steviol glycosides comprises rebaudioside D, rebaudioside M, or both.

13. The steviol glycoside composition of claim 1, wherein at least 80 wt % of total steviol glycosides is rebaudioside M.

14. The steviol glycoside composition of claim 1, wherein the composition comprises from 100 ppm to 1600 ppm of steviol glycosides.

15. The steviol glycoside composition of claim 1, wherein the composition comprises from 100 ppm to 1600 ppm of rebaudioside M.

16. The steviol glycoside composition of claim 1, wherein the composition comprises from 100 ppm to 1600 ppm of the sensory modifier.

17. The steviol glycoside composition of claim 1, wherein the composition comprises from 50 ppm to 1400 ppm of salts of caffeoylquinic acids.

18. The steviol glycoside composition of claim 1, wherein a ratio by weight of total steviol glycosides to sensory modifier is from 1:0.3 to 1:1.

19. The steviol glycoside composition of claim 1, wherein the steviol glycoside composition has reduced sweetness linger compared to a control sample lacking the sensory modifier.

20. The steviol glycoside composition of claim 1, wherein the steviol glycoside composition has reduced bitterness compared to a control sample lacking the sensory modifier.

21. The steviol glycoside composition claim 1, wherein the composition is an aqueous solution.

22. The steviol glycoside composition of claim 1, wherein the composition is in solid form.

23. A beverage comprising the steviol glycoside composition of claim 1.

24. A method for reducing sweetness linger from a steviol glycoside component in an edible composition the method comprising combining the steviol glycoside component and a sensory modifier in an amount effective to decrease sweetness linger of the steviol glycoside component,
wherein the sensory modifier comprises 50 mol % to 90 mol % of a salt fraction and at least 10 mol % of an acid fraction,
wherein the salt fraction comprises a salt of a monocaffeoylquinic acid and a salt of a dicaffeoylquinic acid,
wherein the acid fraction comprises a monocaffeoylquinic acid and a dicaffeoylquinic acid, and
wherein a ratio by weight of total steviol glycosides to sensory modifier is 1:0.3 to 1:3.

25. A method for reducing bitterness from a steviol glycoside component in an edible composition the method comprising combining the steviol glycoside component and a sensory modifier in an amount effective to decrease bitterness of the steviol glycoside component,
wherein the sensory modifier comprises 50 mol % to 90 mol % of a salt fraction and at least 10 mol % of an acid fraction,
wherein the salt fraction comprises a salt of a monocaffeoylquinic acid and a salt of a dicaffeoylquinic acid,
wherein the acid fraction comprises a monocaffeoylquinic acid and a dicaffeoylquinic acid, and
wherein a ratio by weight of total steviol glycosides to sensory modifier is 1:0.3 to 1:3.

* * * * *

UNITED STATES PATENT AND TRADEMARK OFFICE
CERTIFICATE OF CORRECTION

| | | |
|---|---|---|
| PATENT NO. | : 12,349,710 B2 | Page 1 of 2 |
| APPLICATION NO. | : 18/354914 | |
| DATED | : July 8, 2025 | |
| INVENTOR(S) | : Dan S. Gaspard et al. | |

It is certified that error appears in the above-identified patent and that said Letters Patent is hereby corrected as shown below:

On the Title Page

In Column 1, page 3, Line 5 item (56) delete "1253099" and insert -- 1253099 C --, therefor.
In Column 2, page 3, Line 48 item (56) delete "W" and insert -- A1 --, therefor.
In Column 1, page 4, Line 24 item (56) delete "W" and insert -- A1 --, therefor.
In Column 1, page 4, Line 25 item (56) delete "W" and insert -- A1 --, therefor.
In Column 1, page 4, Line 30 item (56) delete "W" and insert -- A1 --, therefor.
In Column 1, page 4, Line 31 item (56) delete "W" and insert -- A1 --, therefor.
In Column 1, page 4, Line 32 item (56) delete "W" and insert -- A1 --, therefor.
In Column 1, page 4, Line 38 item (56) delete "W" and insert -- A1 --, therefor.
In Column 2, page 4, Line 38 item (56) delete "al" and insert -- al. --, therefor.
In Column 2, page 4, Line 62 item (56) delete "al" and insert -- al. --, therefor.
In Column 2, page 4, Line 66 item (56) delete "al" and insert -- al. --, therefor.
In Column 2, page 4, Line 70 item (56) delete "al" and insert -- al. --, therefor.
In Column 1, page 5, Line 1 item (56) delete "al" and insert -- al. --, therefor.
In Column 1, page 5, Line 9 item (56) delete "al" and insert -- al. --, therefor.
In Column 1, page 5, Line 25 item (56) delete "al" and insert -- al. --, therefor.
In Column 1, page 5, Line 40 item (56) delete "de" and insert -- De --, therefor.
In Column 1, page 5, Line 40 item (56) delete "al" and insert -- al. --, therefor.
In Column 2, page 5, Line 18 item (56) delete "al" and insert -- al. --, therefor.
In Column 2, page 5, Line 61 item (56) delete "al" and insert -- al. --, therefor.
In Column 1, page 6, Line 61 item (56) delete "chorogenic" and insert -- chlorogenic --, therefor.
In Column 2, page 6, Line 17 item (56) delete "crytalline" and insert -- crystalline --, therefor.
In Column 2, page 6, Line 24 item (56) delete "p." and insert -- pp. --, therefor.
In Column 2, page 6, Line 31 item (56) delete "al," and insert -- al., --, therefor.
In Column 2, page 6, Line 33 item (56) delete "p." and insert -- pp. --, therefor.
In Column 2, page 6, Line 34 item (56) delete "al," and insert -- al., --, therefor.
In Column 2, page 6, Line 36 item (56) delete "p." and insert -- pp. --, therefor.

Signed and Sealed this
Eleventh Day of November, 2025

John A. Squires
*Director of the United States Patent and Trademark Office*

CERTIFICATE OF CORRECTION (continued)
U.S. Pat. No. 12,349,710 B2

In Column 2, page 6, Line 58 item (56) delete "coversion" and insert -- conversion --, therefor.
In Column 1, page 7, Line 12 item (56) delete "al." and insert -- al., --, therefor.
In Column 2, page 7, Line 38 item (56) delete "212-221" and insert -- 212-221. --, therefor.
In Column 1, page 8, Line 6 item (56) delete "E245" and insert -- E245. --, therefor.
In Column 2, page 8, Line 47 item (56) delete "Alibaba ]" and insert -- [Alibaba] --, therefor.
In Column 2, page 8, Line 50 item (56) delete "Alma Japan]" and insert -- [Alma Japan] --, therefor.

In the Specification

In Column 8, Line 46 delete "))." and insert -- ). --, therefor.
In Column 26, Line 14 delete "e.g." and insert -- e.g., --, therefor.
In Column 26, Line 16 delete "e.g." and insert -- e.g., --, therefor.
In Column 37, Line 40 delete "1-45" and insert -- 1-45, --, therefor.
In Column 37, Line 44 delete "0," and insert -- O, --, therefor.
In Column 40, Line 21 delete "ppm" and insert -- ppm. --, therefor.
In Column 40, Line 43 delete "0," and insert -- O, --, therefor.